(12) United States Patent
Zhu et al.

(10) Patent No.: US 11,621,633 B2
(45) Date of Patent: Apr. 4, 2023

(54) TRANSFORMERLESS STACKED ACTIVE BRIDGE POWER CONVERTERS AND METHODS FOR OPERATING THE SAME

(71) Applicant: The Regents of the University of Colorado, Denver, CO (US)

(72) Inventors: Jianglin Zhu, Boulder, CO (US); Dragan Maksimovic, Boulder, CO (US)

(73) Assignee: The Regents of the University of Colorado, Denver, CO (US)

( * ) Notice: Subject to any disclaimer, the term of this patent is extended or adjusted under 35 U.S.C. 154(b) by 135 days.

(21) Appl. No.: 17/202,551

(22) Filed: Mar. 16, 2021

(65) Prior Publication Data
US 2021/0288581 A1    Sep. 16, 2021

Related U.S. Application Data

(60) Provisional application No. 62/990,237, filed on Mar. 16, 2020.

(51) Int. Cl.
*H02M 3/07*     (2006.01)
*H02M 3/158*    (2006.01)
*H02M 1/00*     (2006.01)

(52) U.S. Cl.
CPC .......... *H02M 3/07* (2013.01); *H02M 3/1586* (2021.05); *H02M 1/0058* (2021.05)

(58) Field of Classification Search
CPC .......... H02M 3/07–07; H02M 1/0095; H02M 3/1586
See application file for complete search history.

(56) References Cited

U.S. PATENT DOCUMENTS

| | | | |
|---|---|---|---|
| 2019/0393782 A1* | 12/2019 | Teplechuk | ............ H02M 3/156 |
| 2021/0408904 A1* | 12/2021 | Taufik | ................. H02M 1/0058 |
| 2022/0103066 A1* | 3/2022 | Chen | ....................... H02M 3/07 |

OTHER PUBLICATIONS

Amin, Amr et al., "A Transformerless Dual Active Half-Bridge DC-DC Converter for Point-of-Load Power Supplies," IEEE, pp. 133-140, 2015.

(Continued)

*Primary Examiner* — Peter M Novak

(57) ABSTRACT

Transformerless stacked active bridge (TSAB) direct current (DC)-to-DC power converters designed based on parent switched capacitor (SC) converter topologies. The TSAB DC-to-DC power converter includes the SC converter. The SC converter includes a plurality of switches and a plurality of capacitors. Each capacitor of the plurality of capacitors is electrically coupled to at least one of the plurality of switches. The plurality of capacitors includes tree capacitors, and link capacitors forming a loop with at least one of the tree capacitors. The TSAB DC-to-DC power converter includes at least one inductor electrically coupled in series to at least one of the link capacitors. The TSAB DC-to-DC power converters provide high efficiency bi-directional operation without requiring isolation transformers. The TSAB DC-to-DC power converters enable high power density in a wide variety of practical applications involving low, medium, or high power requirements, with comparably lower package sizes/weights and inductor component values.

20 Claims, 51 Drawing Sheets

(56) References Cited

OTHER PUBLICATIONS

Cao, Dong et al., "Zero Voltage Switching Double-Wing Multilevel Modular Switched-Capacitor DC-DC Converter With Voltage Regulation," IEEE, pp. 2029-2036, 2013.

Cervera, Alon et al., "A High-Efficiency Resonant Switched Capacitor Converter With Continuous Conversion Ratio," IEEE Transactions on Power Electronics, vol. 30, No. 3, pp. 1373-1382, Mar. 2015.

Chen, Hua et al., "Electrified Automative Powertrain Architecture Using Composite DC-DC Converters," IEEE Transactions on Power Electronics, vol. 32, No. 1, pp. 98-116, Jan. 2017.

Costinett, Daniel et al., "Design and Control for High Efficiency in High Step-Down Dual Active Bridge Converters Operating at High Switching Frequency," IEEE Transactions on Power Electronics, vol. 28, No. 8, pp. 3931-3940, Aug. 2013.

Costinett, Daniel et al., "Discrete-Time Small-Signal Modeling of a 1 MHz Efficiency-Optimized Dual Active Bridge Converter With Varying Load," IEEE, 7 pages, 2012.

De Doncker, Rik W. A. A. et al., "A Three-Phase Soft-Switched High-Power-Density dc/dc Converter for High-Power Applications," IEEE Transactions on Industry Applications, vol. 27, No. 1, pp. 63-73, Jan./Feb. 1991.

He, Yiou et al., "Switched Tank Converter Based Partial Power Architecture for Voltage Regulation Applications," IEEE, pp. 91-97, 2018.

Jiang, Shuai et al., "Switched Tank Converters," IEEE, pp. 81-90, 2018.

Li, Yanchao et al., "A High Efficiency Resonant Switched-Capacitor Converter for Data Center," IEEE, pp. 4460-4466, 2017.

Makowski, Marek S. et al., "Performance Limits of Switched-Capacitor DC-DC Converters," IEEE, pp. 1215-1221, 1995.

Maksimovic, Dragan et al., "General Properties and Synthesis of PWM DC-to-DC Converters," IEEE, pp. 515-525, 1989.

Sano, Kenichiro et al., "Performance of a High-Efficiency Switched-Capacitor-Based Resonant Converter With Phase-Shift Control," IEEE Transactions on Power Electronics, vol. 26, No. 2, pp. 344-354, Feb. 2011.

Schaef, Christopher et al., "Multimode Operation of Resonant and Hybrid Switched-Capacitor Topologies," IEEE Transactions on Power Electronics, vol. 33, No. 12, pp. 10512-10523, Dec. 2018.

Seeman, Michael D. et al., "Analysis and Optimization of Switched-Capacitor DC-DC Converters," IEEE Transactions on Power Electronics, vol. 23, No. 2, pp. 841-851, Mar. 2008.

Visser, H. R. et al., "Modelling of Periodically Switching Networks," IEEE, pp. 67-73, 1991.

Zhu, Jianglin et al., "A Family of Transformerless Stacked Active Bridge Converters," IEEE, pp. 19-24, 2019.

Zhu, Jianglin et al., "Dynamic Modeling of a Hybrid Switched-Capacitor-Based Converter With Phase-Shift Control," IEEE, 6 pages, 2018.

Zhu, Jianglin et al., "General Properties and Synthesis of Transformerless Stacked Active Bridge Converters," IEEE, 2019.

Zhu, Jianglin et al., "Ladder Transformerless Stacked Active Bridge Converters," IEEE, pp. 151-156, 2019.

Zhu, Jianglin et al., "Transformerless Stacked Active Bridge Converters: Analysis, Properties, and Synthesis," IEEE Transactions on Power Electronics, vol. 36, No. 7, pp. 7914-7926, Jul. 2021, initial publication Dec. 9, 2020.

* cited by examiner

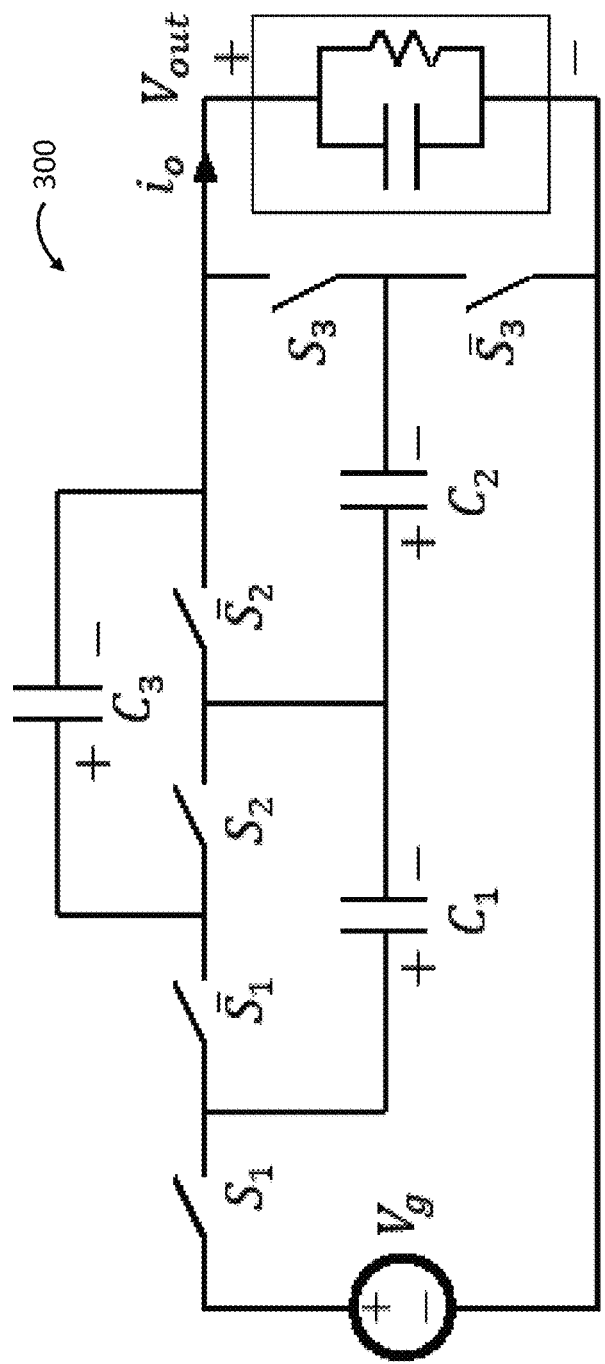
FIG. 3A (PRIOR ART)
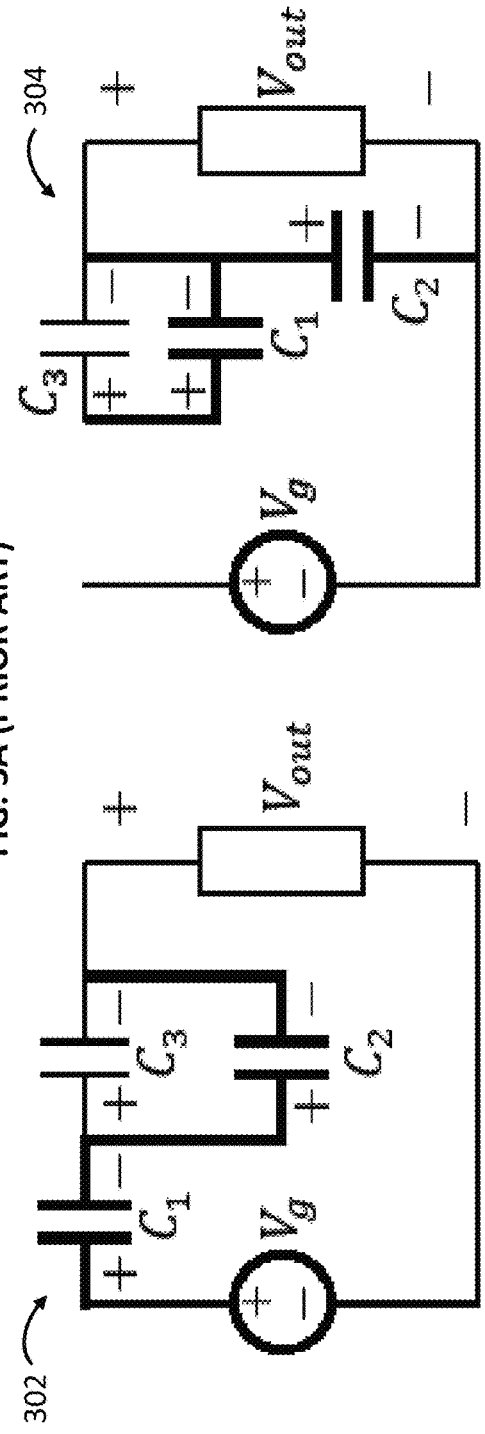
FIG. 3B (PRIOR ART)
FIG. 3C (PRIOR ART)

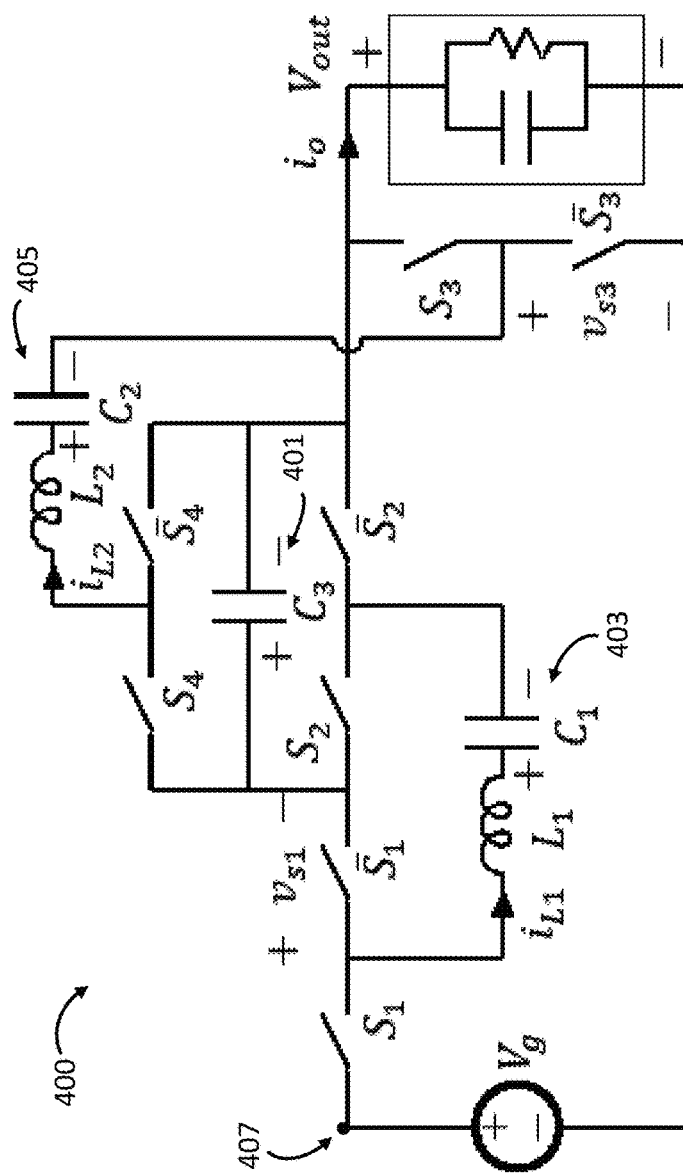
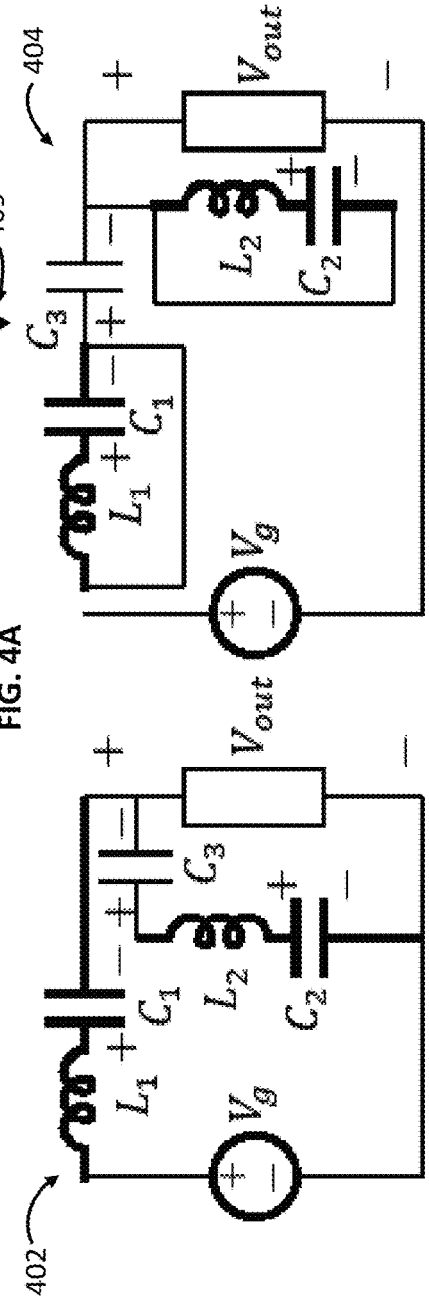
FIG. 4A
FIG. 4B
FIG. 4C

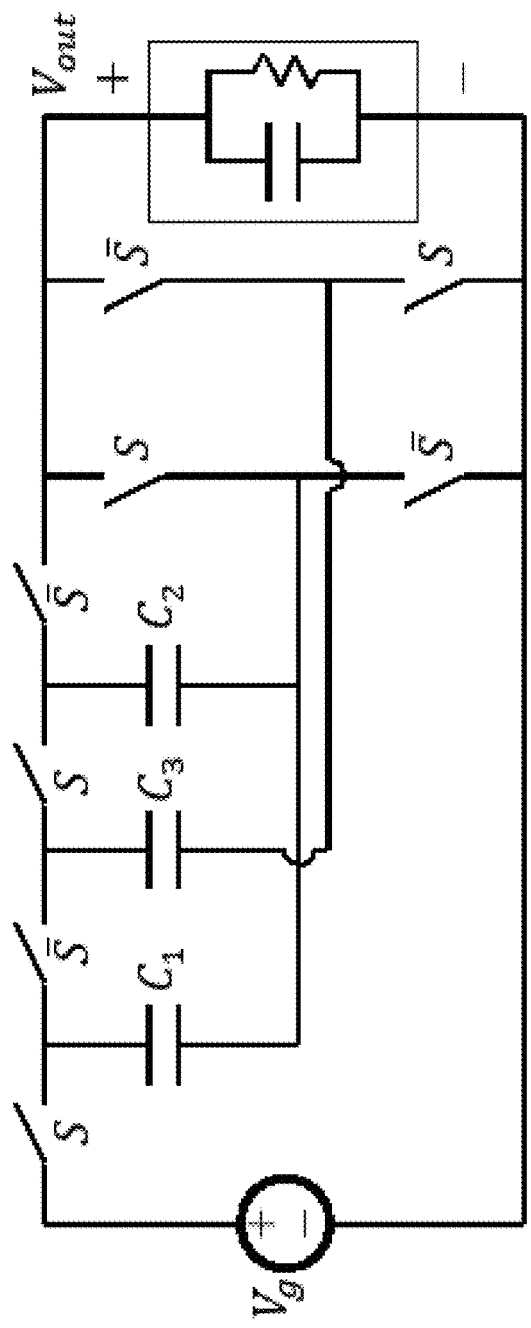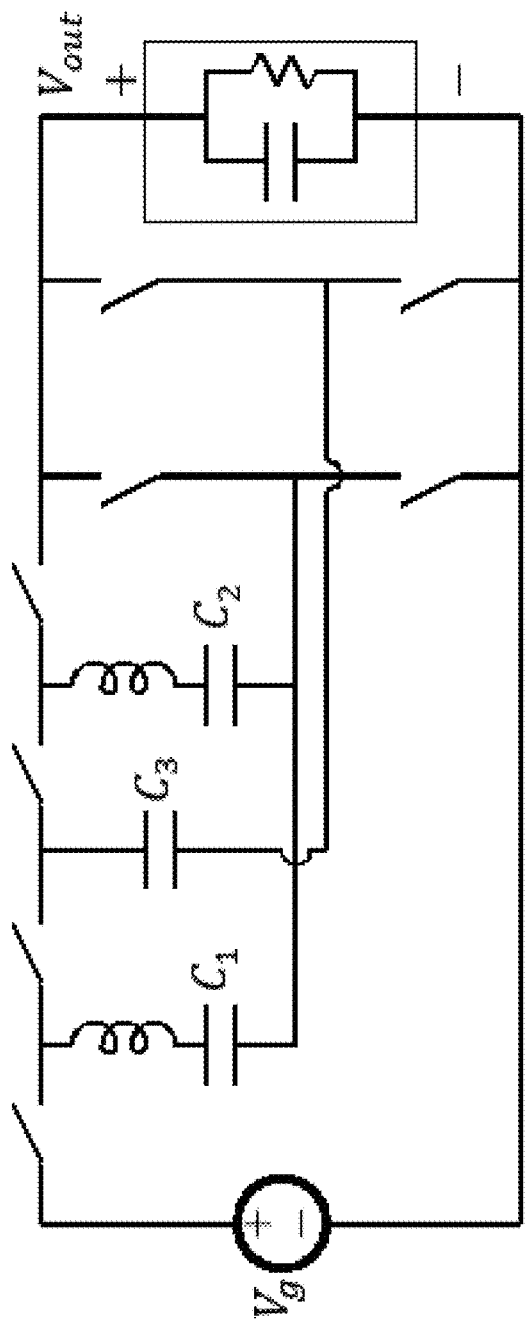
FIG. 8A (PRIOR ART)
FIG. 8B

TRANSFORMERLESS STACKED ACTIVE BRIDGE POWER CONVERTERS AND METHODS FOR OPERATING THE SAME

CROSS-REFERENCE TO RELATED APPLICATIONS

This application claims priority to U.S. Provisional Application No. 62/990,237 filed Mar. 16, 2020, which is incorporated herein by reference in its entirety for all purposes.

TECHNICAL FIELD

Various embodiments of the present technology generally relate to power converter devices and methods. More specifically, some embodiments relate to transformerless stacked active bridge converter devices, systems, and methods for direct current (DC)-to-DC power conversion applications.

BACKGROUND

At least some known switched DC-to-DC power converters require transformers to provide galvanic isolation and operate at a conversion ratio close to the transformer turns ratio. Dual active bridge (DAB) converters, for example, may require transformer components, which places limits on miniaturization and presents other practical challenges. For reasons such as these, DAB converters may be most often used for medium to high power applications. Other known switched DC-to-DC converters dispense with transformers to achieve non-galvanically isolated power conversion. Switched-capacitor (SC) converters, for example, may experience losses due to "hard" switching and "hard" capacitor charging and discharging during operation. As a result, SC converters may be limited to being used in low power applications.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

SUMMARY

The present technology provides transformerless stacked active bridge (TSAB) direct current (DC)-to-DC power converters designed based on parent switched capacitor (SC) converter topologies. The TSAB DC-to-DC power converter may include the SC converter, or a variant thereof. The SC converter includes a plurality of switches and a plurality of capacitors. Each capacitor of the plurality of capacitors is electrically coupled to at least one of the plurality of switches. The plurality of capacitors includes tree capacitors, and link capacitors forming a loop with at least one of the tree capacitors. The TSAB DC-to-DC power converter includes at least one inductor electrically coupled in series to at least one of the link capacitors. The TSAB DC-to-DC power converters provide high efficiency bi-directional operation without requiring isolation transformers. The TSAB DC-to-DC power converters enable high power density in a wide variety of practical applications involving low, medium, or high power requirements, with lower package sizes/weights and inductor component values as compared to at least some known transformerless DC-to-DC power converters.

DRAWINGS

Embodiments of the present technology will be described and explained through the use of the accompanying drawings.

FIG. 3A depicts a schematic diagram of a conventional 3-to-1 ladder SC converter.

FIGS. 3B and 3C depict schematic diagrams of two "on" switched states of the power converter of FIG. 3A.

FIG. 4A depicts a schematic diagram of a 3-to-1 ladder TSAB converter, according to some embodiments of the present technology.

FIGS. 4B and 4C depict schematic diagrams of two additional polarity reversal states of the 3-to-1 TSAB converter of FIG. 4A, according to some embodiments of the present technology.

FIG. 8A depicts a schematic diagram of a conventional 4-to-1 Dickson SC converter.

FIG. 8B depicts a schematic diagram of a 4-to-1 Dickson TSAB converter corresponding to the converter of FIG. 8A, according to some embodiments of the present technology.

Figure 16:
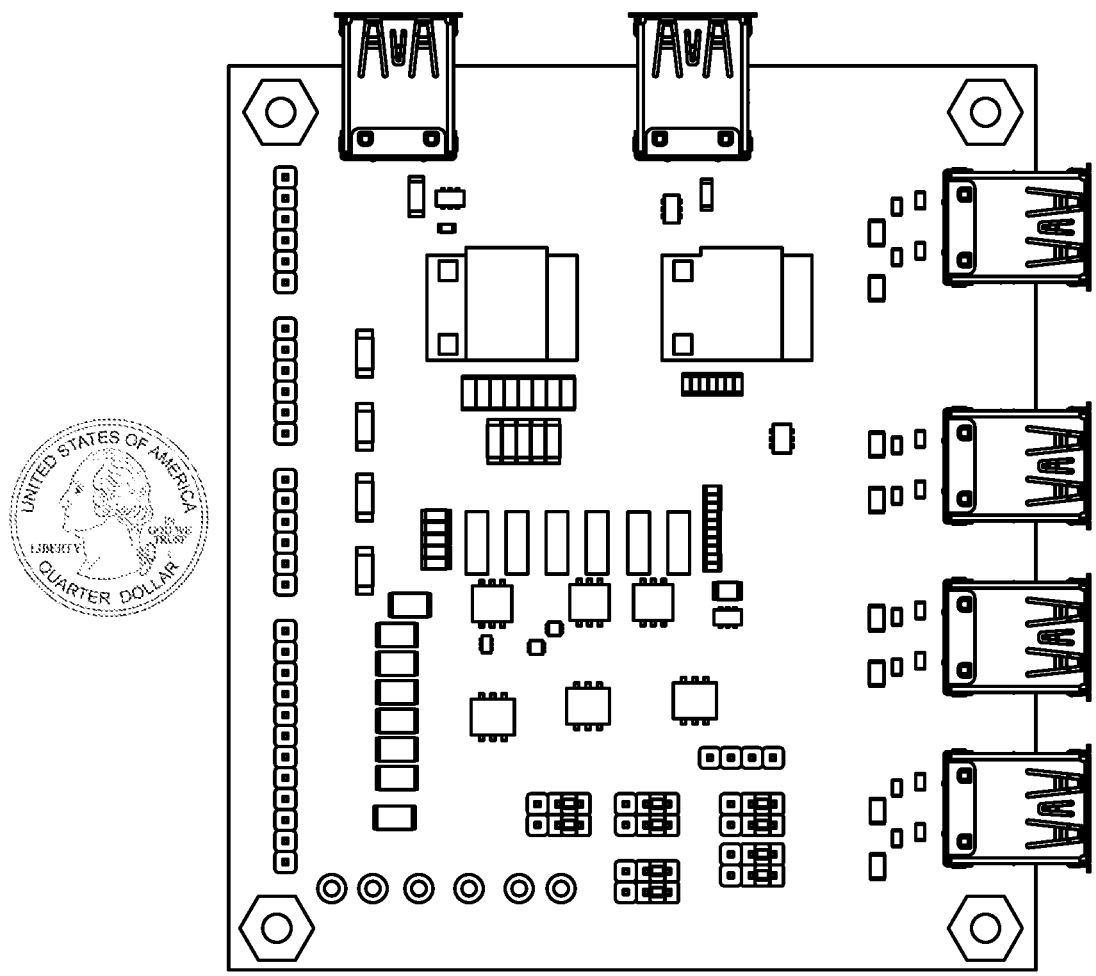

FIG. 16 depicts a photograph of a prototype 120 W 4-to-1 TSAB converter designed for 48 V input and 12 V output, according to some embodiments of the present technology.

Figure 17:
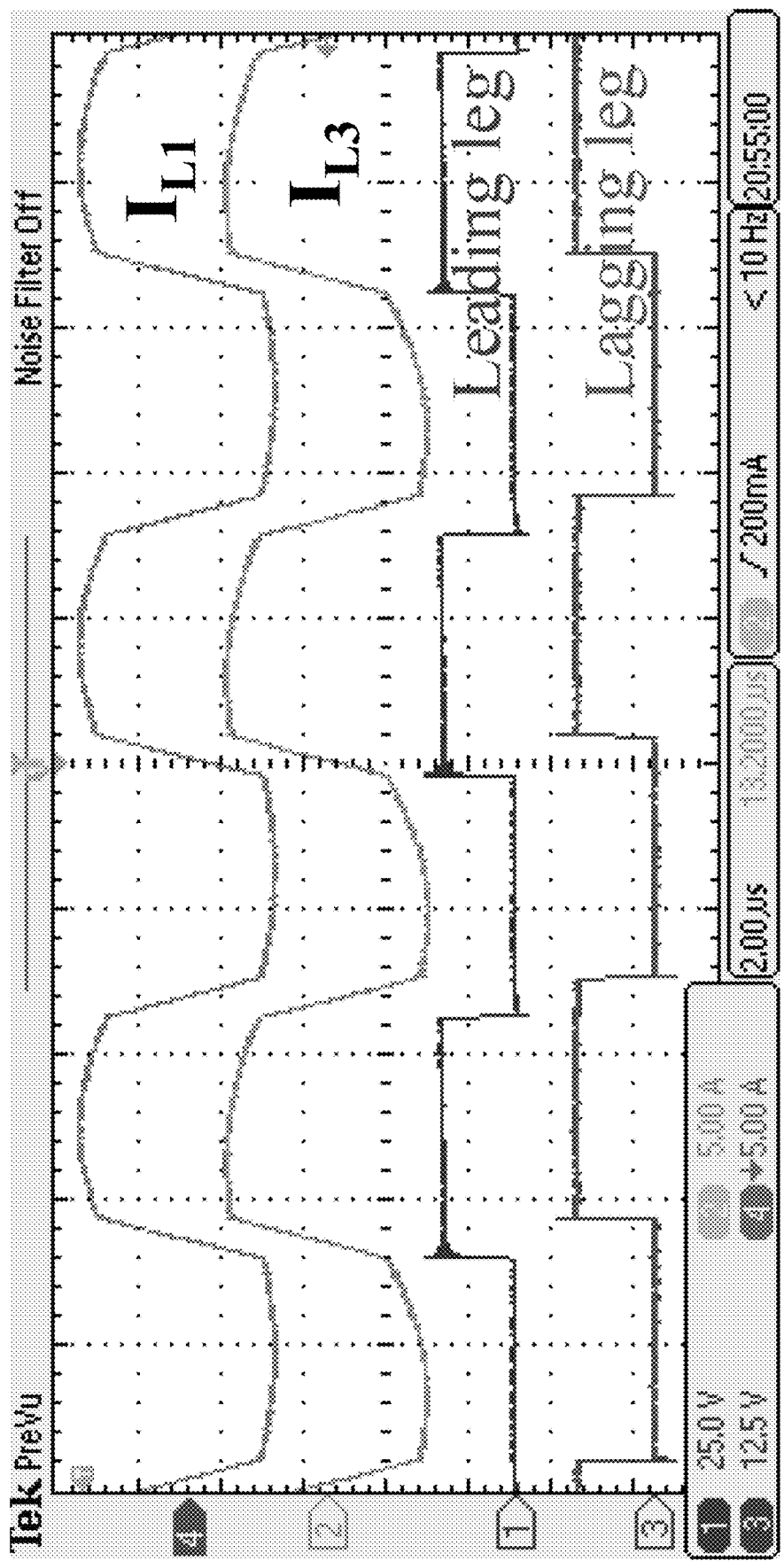
Figure 18:
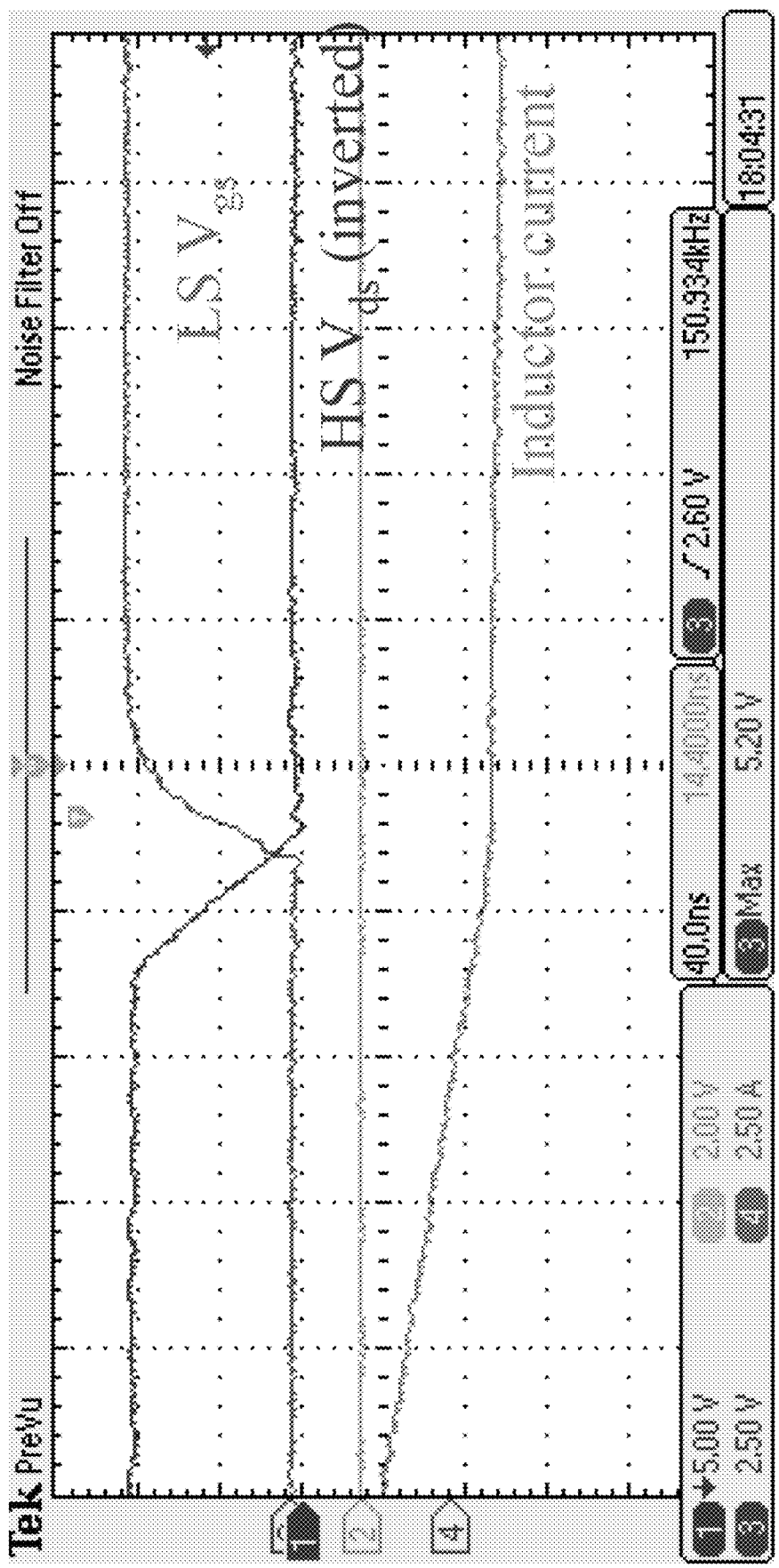

FIGS. 17 and 18 depict graphs of operational waveforms of the prototype 4-to-1 TSAB converter shown in FIG. 16, according to some embodiments of the present technology.

Figure 19:
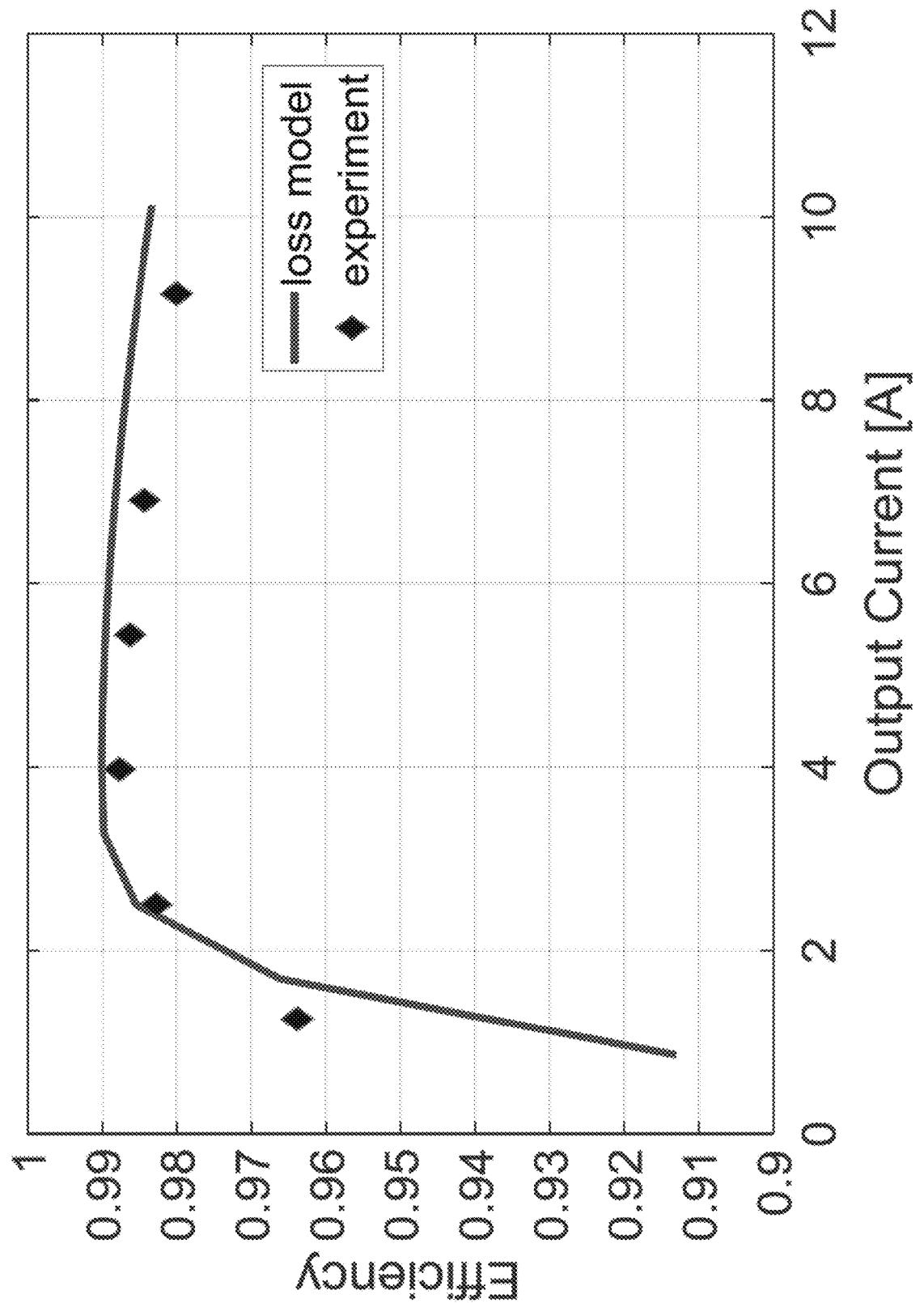

FIG. 19 depicts plots of measured efficiency results for the prototype 4-to-1 TSAB converter of FIG. 16 compared with efficiency based on the loss model, according to some embodiments of the present technology.

Figure 20:
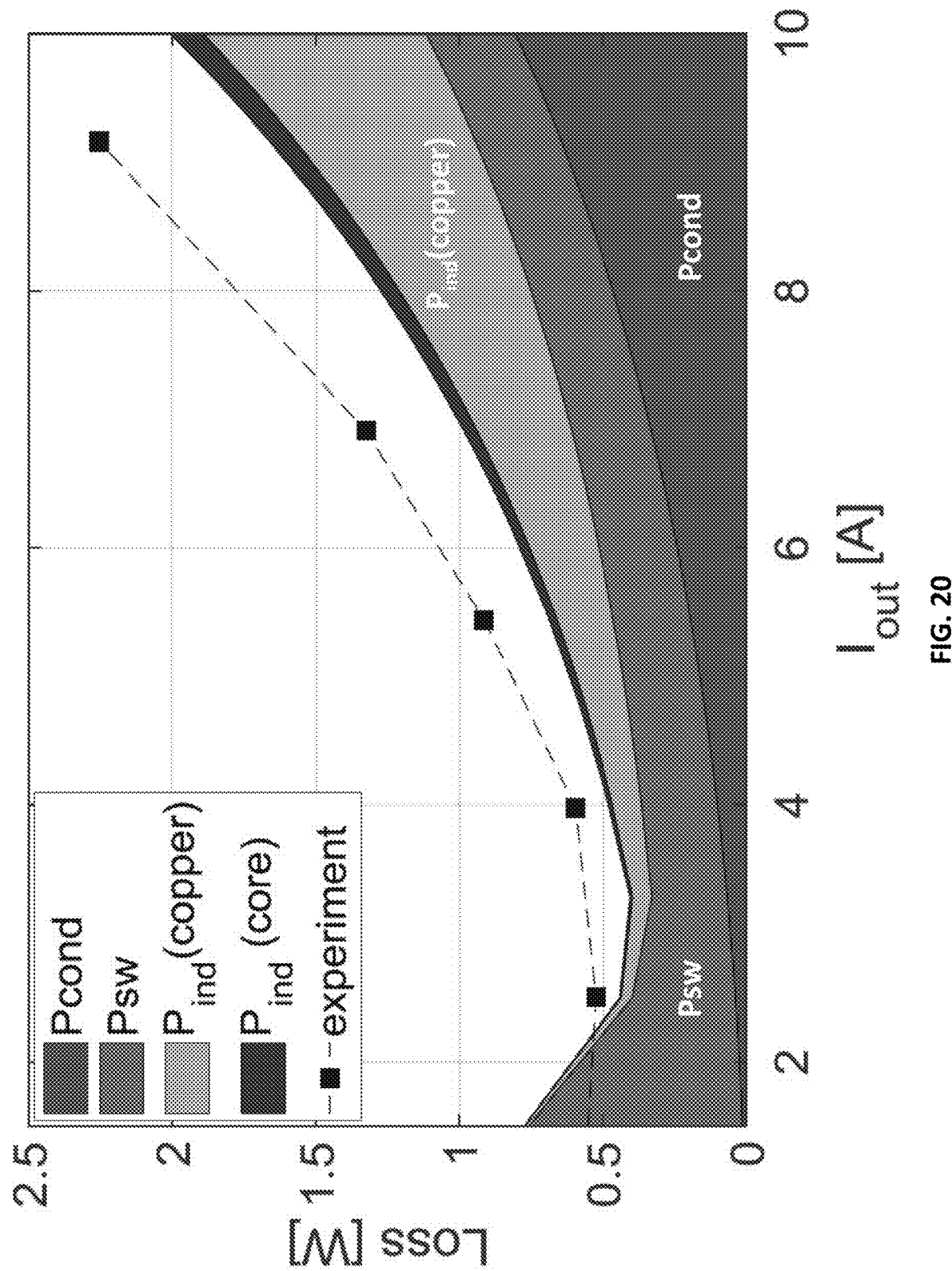

FIG. 20 depicts plots of measured loss for the prototype 4-to-1 TSAB converter of FIG. 16 compared with model-based loss breakdown, according to some embodiments of the present technology.

Figure 21:
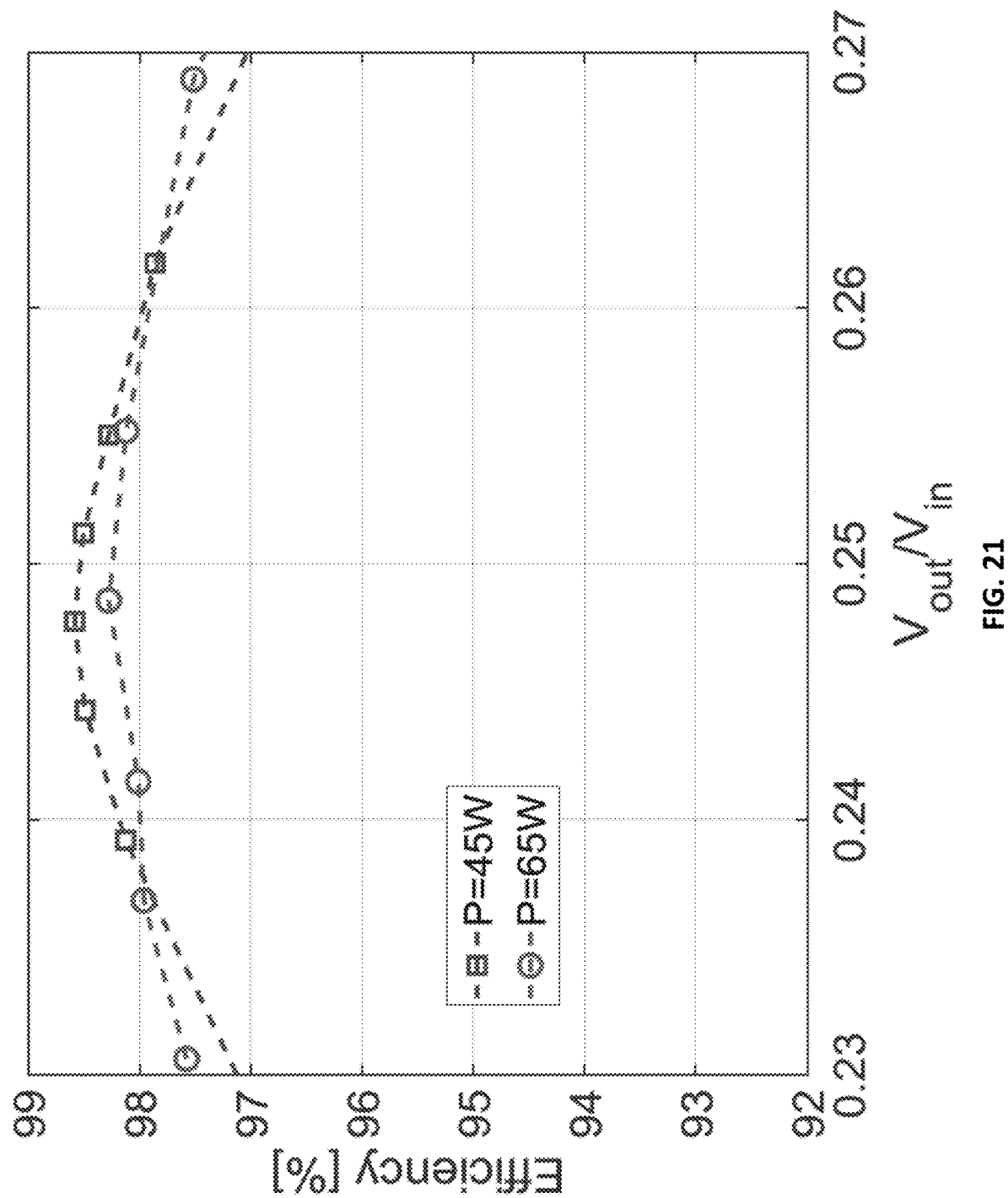

FIG. 21 depicts plots of efficiency variation over ±5% conversion ratio deviation from the nominal $M=V_{out}/V_{in}=0.25$ for the prototype 4-to-1 TSAB converter of FIG. 16 at 45 W and 65 W, according to some embodiments of the present technology.

Figure 22A:
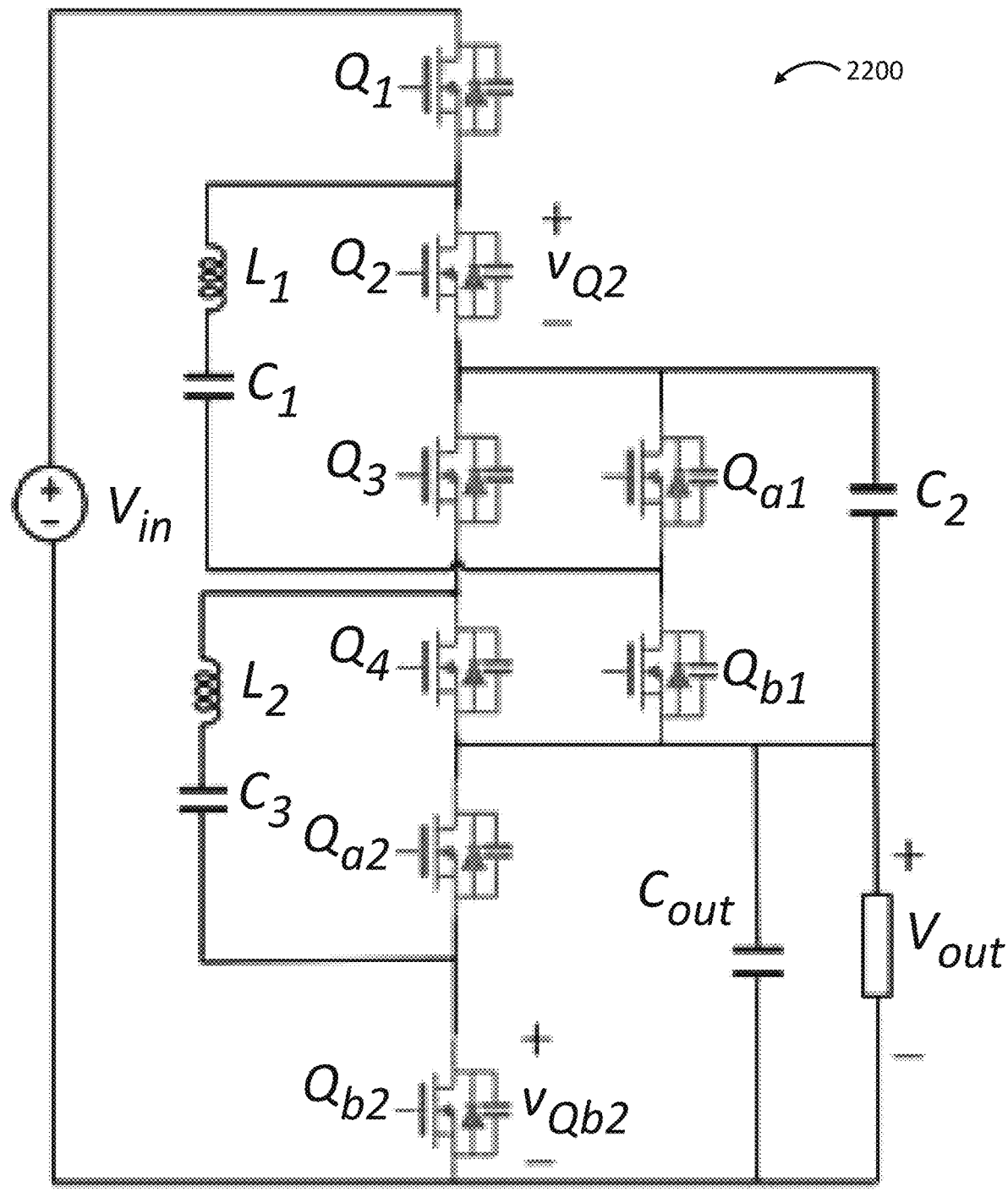

FIG. 22A depicts a schematic diagram of a 3-to-1 nominal conversion ratio Ladder TSAB converter, according to some embodiments of the present technology.

Figure 22B:
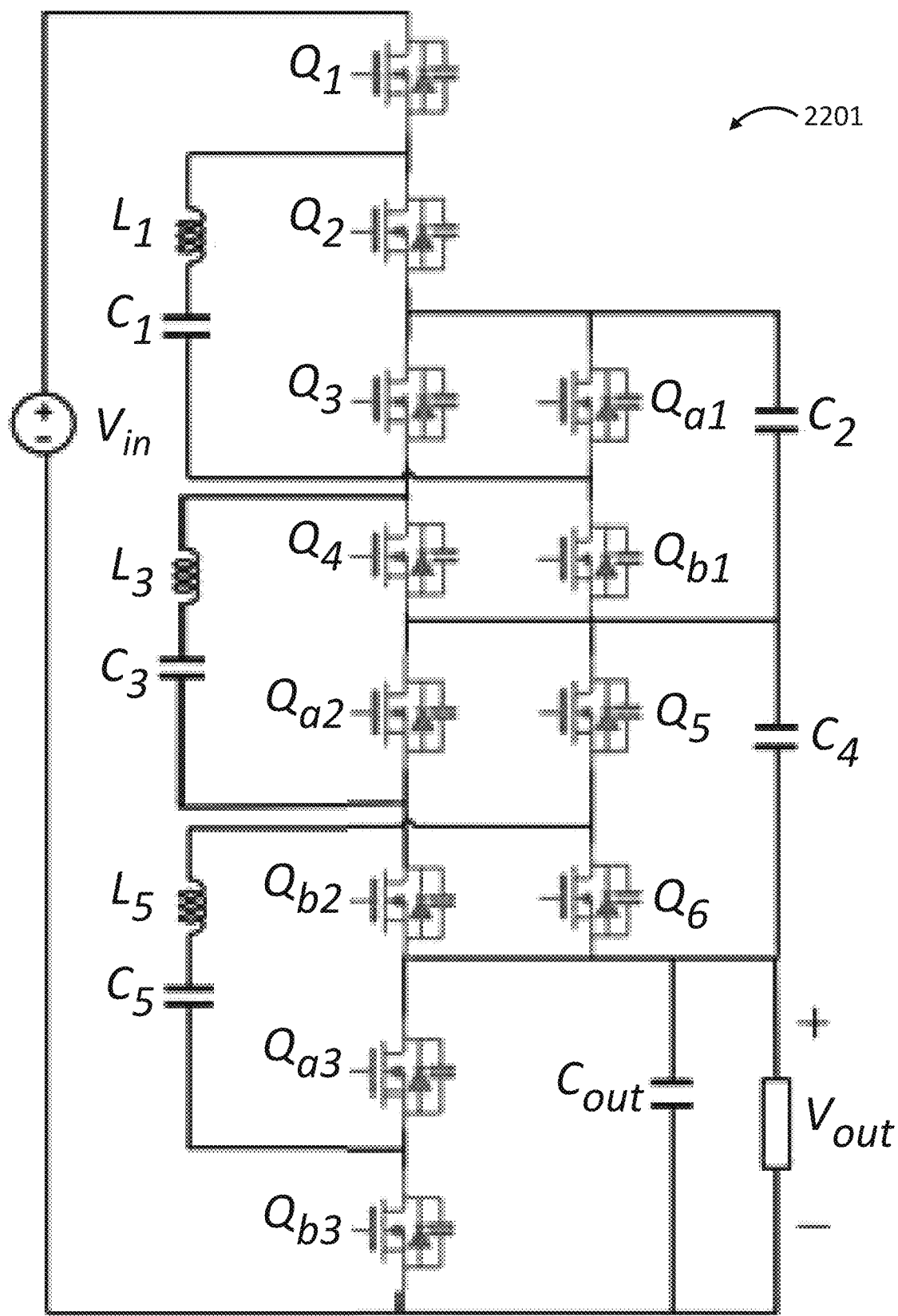

FIG. 22B depicts a schematic diagram of a 4-to-1 nominal conversion ratio Ladder TSAB converter, according to some embodiments of the present technology.

Figure 23:
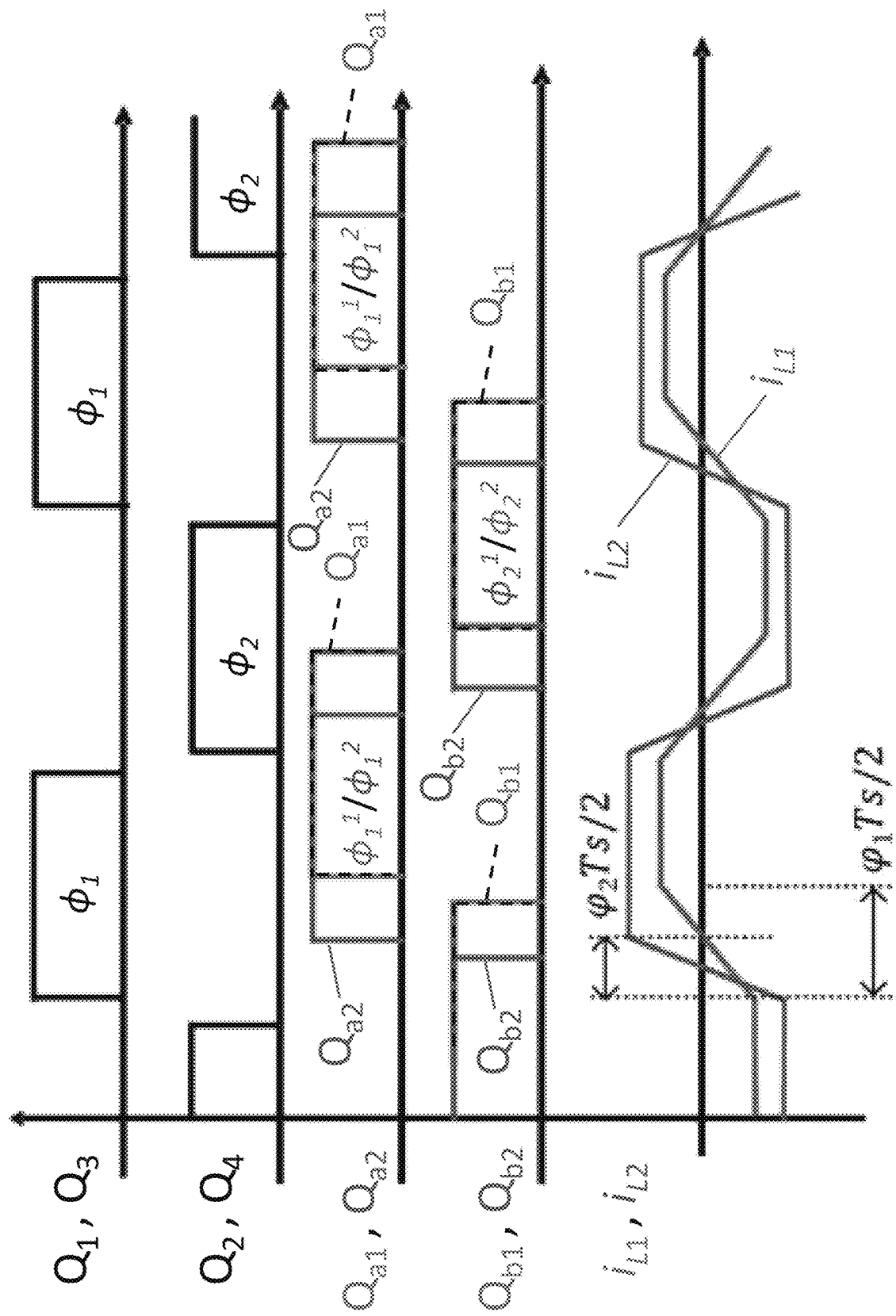

FIG. 23 depicts graphs of operating waveforms of the 3-to-1 Ladder TSAB converter of FIG. 22A, according to some embodiments of the present technology.

FIGS. 24A-24F depict schematic diagrams switched network states in the 3-to-1 Ladder TSAB converter of FIG. 22A, according to some embodiments of the present technology.

Figure 24A:
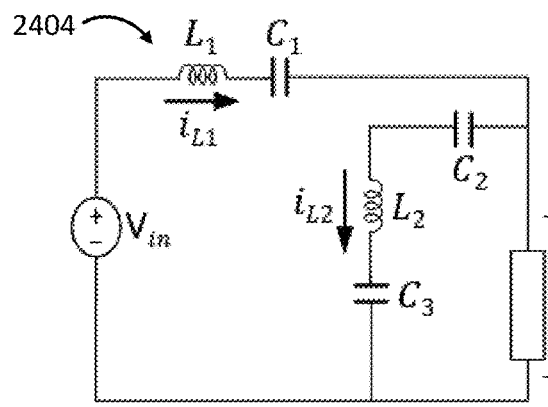
Figure 24B:
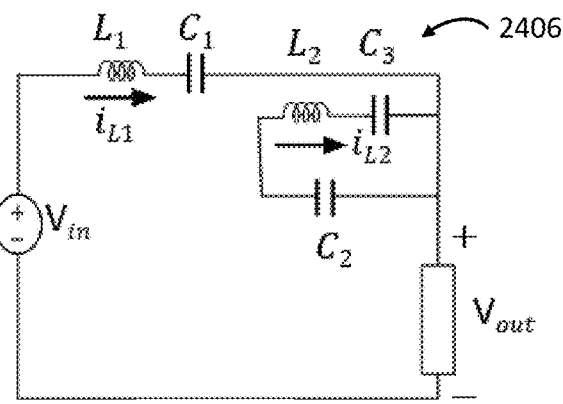
Figure 24C:
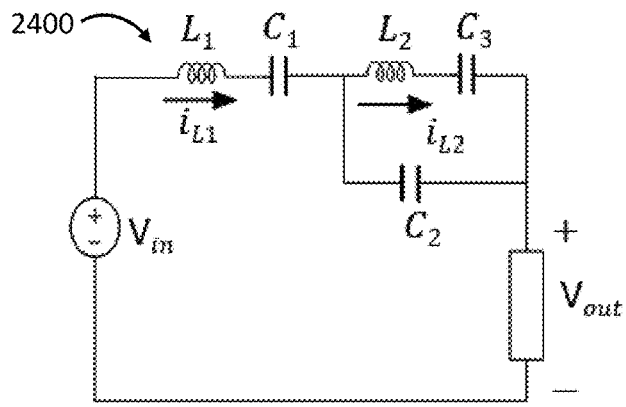
Figure 24D:
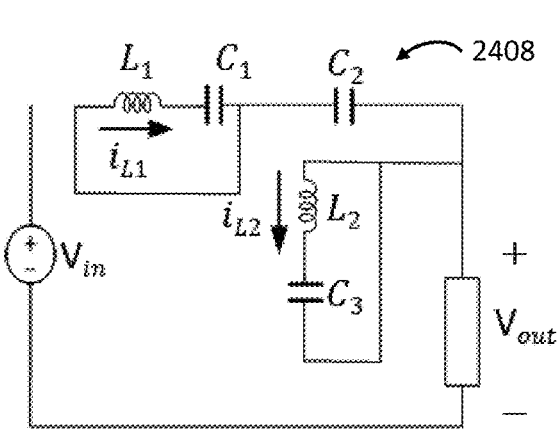
Figure 24E:
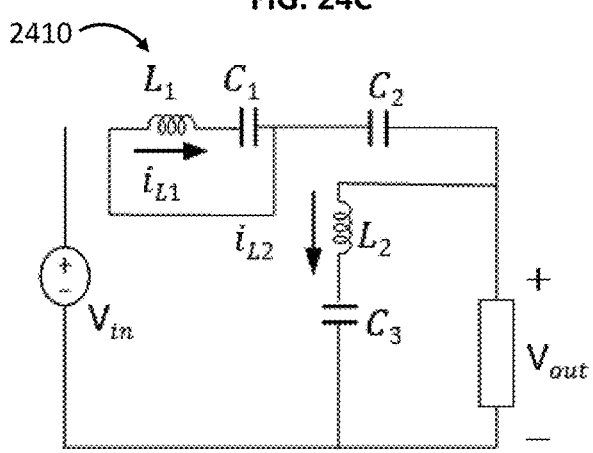
Figure 24F:
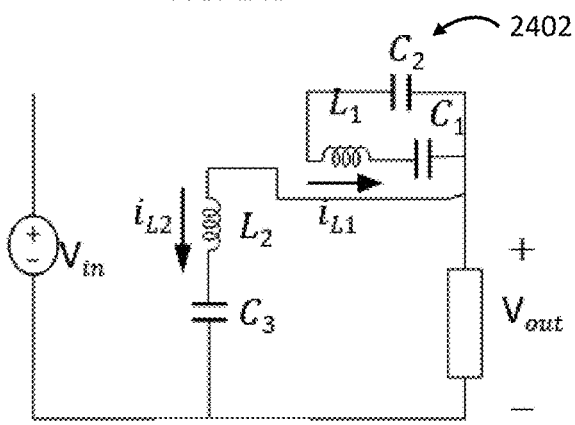
Figure 25:
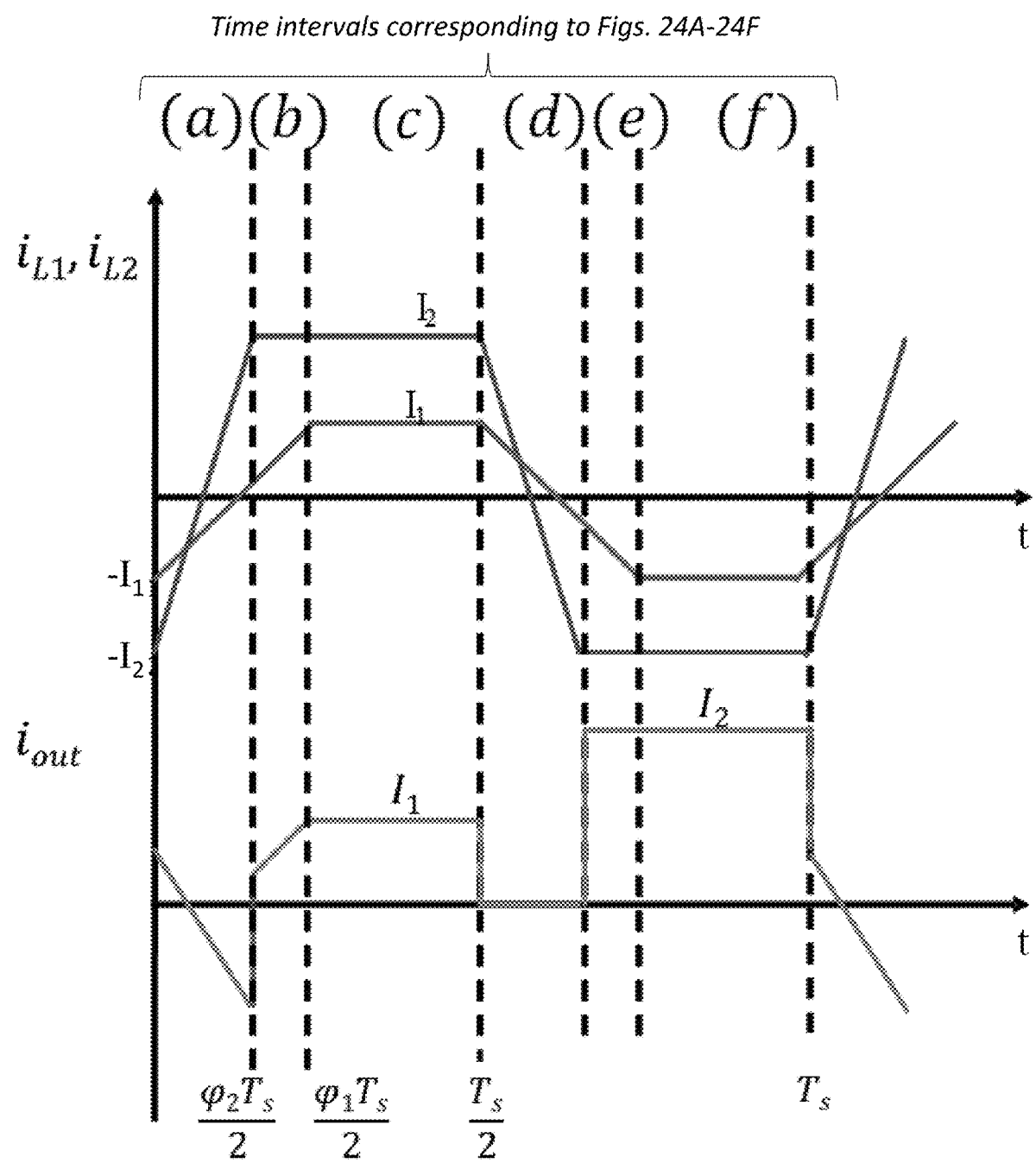

FIG. 25 depicts graphs of operating waveforms for inductor current and output current of the 3-to-1 Ladder TSAB converter of FIG. 22A, with the labeled time intervals corresponding to the switched network states in FIGS. 24A-24F, according to some embodiments of the present technology.

Figure 26:
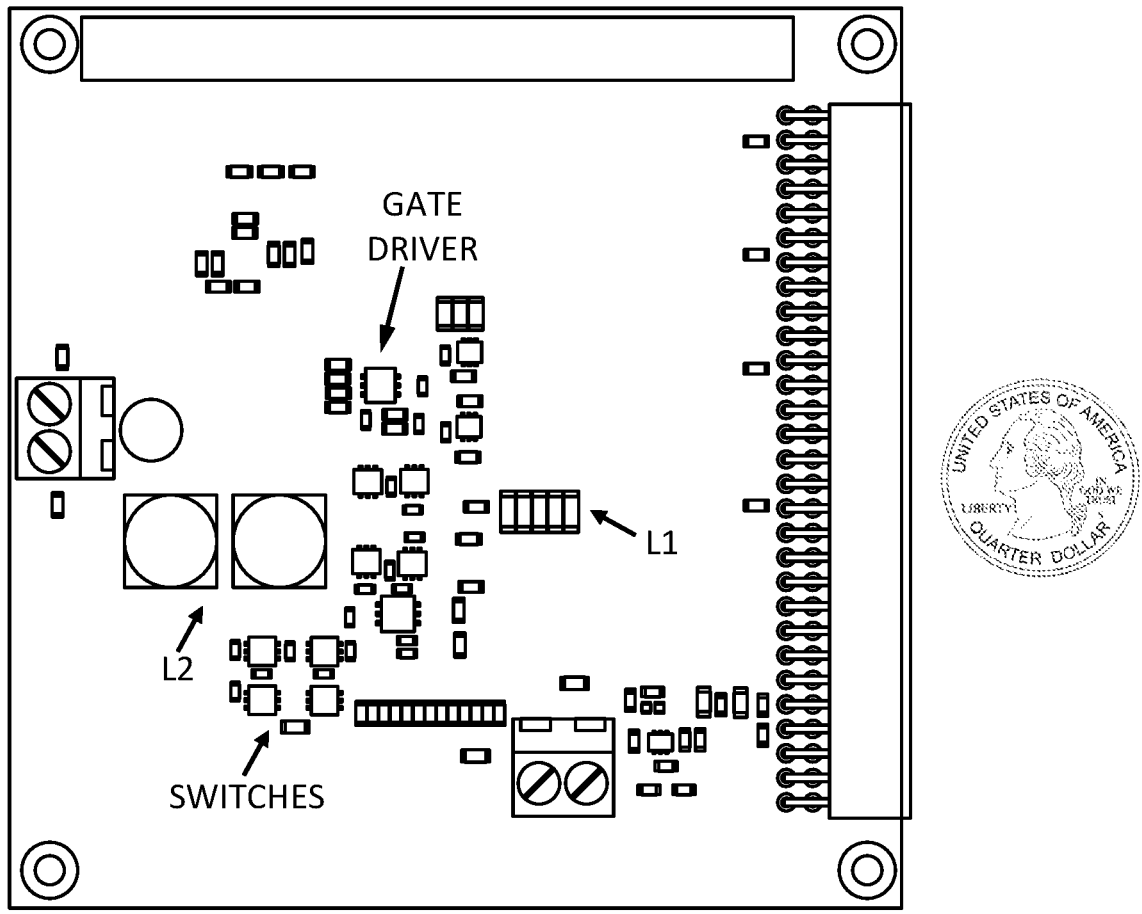

FIG. 26 depicts a photograph of a prototype 3-to-1 Ladder TSAB converter, according to some embodiments of the present technology.

Figure 27A:
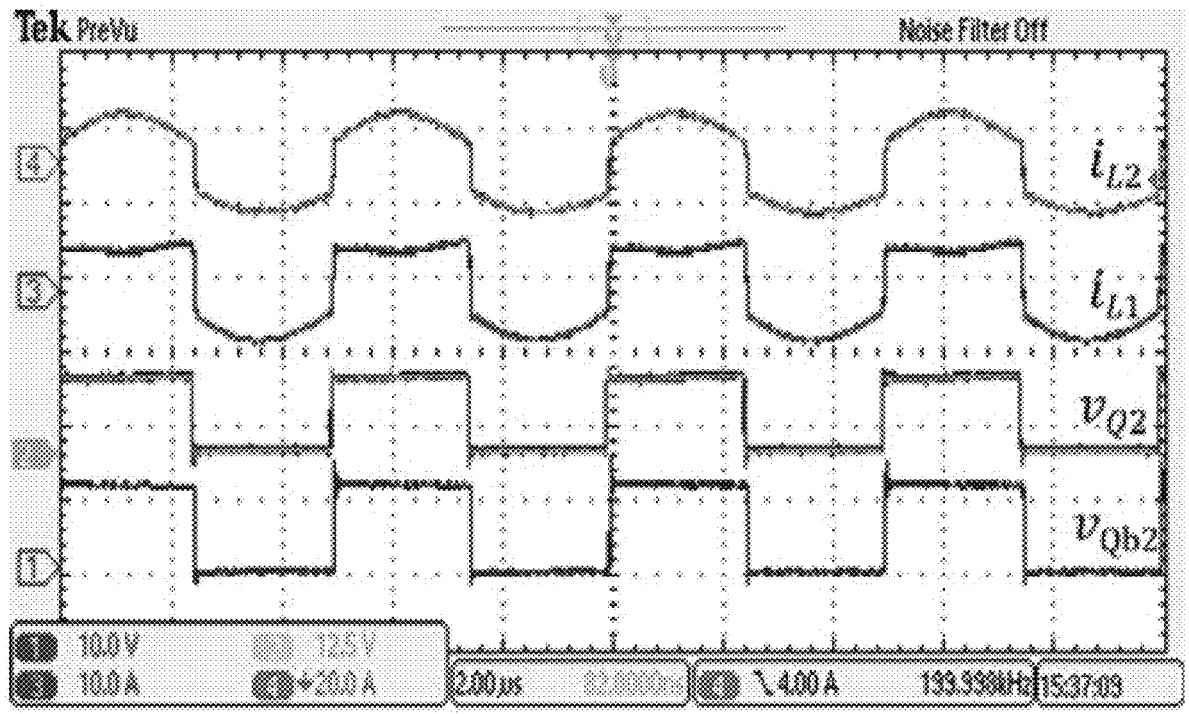
Figure 27B:
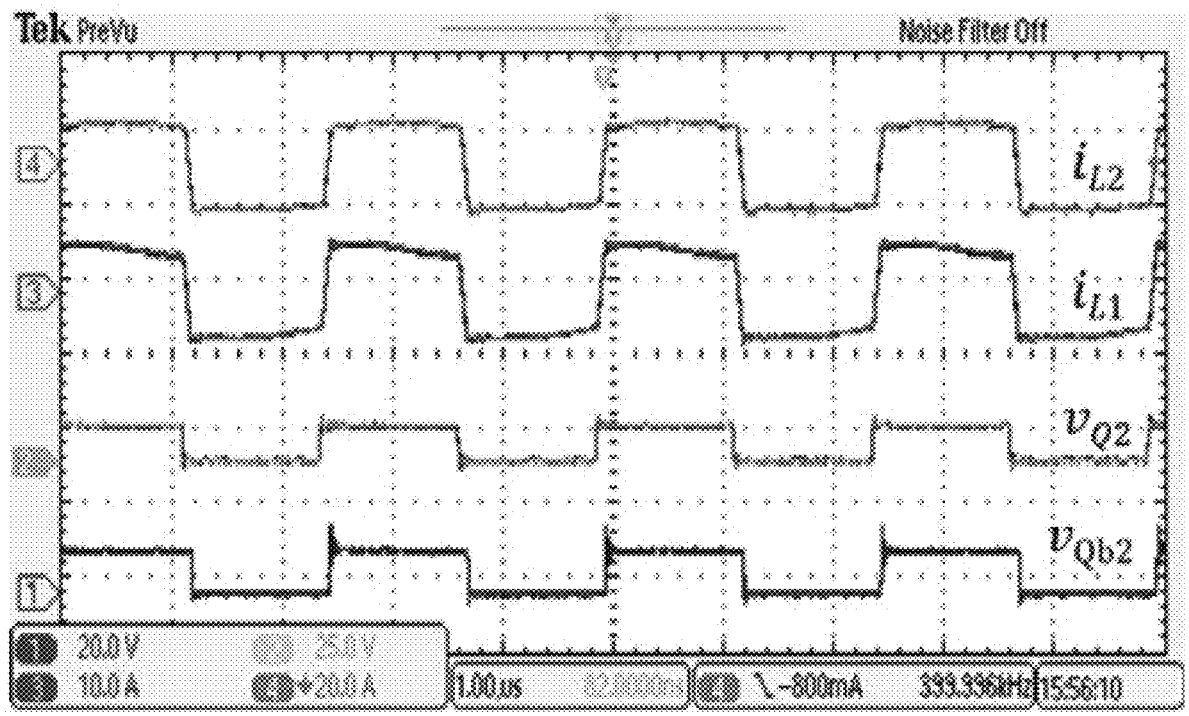

FIGS. 27A and 27B depict graphs of operating waveforms of the 3-to-1 Ladder TSAB converter prototype shown in FIG. 26, according to some embodiments of the present technology.

Figure 28A:
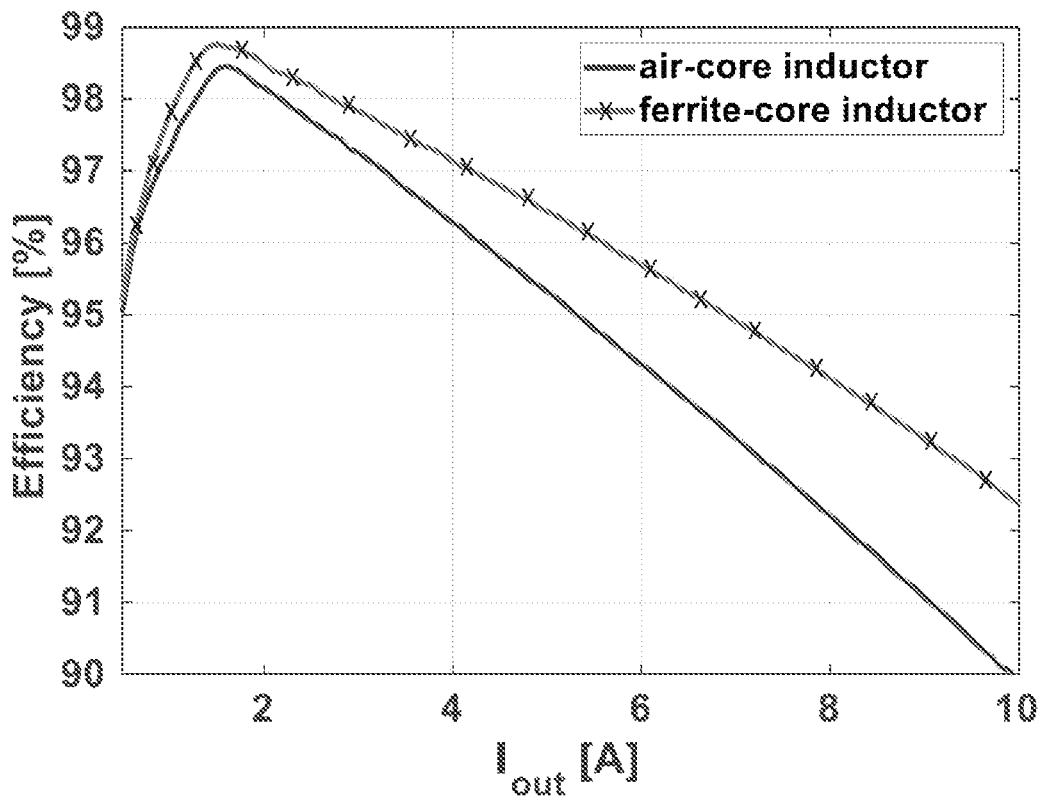
Figure 28B:
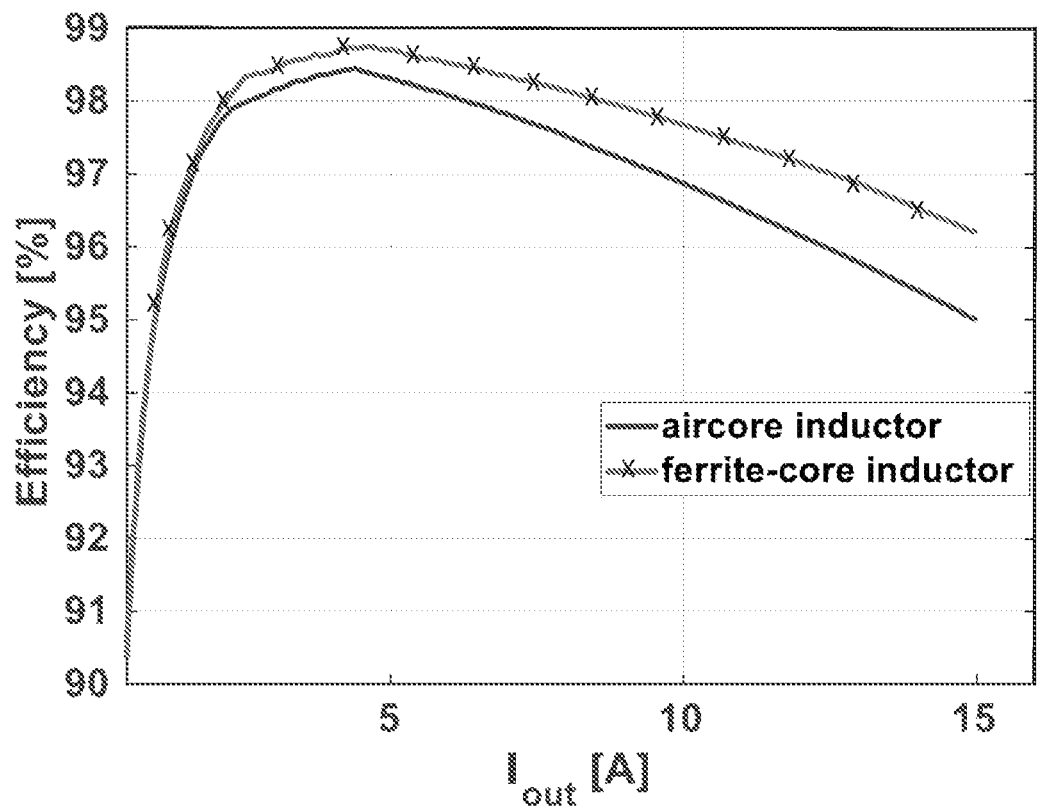

FIGS. 28A and 28B depict plots of measured efficiency for the 3-to-1 Ladder TSAB converter prototype of FIG. 26, according to some embodiments of the present technology.

Figure 29:
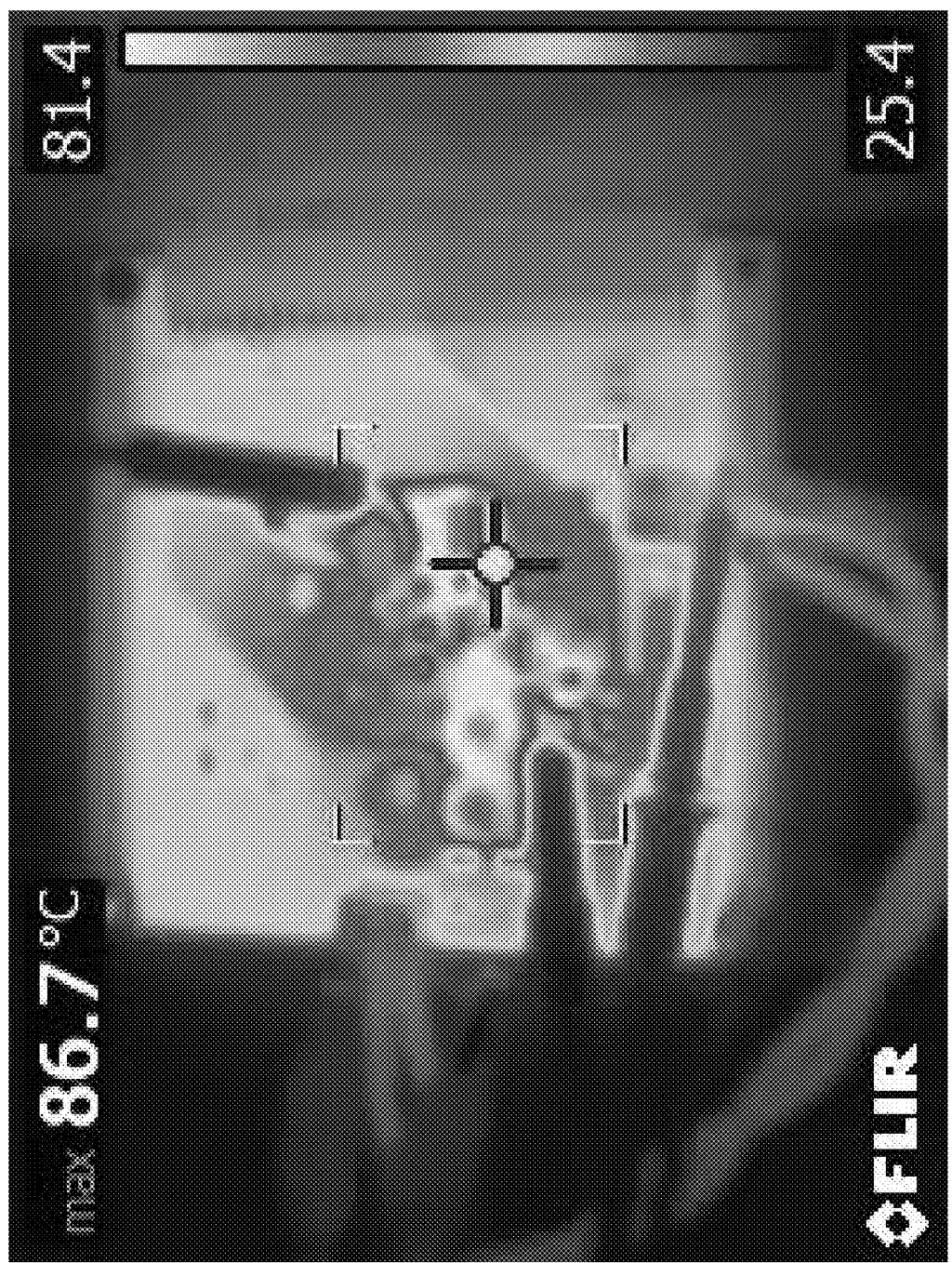

FIG. 29 depicts a thermal image of the 3-to-1 Ladder TSAB prototype of FIG. 26, according to some embodiments of the present technology.

Figure 30:
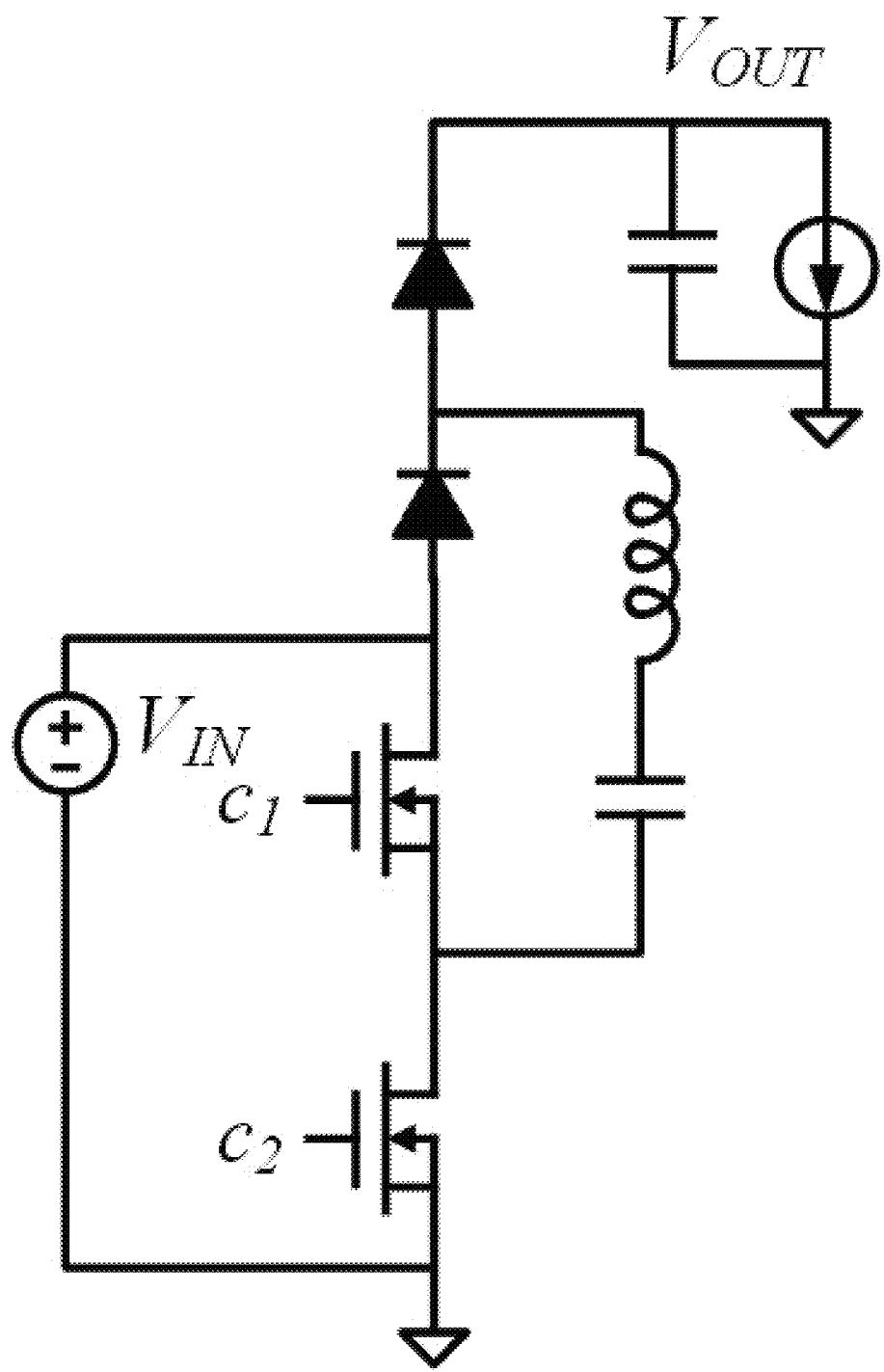

FIG. 30 depicts a schematic diagram of a 1-to-2 TSAB converter in a DC transformer (DCX) configuration, according to some embodiments of the present technology.

Figure 31:
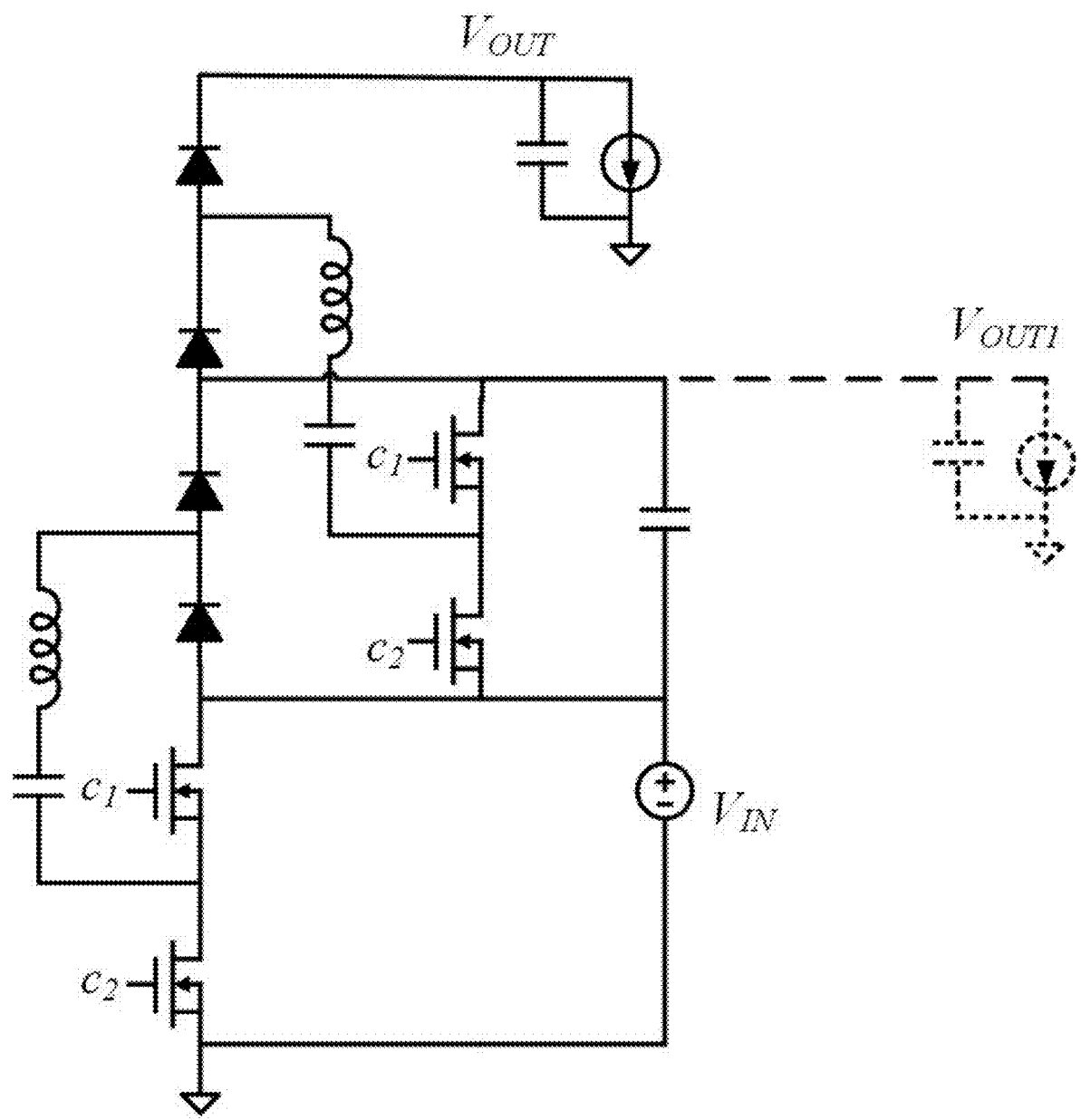

FIG. 31 depicts a schematic diagram of ladder 1-to-3 TSAB converter in a DCX configuration, according to some embodiments of the present technology.

Figure 32:
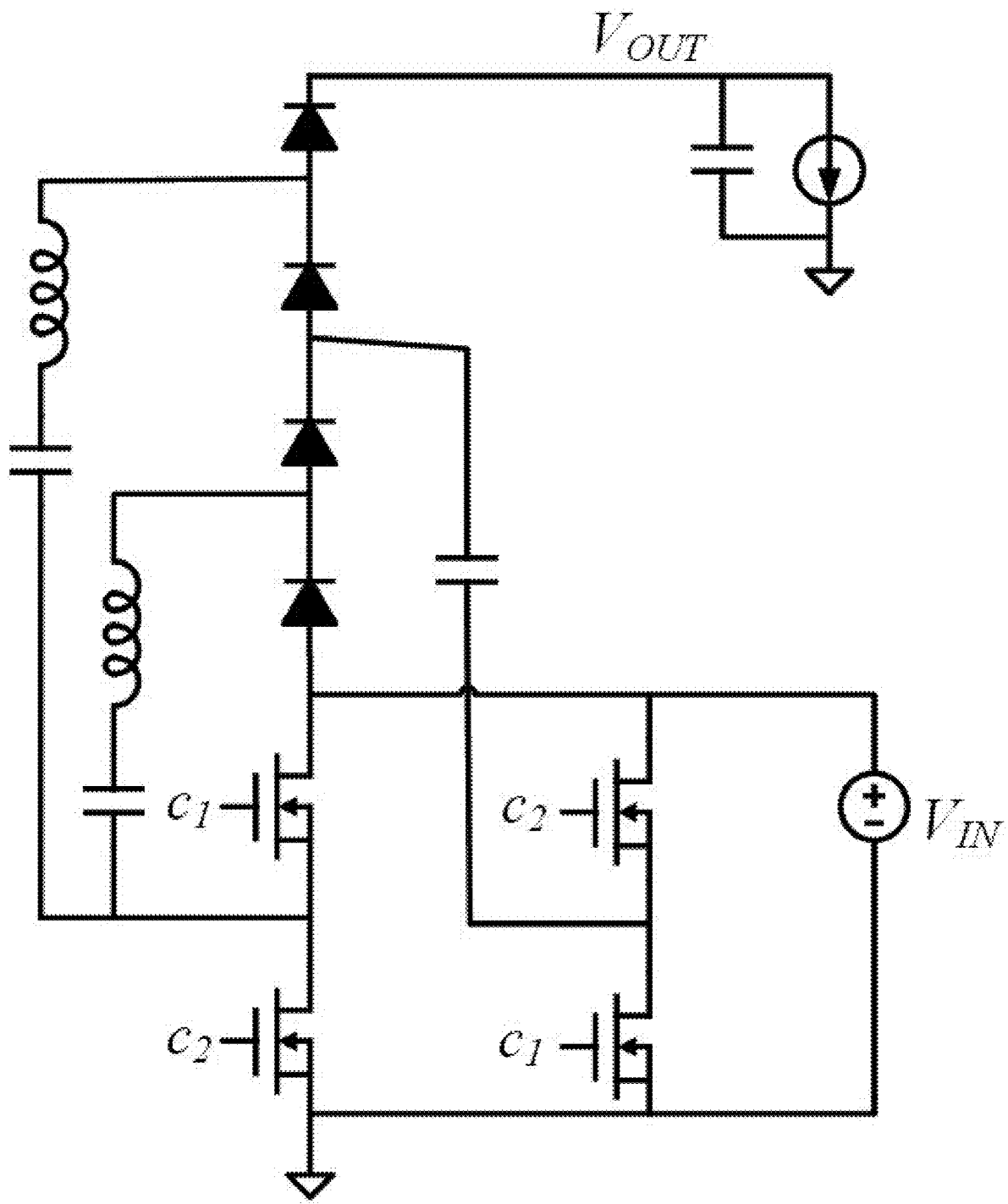

FIG. 32 depicts a schematic diagram of a Dickson-based 1-to-4 TSAB converter in a DCX configuration, according to some embodiments of the present technology.

Figure 33:
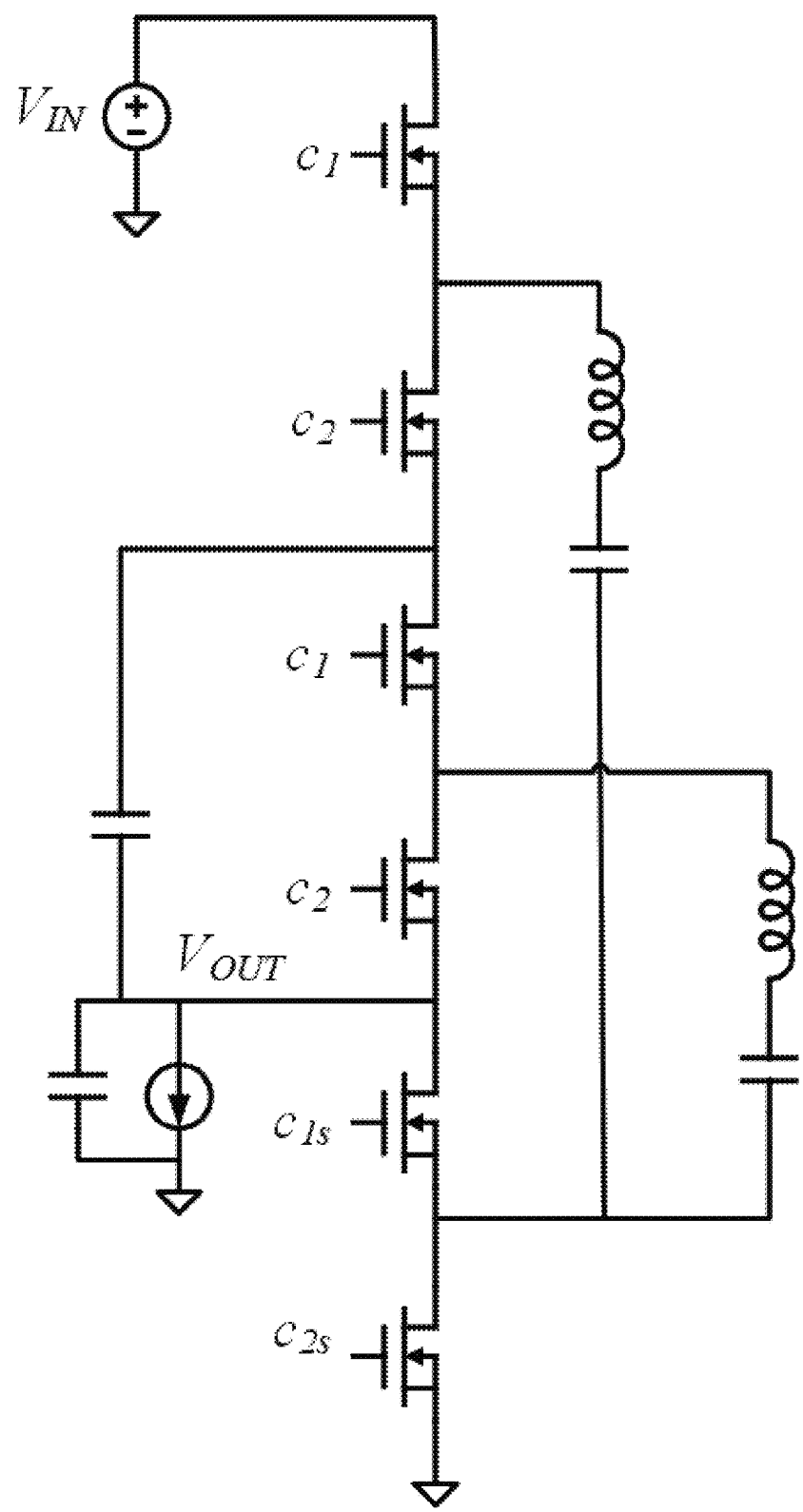

FIG. 33 depicts a 3-to-1 stacked ladder TSAB converter, according to a known embodiment.

Figure 34:
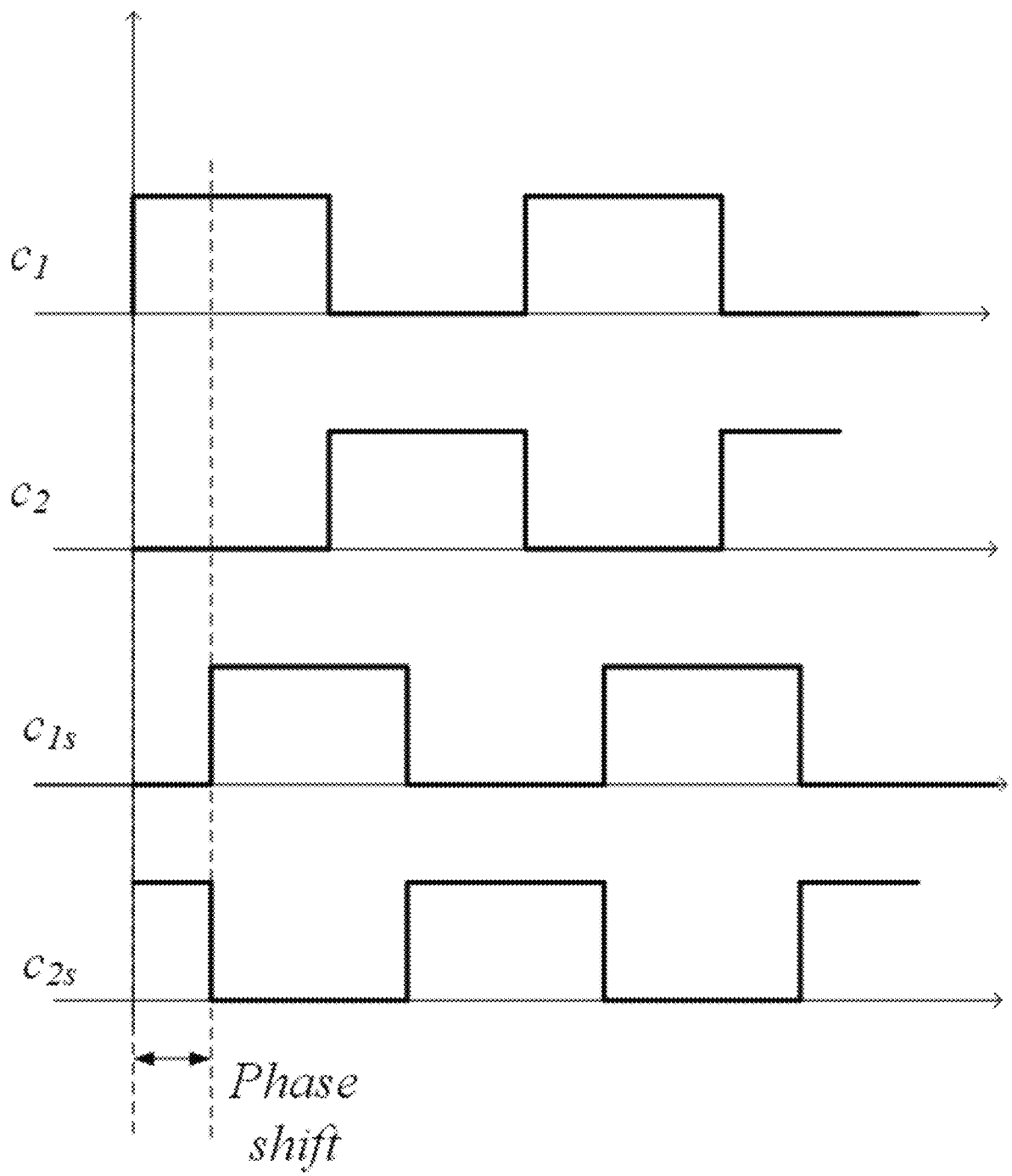

FIG. 34 depicts graphs of operating waveforms for the 3-to-1 stacked ladder TSAB converter of FIG. 33.

Figure 35:
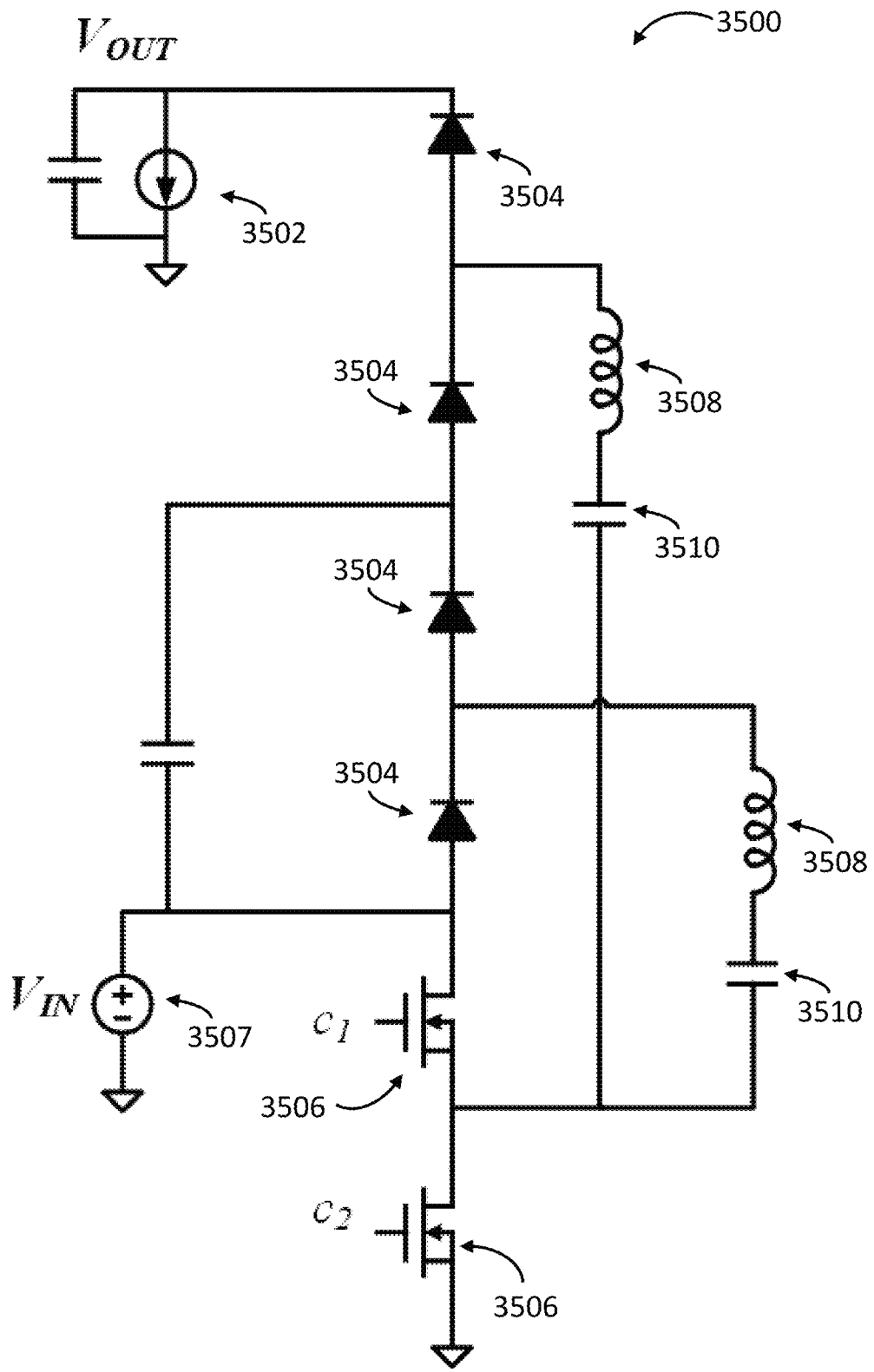

FIG. 35 depicts a schematic diagram of a step-up DCX version of the stacked ladder TSAB converter of FIG. 33, according to some embodiments of the present technology.

Figure 36A:
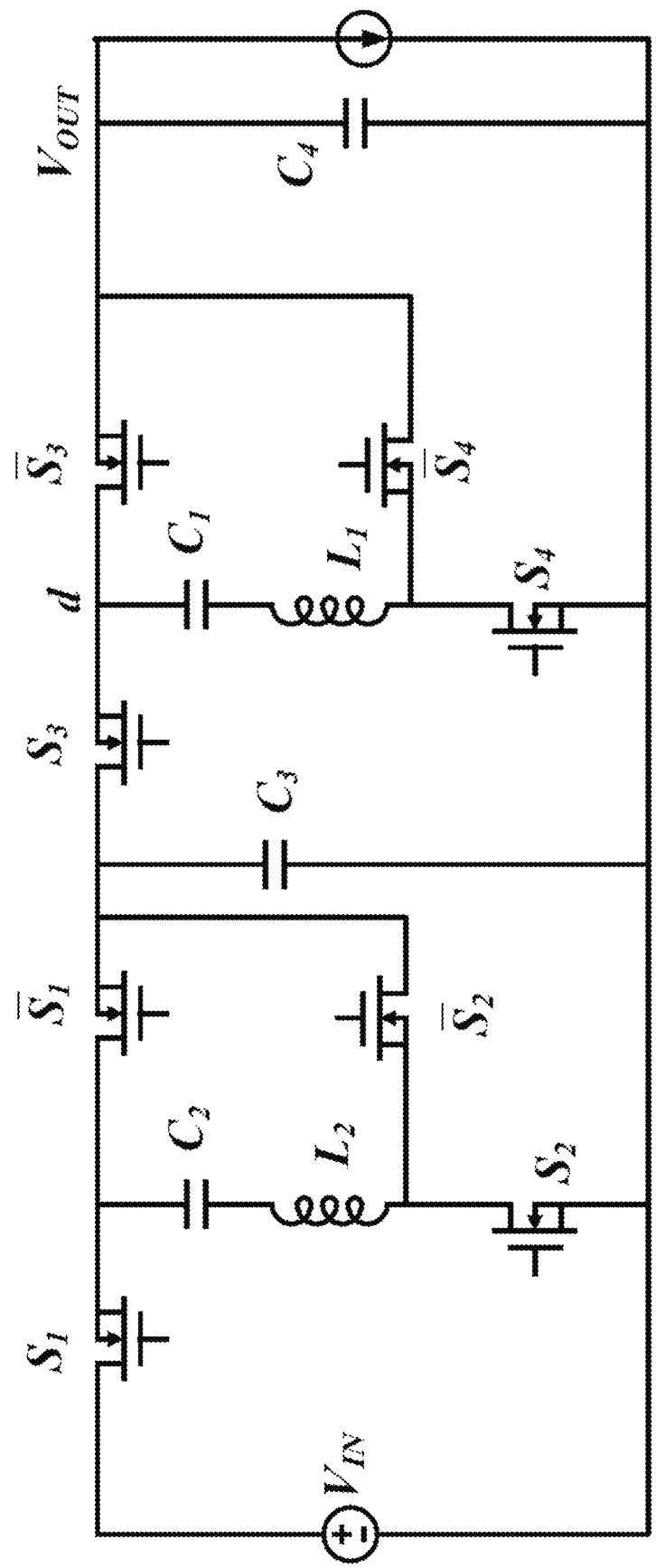

FIG. 36A depicts the schematic diagram of a 4-to-1 doubler TSAB, according to some embodiments of the present technology.

Figure 36B:
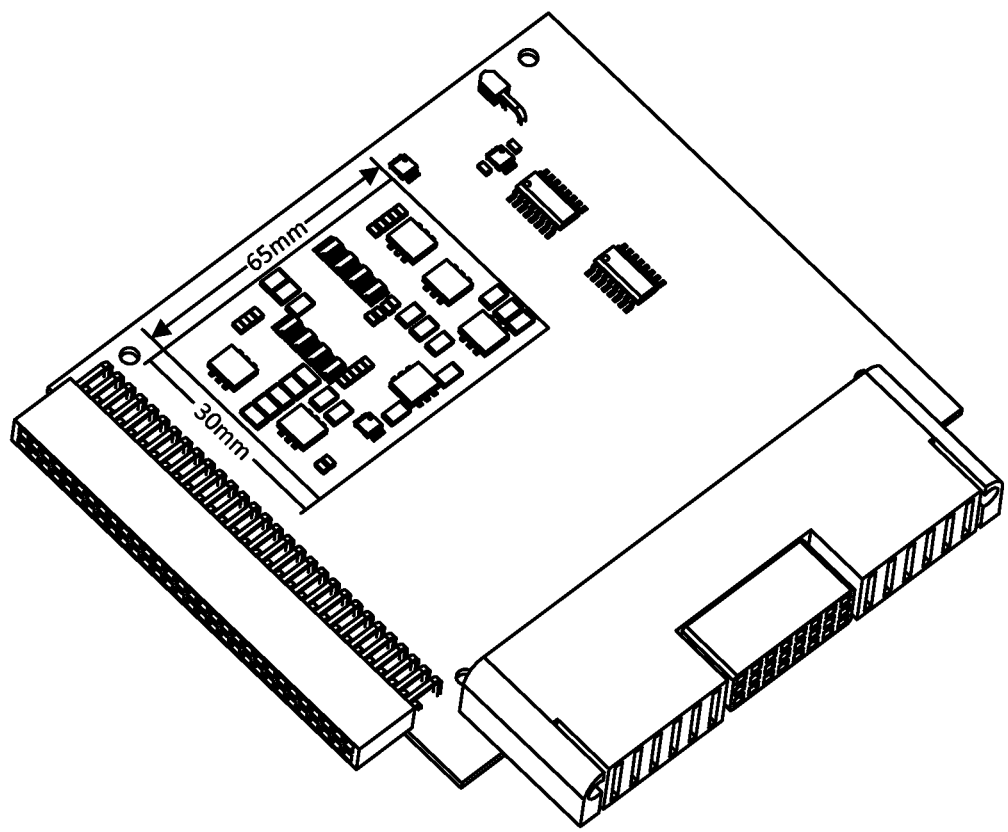

FIG. 36B depicts a 48V-12V prototype of the 4-to-1 doubler TSAB of FIG. 36A, according to some embodiments of the present technology.

Figure 36C:
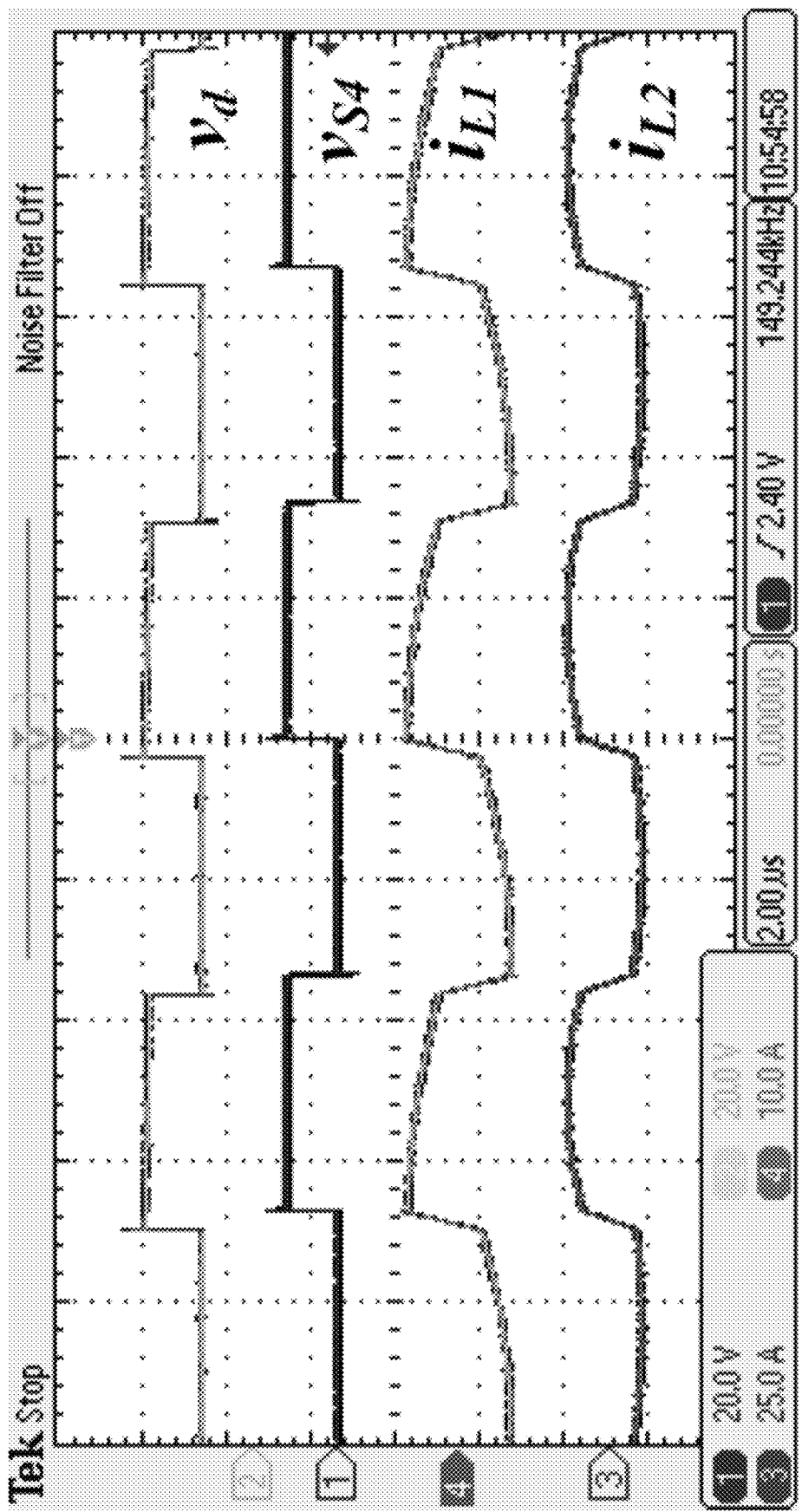

FIG. 36C depicts graphs of operating waveforms of the prototype 4-to-1 doubler TSAB of FIG. 36B, according to some embodiments of the present technology.

Figures 37A, 37B:
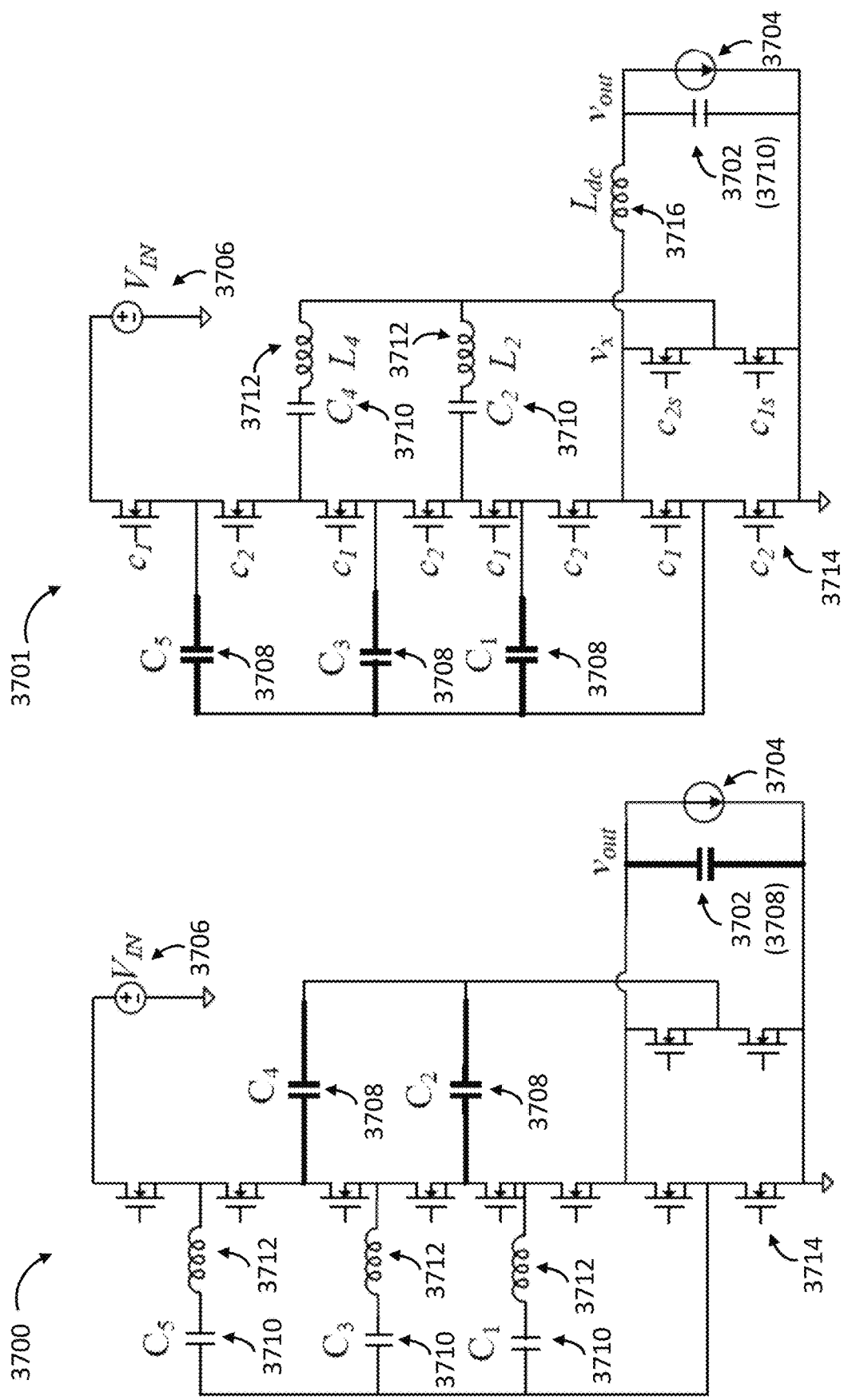
Figure 38A:
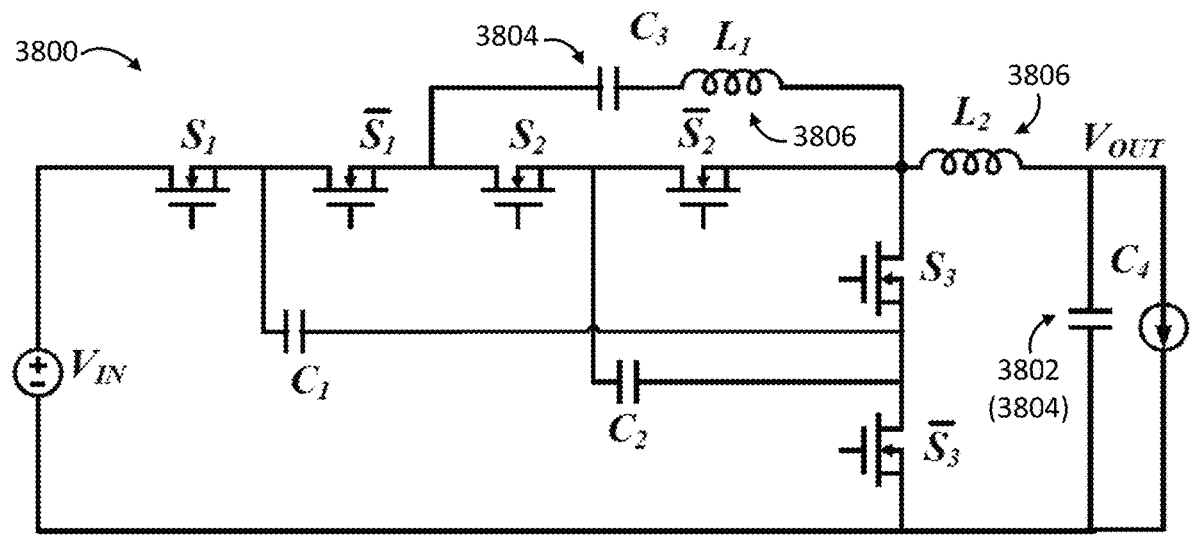
Figure 38B:
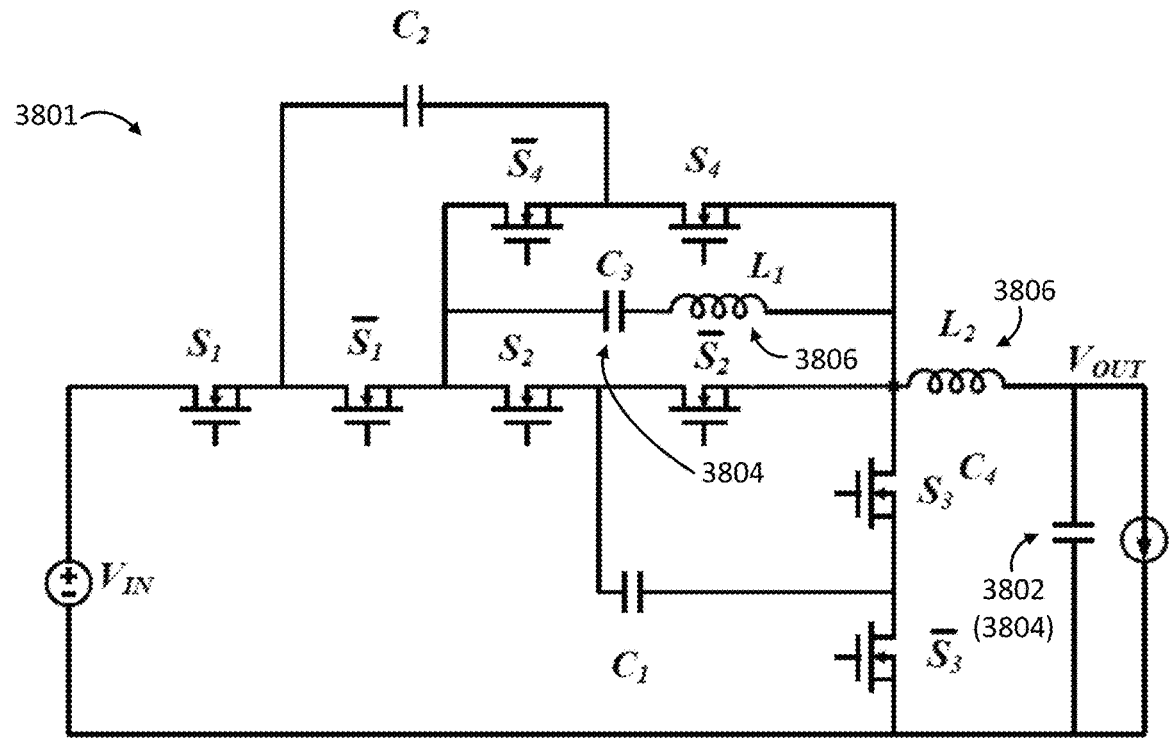
Figure 38C:
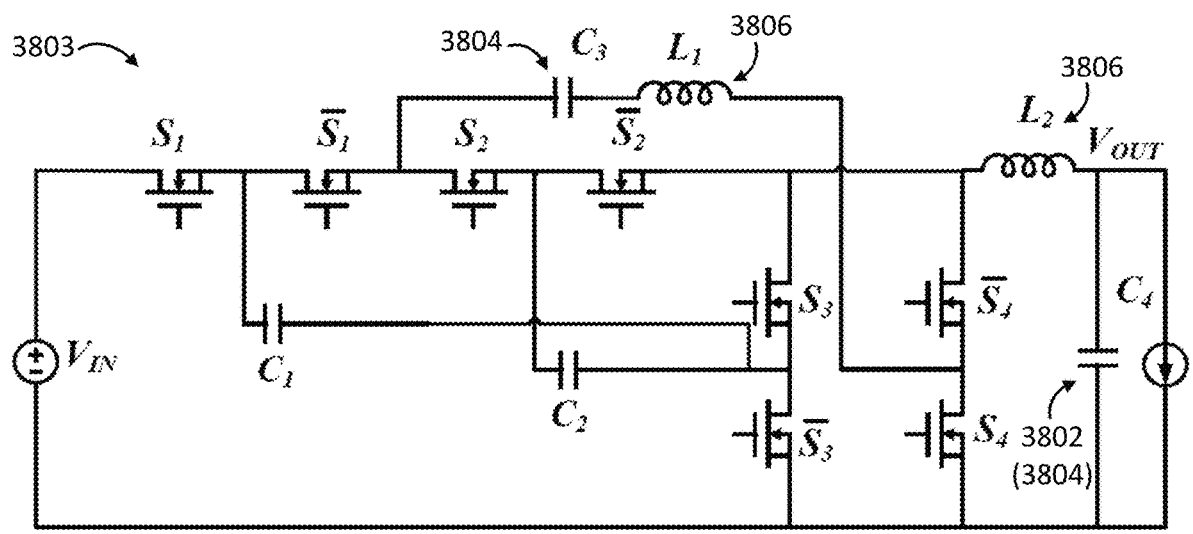
Figure 38D:
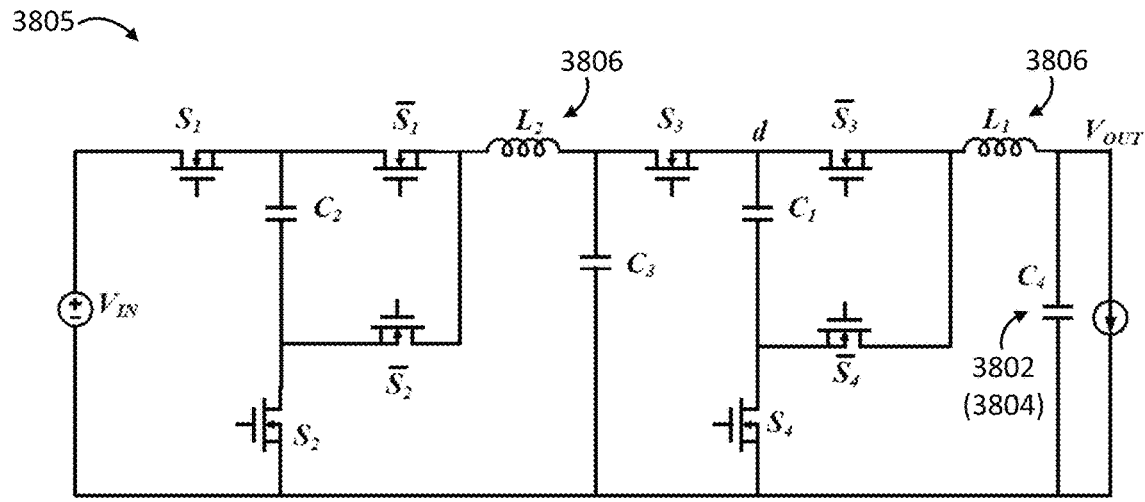
Figure 38E:
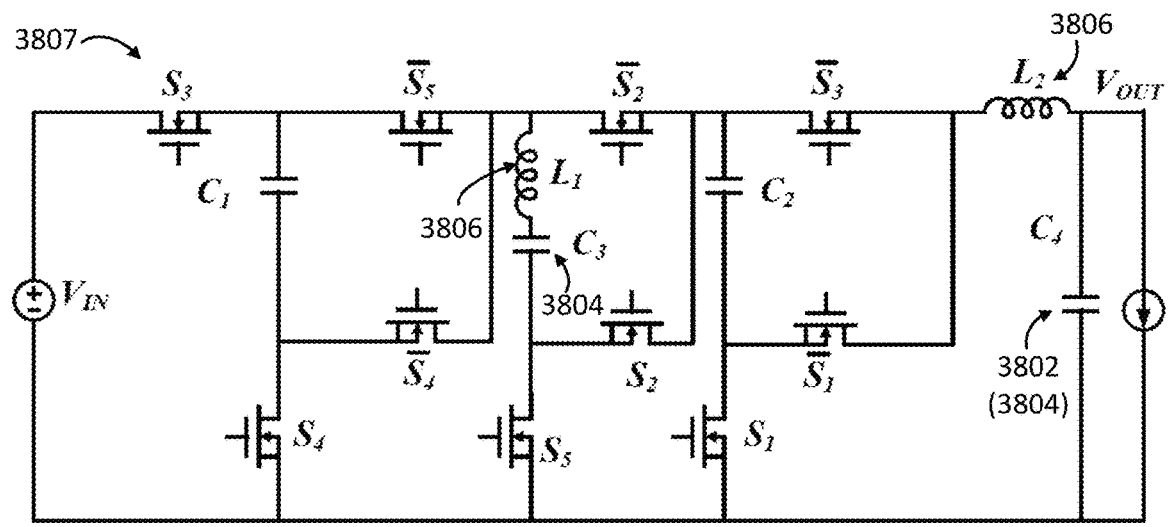
Figure 38F:
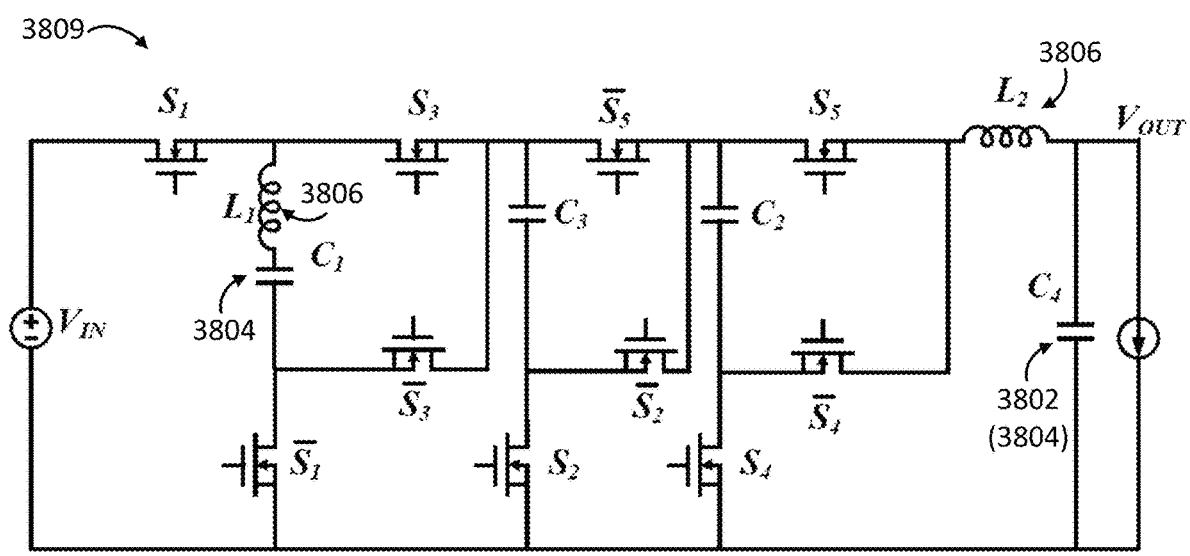

FIGS. 37A and 37B depict a schematic diagrams of 6-to-1 Dickson TSAB converters with output capacitors, according to some embodiments of the present technology.

FIGS. 38A-38F depict a schematic diagrams of variations of TSAB DC-to-DC power converters with an output capacitor as a link capacitor, according to some embodiments of the present technology.

Figure 39:
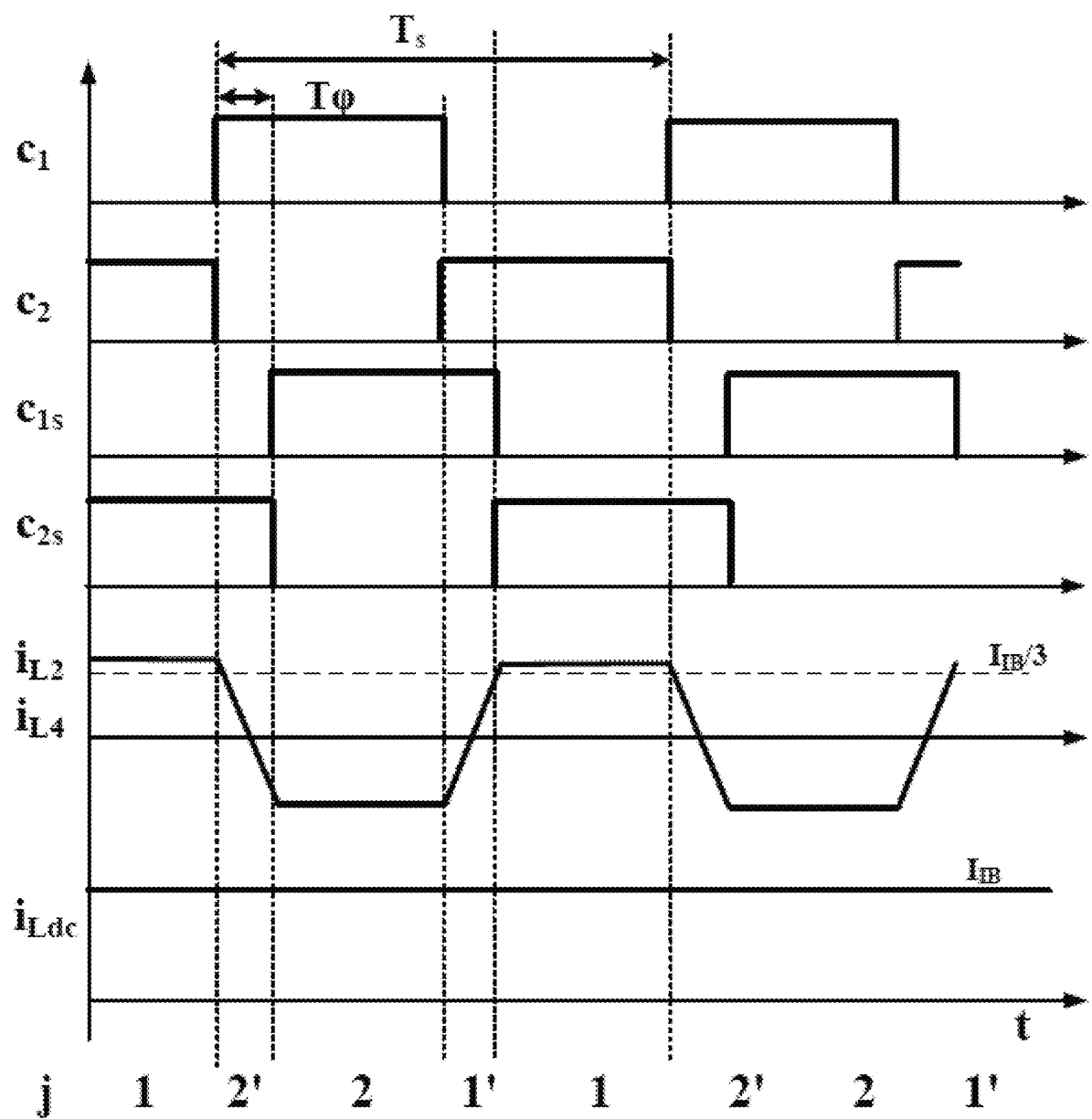

FIG. 39 depicts a graph of operating waveforms in the 6-to-1 Dickson TSAB converter shown in FIG. 37B, according to some embodiments of the present technology.

Figure 40:
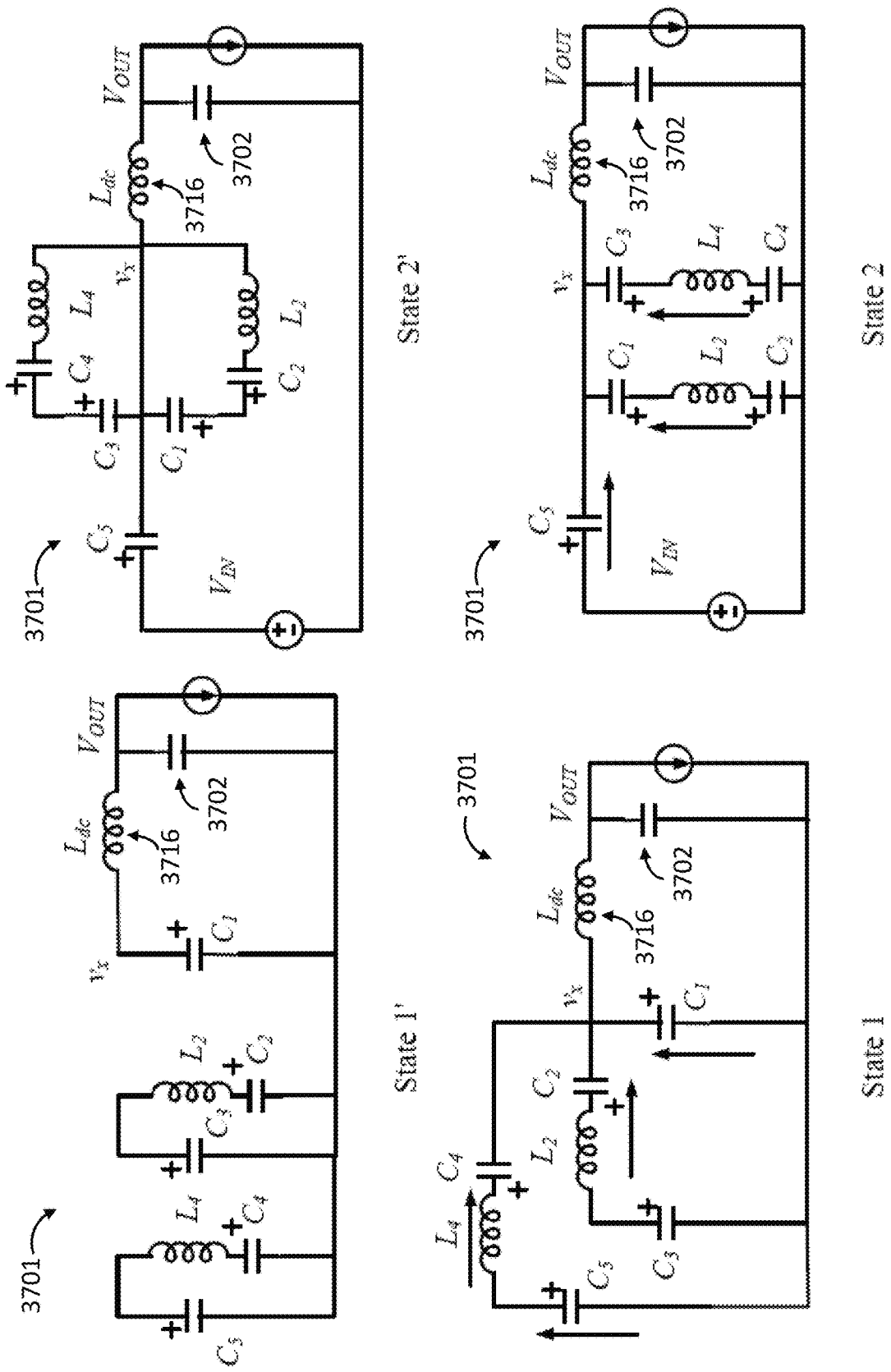

FIG. 40 depict schematic diagrams of four different switched states for the TSAB converter shown in FIG. 37B operated according to the control scheme demonstrated by the graph of FIG. 39B.

Figure 41A:
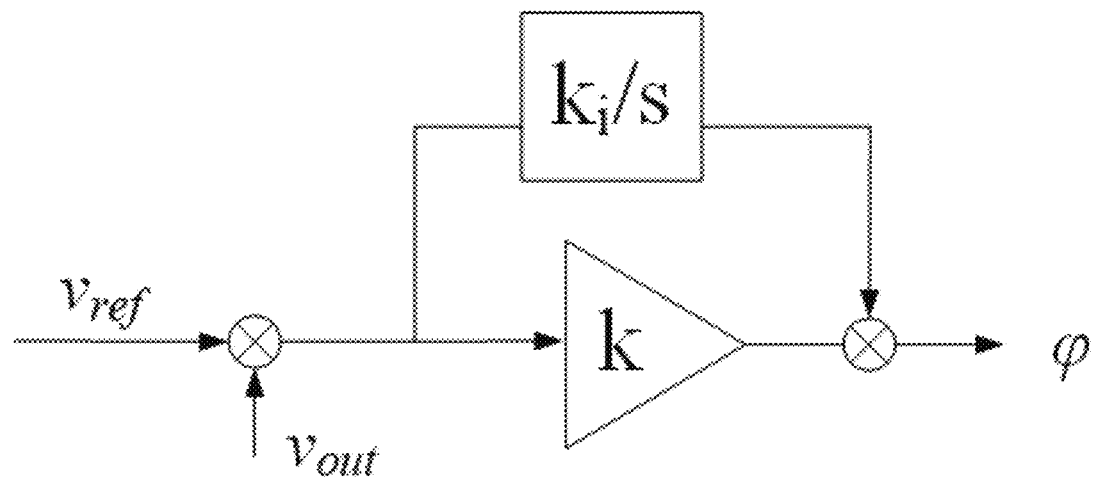

FIG. 41A depicts a schematic diagrams of a classic scalar feedback controller architecture.

Figure 41B:
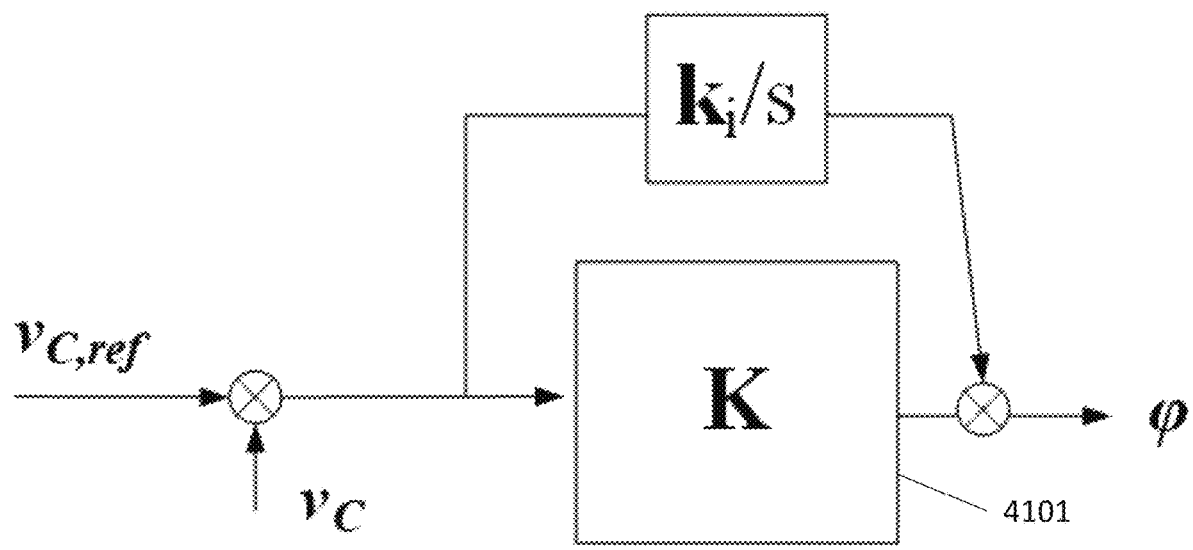

FIG. 41B depicts a schematic diagram of a vectorized feedback controller architecture, according to some embodiments of the present technology.

Figure 42:
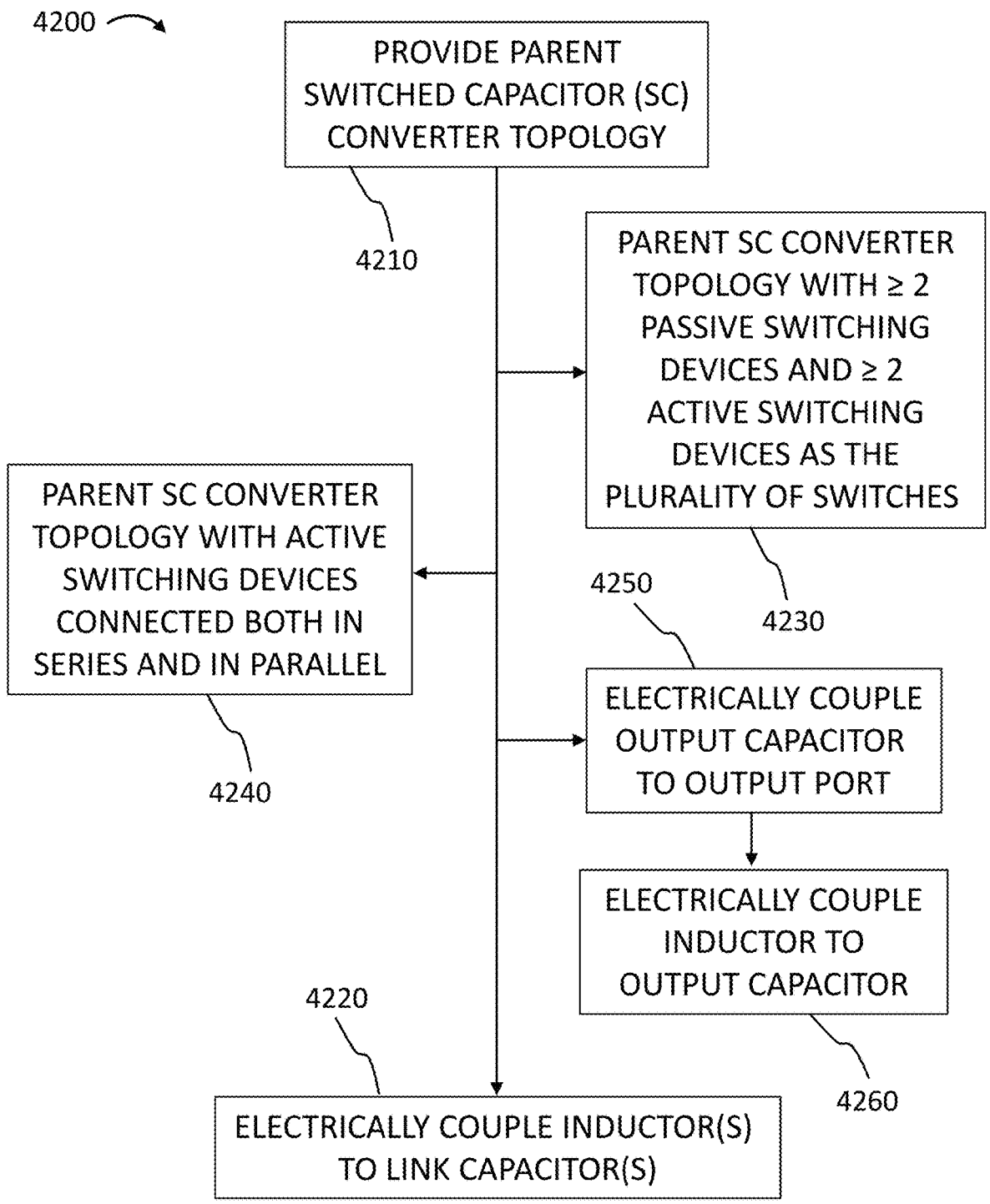

FIG. 42 depicts a flow chart of a method of manufacturing a DC-to-DC power converter, according to an embodiment of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to power converter devices and methods. More specifically, some embodiments relate to transformerless stacked active bridge converter devices, systems, and methods for direct current (DC)-to-DC power conversion applications.

The present disclosure describes a family of Transformerless Stacked Active Bridge (TSAB) DC-DC switching power converters capable of high step-down or step-up conversion ratio without the need for an isolation transformer. TSAB power converters consist of power semiconductor switches, DC blocking capacitors, and small inductors that carry AC currents. In TSAB power converters, device current stresses and therefore conduction losses are low, while the majority of switching devices operate under soft, zero-voltage-switching conditions so that switching losses are low. Consequently, high step-down or step-up DC-DC conversion can be achieved with very high efficiency and very high power density in DC power distribution systems, data centers, servers, information technology systems, automotive systems, renewable energy systems, and other applications.

Dual Active Bridge (DAB) converters are transformer isolated DC-DC converters which can achieve very high efficiency when operated at conversion ratios close to their respective transformer turns ratios. If unregulated, a DAB converter can be viewed as a "DC-transformer" (DCX), e.g., as a converter with essentially fixed conversion ratio. At the expense of some loss in efficiency, the DAB converter also offers voltage regulation capabilities using phase shift control. Because of these features, DAB converters have found applications as ultra-high-efficiency step-up/down converters. However, in low-to-medium power applications where space is limited and isolation is not required, a bulky and lossy transformer is a disadvantage, and transformerless converters having "DAB-like" features are of interest.

Figure 1A:
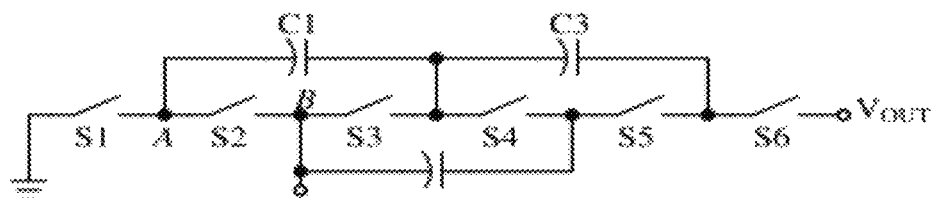
FIGS. 1A-1E depict schematic diagrams of conventional switched capacitor (SC) direct current (DC)-to-DC converters.
Figure 1B:
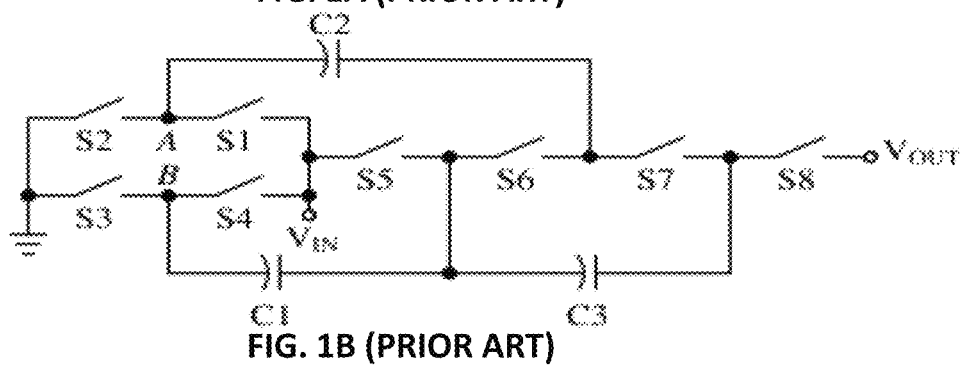
Figure 1C:
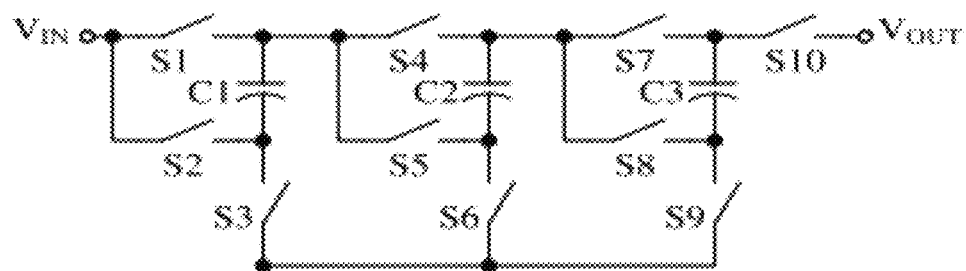
Figure 1D:
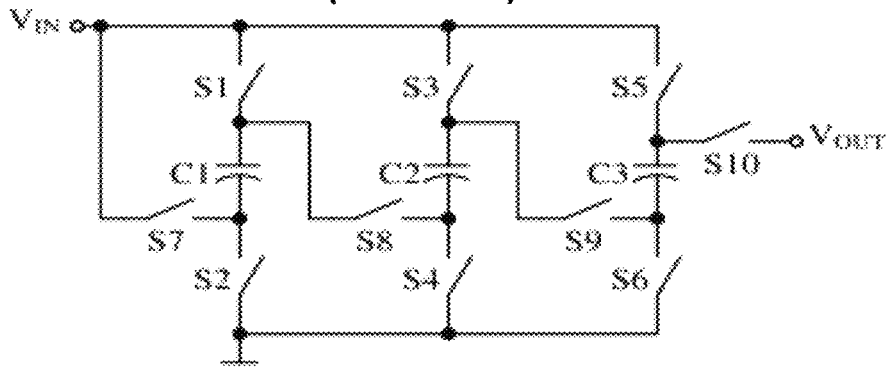
Figure 1E:
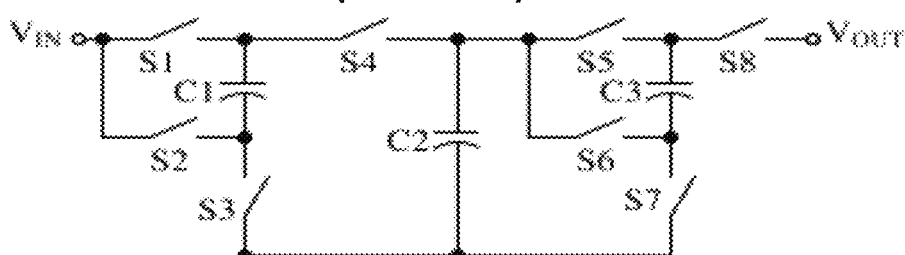
Figure 2:
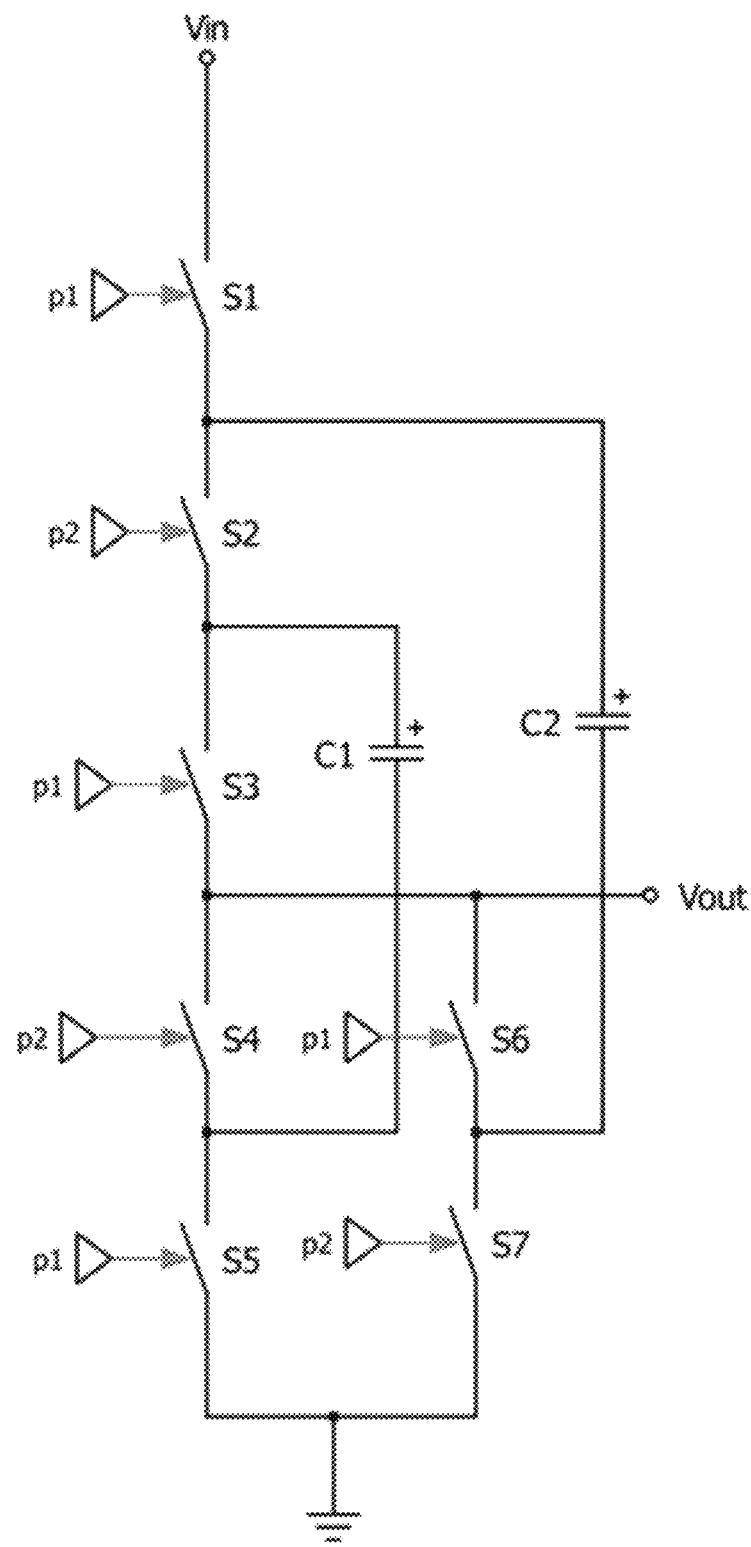
FIG. 2 depicts a schematic diagram of a modified version of the Dickson SC converter of FIG. 1B.

FIGS. 1A-1E depict schematic diagrams of conventional switched capacitor (SC) direct current (DC)-DC converters. FIG. 2 depicts a schematic diagram of a modified version of the conventional SC converter of FIG. 1B. Switched-capacitor (SC) converters, such as the conventional converter topologies shown in FIGS. 1A-1E and 2, can be viewed as ways to achieve non-isolated DCX-like conversion with nearly fixed conversion ratio determined by the converter topology. Unfortunately, SC converters have significant losses associated with "hard" capacitor charging/discharging, as well as significant losses associated with "hard" switching of power semiconductor switches. For these reasons, SC converters are usually limited to relatively low power applications.

Various approaches have been previously explored to achieve soft charging as well as soft switching by incorporating inductive elements in SC topologies. The operation of these hybrid SC-based converters can be categorized by the switching frequency $f_{sw}$ to resonant frequency $f_r$ ratio $f_{sw}/f_r$. In particular, resonant switched-capacitor (RESC) converters, and switched tank converters are designed to operate close to resonance ($f_{sw}/f_r \approx 1$), which results in DCX-like behavior with essentially constant DC conversion ratio. These converters have no or very limited abilities to control or regulate DC voltage or current. Close-to-resonance operation also results in higher device root-mean-square (RMS) and peak current stresses. Furthermore, operation can be adversely affected by inductive and capacitive component tolerances, and significant capacitance voltage bias dependences, as is the case with many types of ceramic capacitors. Operation of hybrid converters above resonance has been discussed, but those previous works have been limited to specific converter configurations.

There is a general need for converters that can achieve large step-down or step-up conversion ratios without isolation transformer, while exposing components to low current and voltage stresses, operating switching devices under soft zero-voltage switching conditions, allowing for practical component tolerances, and having capabilities of controlling output dc voltage or current without the need for additional converter stages. This disclosure describes Transformerless Stacked Active Bridge switching power converters that overcome deficiencies identified the art, and achieve the desired characteristics leading to high efficiency, high power density solutions in DC power distribution systems, data centers, servers, information technology systems, automotive systems, renewable energy systems, and other applications, and across a wide range of applications involving low, medium, or high power, with enhanced capabilities for component miniaturization.

Transformerless stacked active bridge (TSAB) converters are hybrid DC-to-DC converters that combine features of switched capacitor (SC) and dual-active-bridge (DAB) converters, and can achieve very high efficiency near their nominal conversion ratio, together with regulation capability using simple phase-shift control. Following a network-theoretic approach, this present disclosure describes a systematic procedure for synthesis of TSAB converters starting from two-phase SC converters such as ladder, Dickson, Fibonacci, and other SC topologies. Furthermore, the same approach yields general topology-dependent properties of TSAB converters, including steady-state characteristics and component stresses.

The TSAB converters according to the present technology include at least one, or a plurality of, AC inductors, a plurality of DC blocking capacitors and a plurality of semiconductor switches. In some embodiments of the present technology, each of the plurality of switches of the TSAB converters is an active switching device including, for example and without limitation, a MOSFET. In other embodiments of the present technology, the plurality of switches of the TSAB converters include at least two active switching devices and at least two passive switching devices including, for example and without limitation, at least two diodes. The arrangement of the circuit components and the disclosed control schemes and associated methods for the switches enable a variety of advantageous technical effects and practical benefits, including:

- Step-down or step-up conversion ratio, nominally equal to N-to-1 or 1-to-N, where N is a positive integer.
- Unidirectional or bidirectional power flow.
- All capacitors can be DC blocking capacitors, which means that the capacitor voltages are substantially DC, with relatively small AC ripples. The DC blocking capacitors can be arbitrarily large, and capacitance tolerances do not affect the converter circuit operation substantially.
- The majority of inductors can be AC inductors, which means that in steady-state operation the DC component of the inductor current obtained by averaging the inductor current over a switching period is zero.
- When a TSAB converter is operated with conversion ratio close to the nominal value, the AC inductor current are essentially trapezoidal with RMS currents approaching the minimum possible values.
- Component current and voltage stresses are minimized
- The majority of power switching devices operate under soft, zero voltage switching conditions over wide ranges of operating points.
- Output voltage or current can be controlled and regulated using simple phase shift control.
- TSAB converters do not require an isolation transformer.

Even though the topologies of the TSAB family of converters as disclosed herein are derived from known SC topologies, their operation, design and control are fundamentally different. While at least some of the TSAB circuit topologies of the present disclosure are similar to previously described switched tank DCX converters, the TSAB converter operation, characteristics, control, and design principles according to the present technology are substantially different.

Performance wise, the example embodiments of the disclosed TSAB converter family retain multiple benefits of SC converters over conventional pulse-width modulated (PWM) converters, which include reduced voltage stresses, no inductive energy storage, better switch utilization, and automatic capacitor voltage balancing. Compared to SC converters, converters in the TSAB family can achieve much improved efficiency through soft charging of all or a majority of the flying capacitors (e.g., capacitors that are not referenced to ground potential), low RMS, trapezoidal inductor current waveforms, and zero-voltage-switching over wide operating ranges. Moreover, continuously controllable conversion ratios and regulation capability can also be achieved through simple phase shift control or other control approaches. Finally, converters in the disclosed TSAB converter family are bidirectional, with power flow in the step-down or step-up direction.

Switched-capacitor (SC) converters require no magnetic components, but incur losses due to capacitor "hard" charging and discharging. This issue can be addressed by "hybridizing" SC converters, e.g., by adding inductive components to the converter topology. One approach consists of incorporating small AC inductors in series with some of the switched capacitors, in order to eliminate capacitor-only loops responsible for hard charging and discharging. Operation of such hybrid SC-based converters can be categorized by the switching frequency to resonant frequency ratio $k=f_s/f_r$. For example, resonant switched-capacitor converters and switched tank converters operate close to resonance ($k\approx 1$). Similar to the parent SC converters, these hybrid converters tend to have limited regulation capability, and are typically operated as fixed-ratio "DC transformers" (DCX).

Other types of hybrid converters operate above resonance ($k>1$). In particular, Dickson-based transformerless stacked active bridge (TSAB) converters follow the $k>1$ approach, and feature operating waveforms and characteristics similar to the transformer-isolated dual active-bridge converters, including low RMS currents, zero-voltage switching (ZVS), and regulation capability using simple phase shift control.

A phase-shift control scheme for TSAB converters is described herein, which enables control to be utilized to achieve closed-loop output voltage regulation. According to some embodiments, the control approach of the present technology may be similar to the approach applied to DAB converters, which require transformer isolation. For example, simple low frequency models have been provided. To account for high frequency behavior, especially the inherent sampling effect in the phase-shift PWM modulation, the converter small signal transfer function can be modeled in the Z-domain (e.g., a 2-to-1 TSAB converter small signal model). Based on this model, a controller may be designed and implemented according to the present disclosure either in analog or digital form to achieve the unique technical benefits and practical benefits with the disclosed family of TSAB converters. In addition to phase shift control, variable frequency control can also be used to regulate output power. Duty cycle can also be used to balance the flying capacitor voltage if needed.

As an example, consider the 3-to-1 ladder SC converter shown in FIG. 3A. This two-phase SC converter has two switched states, which form a pair of linear networks (graphs) comprising $k_t=3$ tree capacitor branches $V_g$, $V_{out}$, $C_3$ (301) and $k_l=2$ capacitor links $C_1$ (303) and $C_2$ (305). In general, the tree versus link branch assignment leads to a systematic DC solution and general properties of SC converters in terms of achievable conversion ratios, component counts, and output resistance.

FIG. 3A depicts a schematic diagram of a 3-to-1 ladder SC converter 300, and FIGS. 3B and 3C depict the two "on" switched states of the SC converter 300 of FIG. 3A. In FIG. 3B, switches $S_1$, $S_2$ and $S_3$ are on, and in FIG. 3C, $\bar{S}_1$, $\bar{S}_2$ and $\bar{S}_3$ are on. In FIGS. 3A-3C, the network link capacitors are denoted as $C_1$ (303) and $C_2$ (305) and the tree branches are denoted as $V_g$, $V_{out}$, and $C_3$ (301).

Starting from the ladder SC converter 300 in FIGS. 3A-3C, a TSAB converter topology may be obtained by inserting AC inductors (e.g., $L_1$ and $L_2$) in series with the link capacitors (e.g., $C_1$ (303) and $C_2$ (305)). FIG. 4A depicts a schematic diagram of a 3-to-1 ladder TSAB converter 400 according to an embodiment of the present technology. The 3-to-1 TSAB converter 400 of FIG. 4A includes two additional polarity reversal states (402 and 404): $S_1$, $\bar{S}_2$, $\bar{S}_3$ and $S_4$ on (j=1), as shown in FIG. 4B, and $\bar{S}_1$, $S_2$, $S_3$ and $\bar{S}_4$ on (j=3), as shown in FIG. 4C. FIG. 4A also illustrates how, in accordance with some embodiments of the present technology, from input node 407 to ground 409, switches may be connected both in series (e.g., $S_1$ and $\bar{S}_1$) and in parallel (e.g., $S_2$, $\bar{S}_2$ and $S_4$, $\bar{S}_4$), with respect to one another (or pairs of switches), or as between circuit branches, of converter 400, for instance (see FIGS. 7B, 7C, 8B, 11, 22A, 22B and 36A for other non-limiting examples).

The TSAB converter (e.g., 400) according to the present disclosure may have four switching states: two circuit states inherited from the parent SC converter, referred to as direct-power delivering states (302 and 304) in FIGS. 3B and 3C, and the two additional polarity reversal states shown (402 and 404) in FIGS. 4B and 4C. The purpose of the polarity-reversal states 402 and 404 is to facilitate volt-seconds and charge balance in the TSAB converter 400 by allowing reversal of the inductor current polarity. The polarity-reversal states 402 and 404 ideally do not deliver charge to the output.

Figure 5:
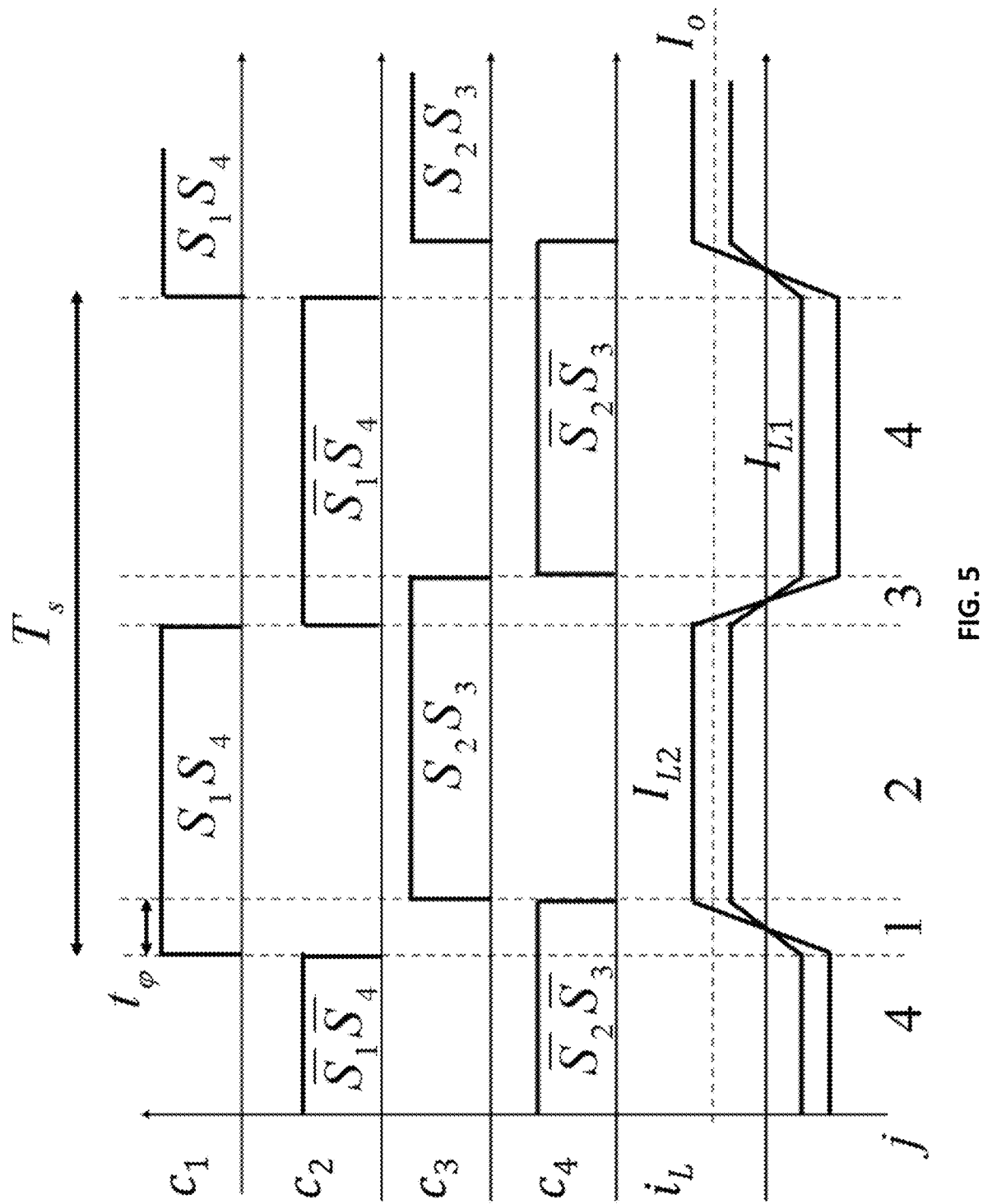
FIG. 5 depicts a graph of operating waveforms in the 3-to-1 ladder TSAB converter shown in FIGS. 4A-4C, according to some embodiments of the present technology.

FIG. 5 shows idealized operating waveforms in the 3-to-1 ladder TSAB converter 400 shown in FIGS. 4A-4C. The converter 400 of FIGS. 4A-4C may have four switched states: j=1 positive polarity-reversal state 402 with on-switches $S_1\bar{S}_2\bar{S}_3S_4$ as shown in FIG. 4B; j=2 positive direct-power-delivering state with on-switches $S_1S_2S_3S_4$ and the network that follows the parent SC converter network 302 shown in FIG. 3B; j=3 negative polarity reversal state 404 with on-switches $\bar{S}_1S_2S_3\bar{S}_4$ as shown in FIG. 4C; and j=4 negative direct-power-delivering state with on-switches $\bar{S}_1\bar{S}_2\bar{S}_3\bar{S}_4$ and the network that follows the parent SC converter network 304 shown in FIG. 3C. In some embodiments, it may be advantageous to keep the length of these states short (e.g., as denoted by phase shift $t_\phi$ ("t sub phi")=$\phi T_s/2$ in FIG. 5), in order to minimize the RMS current stresses and inductances required. Similar operational waveforms may be operationally applicable and observed across the TSAB converter family.

Using an approach based on network-theoretic concepts, the present disclosure generalizes the TSAB approach and shows how these converters can be systematically synthesized starting from a given two-phase SC converter such as ladder, Dickson, Fibonacci, doubler, and other SC topologies. The approach also yields general, topology-dependent properties of TSAB converters, including DC characteristics and component stresses.

General Properties of Transformerless Stacked Active Bridge Converters

The present disclosure derives general characteristics of TSAB converters, along with a description of a systematic synthesis procedure. Examples of TSAB converters obtained by the synthesis procedure are provided along with experimental results for a prototypical 3-to-1 ladder TSAB converter.

Connectivity and setup circuit equations may be described systematically based on viewing a circuit topology as a graph with tree branches and links. In each switched state j of an SC converter, the resulting network has an algebraic representation using the fundamental loop matrix F(j), and a fundamental cut-set matrix C(j), $$F(j)=[U(j)B_t(j)b(j)] \quad (1)$$

$$C(j)=[-B_t^T(j)U(j)] \quad (2)$$

where U(j) is an identity matrix, $B_t(j)$ is a $k_t \times k_t$ matrix describing the tree capacitor connections, vector b(j) represents the connection of the source $V_g$, and j is the switched state index.

In a TSAB converter (e.g., converter 400) where inductors (e.g., $L_1$ and $L_2$) are inserted in series with link capacitors (e.g., 403 and 405), the general dynamic network equations become:

$$F(j)=[v_C V_g]T + L\dot{i}_L = 0 \quad (3)$$

$$C(j)[i_L i_t]^T = 0 \quad (4)$$

where L is a diagonal inductance matrix, $v_C = [v_{Cl} \ v_{Ct} \ v_{out}]^T$ is a vector of the link (e.g., 403 and 405) and tree (e.g., 401) capacitor voltages and output voltage $v_{out}$, and $i_t = [i_{Ct} \ i_o \ i_g]^T$ is a vector of the tree capacitor (e.g., 401) currents, as well as output and input current.

Since there is no net charge in any of the branches during the polarity-reversal states (j=1, 3), these switched states do not affect the capacitor DC voltages, which remain the same as in the parent SC converters. Assuming $k=f_s/f_r \gg 1$ and $v_C \approx V_C^*$, where $V_C^*$ are the nominal capacitor DC voltages in the parent SC converter, the inductor current waveforms are flat-top trapezoidal with amplitudes $I_L$, as illustrated in FIG. 5 for the 3-to-1 ladder TSAB converter 400 example of FIGS. 4A-4C.

The volt-seconds applied to each inductor during polarity reversal states (j=1, 3) determine the inductor current amplitudes $I_L$:

$$I_L = \frac{-\varphi}{4f_s} L^{-1} F(1) [V_C^* \ V_g]^T \quad (5)$$

Average currents in the tree branches $I_t$ can then be found using (6):

$$I_t = \frac{\varphi(1-\varphi)}{8f_s} (B_t^T(4) - B_t^T(2)) L^{-1} F(1) [V_C^* \ V_g]^T \quad (6)$$

where $I_t = [I_{Ct} \ I_o \ I_g]^T$. For proper operation, the average output current $I_o$ and the average input current Ig are the only non-zero elements in $I_t$.

Assuming all inductances are equal, a general expression for the DC output current $I_o$ can be found from (7):

$$I_o = \frac{p}{q} \frac{\varphi(1-\varphi)}{Lf_s} V_g = G(\varphi) V_g \quad (7)$$

where p and q are integers that depend only on the circuit topology, and how the polarity-reversal states (e.g., 402 and 404) are defined. From (7) it follows that a TSAB converter (e.g., 400) can be viewed as a gyrator with G(φ) being the gyrator conductance.

One may note how, for at least some of the disclosed embodiments of the present technology, the TSAB DC characteristic (7) may be similar to the DC characteristic of transformer-isolated DAB converters. Just as in DAB converters, phase shift φ can be used as a control variable to regulate output current ($i_o$) or output voltage ($V_{out}$) in a TSAB converter (e.g., 400) according to the present technology.

A network-theoretic procedure for synthesis of TSAB converters starting from a two-phase SC converter topology is based on network topology concepts. The procedure is general and may be completely automated. The synthesis steps are described and illustrated by way of example only for application to the 3-to-1 ladder TSAB converter 400 example of FIGS. 3A-3C and 4A-4C.

Figure 6:
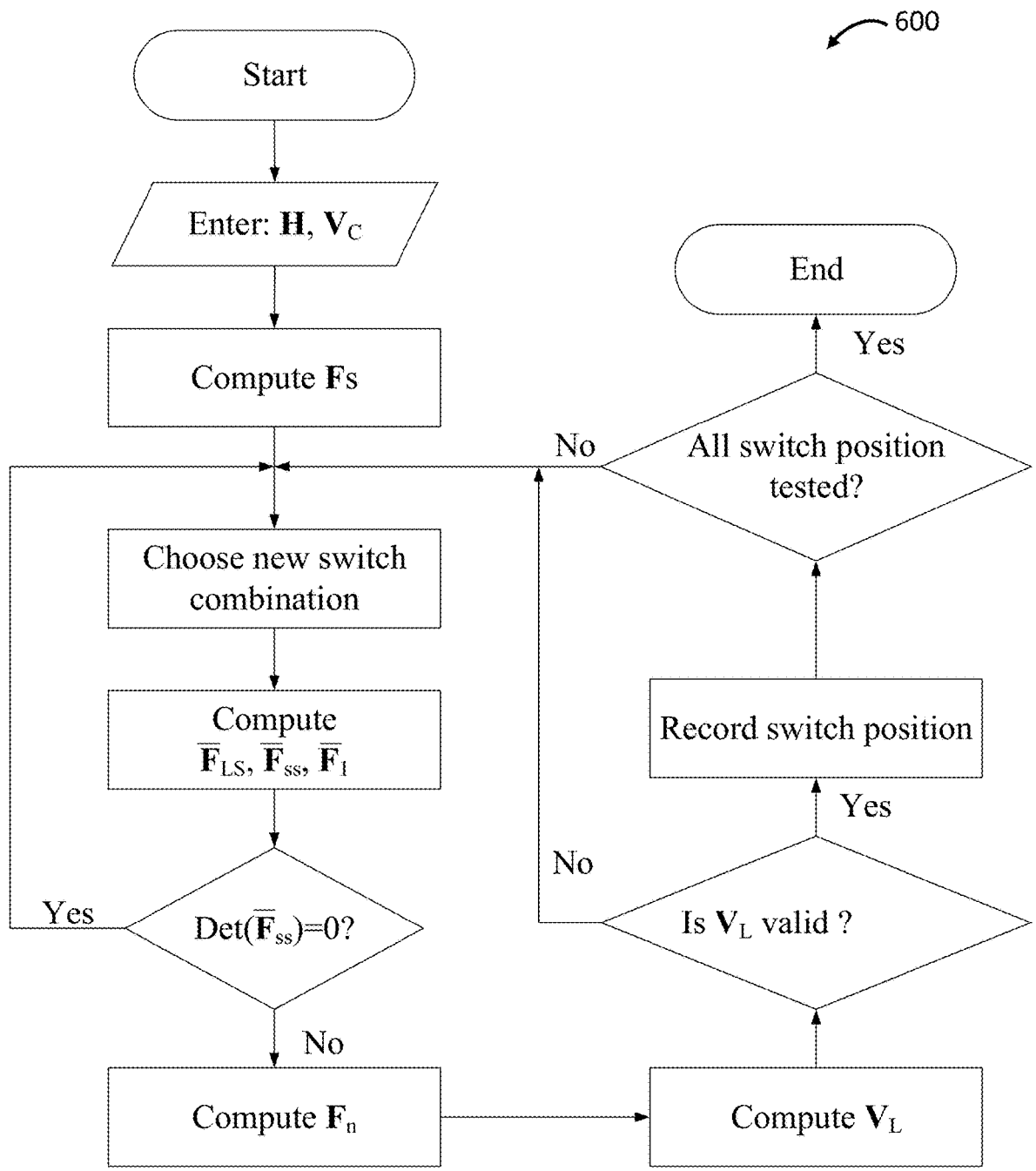
FIG. 6 depicts a flow chart for an algorithm to synthesize TSAB converters from a given two-phase SC converter, according to some embodiments of the present technology.

FIG. 6 depicts a flow chart for an algorithm 600 to synthesize TSAB converters from a given two-phase SC converter, according to some embodiments of the present technology.

Step 1: Insertion of AC Inductors

In an SC converter, "hard" charging and discharging of capacitors is a consequence of capacitor-only loops formed in alternating switched network states. To ensure soft charging independent of capacitance values or operating conditions, no such capacitor-only loops should be allowed in any of the switched network states. This requirement may be met by inserting an inductor (e.g., $L_1$ and $L_2$) in series with each link capacitor (e.g., 403 and 405), assuming that the tree branches and the links (or link branches) are the same in each switched network state of the parent SC converter.

In a TSAB converter (e.g., 400) constructed from a two-phase SC converter (e.g., 300) by insertion of small AC inductors (e.g., $L_1$ and $L_2$) in series with link capacitors (e.g., 403 and 405), each fundamental loop is guaranteed to contain an inductor, and each fundamental cut-set is guaranteed to contain a tree capacitor (e.g., 401). Consequently, no capacitor-only loops are formed, which means that "hard" charging and discharging may be eliminated or least practically mitigated.

When defining tree and link branches in an SC converter, it may be assumed that the input voltage $V_g$ and the output voltage $V_{out}$ behave as ideal voltage sources, and are therefore always designated as tree branches. It should also be noted that the definition of tree (e.g., 401) and link (e.g., 403 and 405) capacitors may vary across various topologies of the TSAB converters according to the present technology.

As an example, consider the 3-to-1 ladder SC converter 300 of FIG. 3A. The nominal capacitor voltages in this two-phase SC converter are all equal to $V_g/3$. As shown in FIG. 3A, $C_1$, $C_2$ are defined as the link capacitors (303 and 305) in both phases, e.g., in both direct-power-delivering states. Two AC inductors, $L_1$ and $L_2$, are added in series with the link capacitors, $C_1$ (303) and $C_2$ (305), respectively, to obtain the 3-to-1 ladder TSAB 400 shown in FIG. 4A. In the resulting TSAB converter 400, all capacitors exhibit full soft charging, independent of capacitance values.

It is important to note that it may not always be possible to meet the requirement that the link and the tree capacitors remain the same in both states of a two-phase SC converter. For example, a series-parallel SC converter cannot be directly transformed into a TSAB converter because one or more of the tree capacitors in one state must become link capacitors in the other state. Among the known two-phase SC converters, for example, TSAB converters can be constructed from ladder, Dickson (with even conversion ratios), Fibonacci, doubler, and other SC topologies.

Step 2: Polarity-Reversal States

Polarity-reversal states may be inserted between the main power delivering states for proper TSAB converter (e.g., 400) operation with balanced capacitor voltages. In general, the lengths of the polarity-reversal states may be used to control the output current (e.g., W. Consider first the most favorable case when no additional switches are needed to implement the polarity-reversal states. In this case, the switches in the parent SC converter (e.g., 300) may be divided into $N_{sw}/2$ complementary pairs, $\bar{S}_n$ and $S_n$, so that there is a total of $2^{N_{sw}}/2$ switched network states to be considered.

Referring to FIG. 6, an incidence matrix $H_s$, with columns describing connectivity of $v_{LC}$, $v_{\bar{S}}$, $V_g$, $V_{out}$, $v_{Ct}$, $v_s$, respectively, can be used to represent the complete circuit topology, including the switches. The fundamental-loop matrix for the network with switches $F_s$ may be found from submatrices of the incidence matrix where the first row is ignored:

$$H_s = \begin{bmatrix} \times & \times \\ E_s & T_s \end{bmatrix} \tag{8}$$

$$F_s = E_s T_s^{-T} = \begin{bmatrix} F_{lt} & F_{ls} \\ F_l & F_{ss} \end{bmatrix} \tag{9}$$

where $F_s$ is defined as:

$$[v_{LC} v_{\bar{s}}]^T = F_s [v_t v_s]^T \tag{10}$$

$$v_t = [V_g V_{out} v_{Ct}]^T \tag{11}$$

For a given switch position, the fundamental-loop matrix $F_n$ and the L-C link branch voltages $V_{LC}^*$ may be found from:

$$F_n = F_{lt} - \bar{F}_{ls} \bar{F}_{ss}^{-1} \bar{F}_l \tag{12}$$

$$V_{LC}^* = V_L^* + V_{Cl}^* = F_n V_t^* \tag{13}$$

Where $\bar{F}_{ls}$, $\bar{F}_{ss}$, $\bar{F}_l$ are the respective sub-matrices in $F_s$ with row or column corresponding to switch $S_n$ or $\bar{S}_n$ deleted when switch $S_n$ or $\bar{S}_n$ is on, e.g., when $v_{Sn}=0$ or $v_{\bar{S}n}=0$. It is necessary to check invertibility of the matrix $\bar{F}_{ss}$ to eliminate illegal switching states.

To ensure that inductor volt-second balance conditions can be satisfied, assuming all the link-capacitor currents are in-phase in SC states before inductors (e.g., $L_1$ and $L_2$) are inserted, the solution must include a "positive" reversal state, where all inductor voltages are positive, and a complementary "negative" reversal state, where all inductor voltages are negative. If some link-capacitor currents are not in-phase (e.g., are of opposite phase) before inductors (e.g., $L_1$ and $L_2$) are inserted, the phase relationship between inductor voltages during the polarity-reversal states needs to be preserved. For example, if link-capacitor $C_1$ and $C_2$ are of opposite phase in the parent SC converter (e.g., 300) operation, the voltages across inductor $L_1$ and $L_2$ inserted in series with $C_1$ and $C_2$ respectively also need to be opposite during the polarity-reversal states. In the cases when such positive or negative reversal states cannot be found for any of the $2^{N_{sw}/2}$ switched network states available using existing switches, additional switches may be included in the TSAB converter (e.g., 400) to enable polarity reversals of the inductor currents, e.g., $i_{L1}$ and $i_{L2}$, to ensure that inductor volt-second balance and capacitor charge-balance conditions can be met.

In the 3-to-1 ladder TSAB 400 topology example of FIGS. 4A-4C, in the state when the on-switches are $S_1\bar{S}_2S_3$, the fundamental-loop matrix in (12), (13) becomes:

$$F_n(S_1\bar{S}_2S_3) = \begin{pmatrix} 1 & -1 & 0 \\ 0 & 0 & 0 \end{pmatrix} \tag{14}$$

The resulting vector of inductor voltages $$V_L^*(S_1\bar{S}_2S_3) = [\tfrac{1}{3} -\tfrac{1}{3}]^T V_g \tag{15}$$

implies that this is not a valid polarity-reversal state, as not all of the inductor voltages are of the same polarity. The same conclusion holds for all $2^3=8$ possible combinations of on/off states of the three sets of complementary switches inherited from the parent SC converter (e.g., 300). Consequently, it may not be possible to implement polarity-reversal states using the existing switches, and additional switches may be required to realize the 3-to-1 ladder TSAB converter (e.g., 400) according to the present technology.

One possible approach is illustrated in FIG. 4A, where the additional switches $S_4$, $\bar{S}_4$ allow for two valid polarity reversal states (e.g., 402 and 404), as shown in FIGS. 4B and 4C, which correspond to the following switch states and the inductor voltages:

$$V_L^*(S_1,\bar{S}_2,\bar{S}_3,S_4) = [\tfrac{1}{3} \tfrac{1}{3}]^T V_g$$

$$V_L^*(\bar{S}_1,S_2,S_3,\bar{S}_4) = [-\tfrac{1}{3} -\tfrac{1}{3}]^T V_g \tag{16}$$

Notably, both inductor voltages may be of the same polarity in the two valid polarity-reversal states (e.g., 402 and 404).

Step 3: Switching Sequence and Phase-Shift Control

In this step, because all link-capacitor currents (e.g., $i_{L1}$ and $i_{L2}$) are in phase in the 3-to-1 ladder TSAB converter (e.g., 400), a valid switching sequence may be formulated according to the following pattern, which is illustrated by the idealized operating waveforms in FIG. 5:

1) positive polarity-reversal state, j=1, where all inductor voltages are positive, 2) positive direct-power-delivering state, j=2, where all inductor currents are positive, 3) negative polarity-reversal state, j=3, where all inductor voltages are negative, and each inductor voltage polarity is reversed compared with 2), above, and 4) negative direct-power-delivering state, j=4, where all inductor currents are negative, and each inductor current polarity is reversed compared with 1), above.

Additional practical considerations in formulating the switching sequence include ensuring that capacitor voltages remain balanced, e.g., that charge balance is satisfied for all capacitors, and that volt-seconds balance for the inductors can preferably be achieved using equal-length polarity-reversal states. These practical requirements, which may limit allowable combinations of polarity-reversal states, can be expressed as follows:

The requirement that the polarity-reversal states are of equal length allows for simple phase shift control. This strict condition can be expressed in terms of the inductor volt-second balance:

$$(F_n(1)+F_n(3))V_t^* = 2V_{C1}^* \tag{17}$$

where $V_t^*$, $V_{C1}^*$ are the nominal tree voltage vector and link capacitor voltage vector, respectively.

To ensure that the capacitor voltages may be balanced in steady state, and equal to the nominal values $V_C = V_C^*$ the inductance values in L may be chosen so that the average tree-capacitor currents in (6) are all zero:

$$I_{Ct} = 0 \tag{18}$$

In the 3-to-1 ladder TSAB converter 400 example, the standard switching sequence leads to phase shifting of the control signals for $S_2/\bar{S}_2$ and $S_3/\bar{S}_3$, as described below with reference to FIGS. 10A and 10B. It can also be verified that the two polarity-reversal states (e.g., 402 and 404) found in Step 2 satisfy (17), and that the capacitor voltages may be ideally balanced using equal-length polarity-reversal states (e.g., 402 and 404) if the inductances are sized as follows:

$$L_1 = 2L_2 \quad (19)$$

Step 4: DC Solution and Component Stresses

A network-specific expression for the TSAB gyrator conductance $G(\phi)$ may be obtained from (5)-(7). The incidence matrix $H_s$ and the fundamental loop matrix $F_s$ in (10) may then be used to determine the component stresses, such as the switch blocking voltages:

$$V_{S,block} = |\bar{F}_{ss}^{-1} \bar{F}_1 V_t^*| \quad (20)$$

where $V_{S,block}$ is a vector of voltages across the off-state switches $\bar{S}_1, \bar{S}_2, \ldots \bar{S}_n$.

In the 3-to-1 ladder TSAB converter (e.g., 400), assuming $L_1 = 2L_2 = 2L$, the steady state solution (5), (6) yields:

$$I_L = \frac{\varphi}{4Lf_s} V_g \begin{bmatrix} 1/6 \\ 1/3 \end{bmatrix} \quad (21)$$

$$I_t = \begin{bmatrix} I_{C3} \\ I_o \\ I_g \end{bmatrix} = \frac{\varphi(1-\varphi)}{4Lf_s} V_g \begin{bmatrix} 0 \\ 1/2 \\ -1/6 \end{bmatrix} \quad (22)$$

which corresponds to p=1, q=8 in (7). From (20), it follows that the switch voltage stresses are equal to $V_g/3$.

Following the synthesis procedure described above, many TSAB converters may be constructed starting from various two phase SC topologies, including according to Examples 1 and 2, below. For instance, with two AC inductors, TSAB converters may be constructed using the same numbers of flying capacitors and AC inductors.

Example 1

Figure 7A:
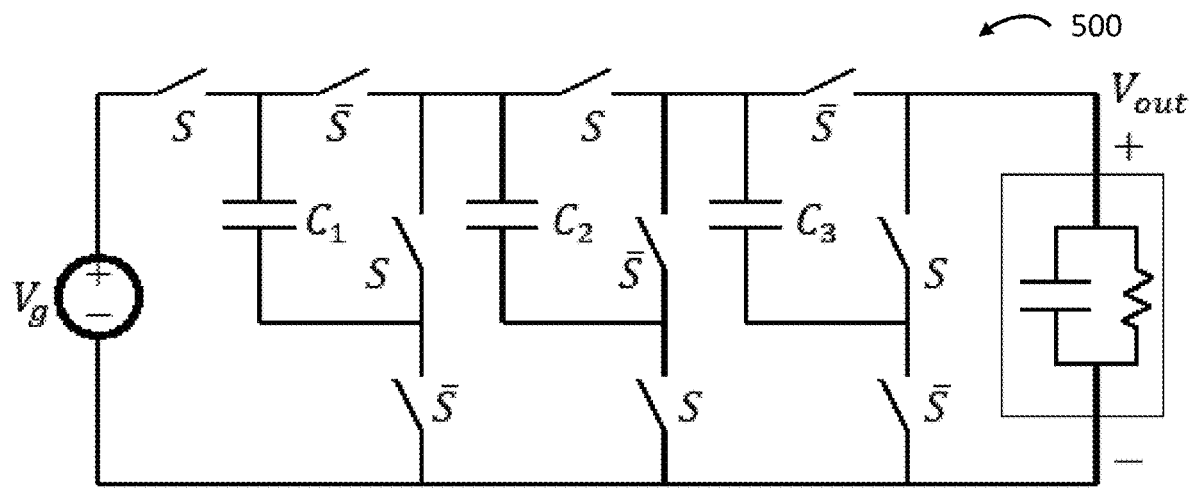
FIG. 7A depicts a schematic diagram of a conventional 5-to-1 Fibonacci SC converter.
Figure 7B:
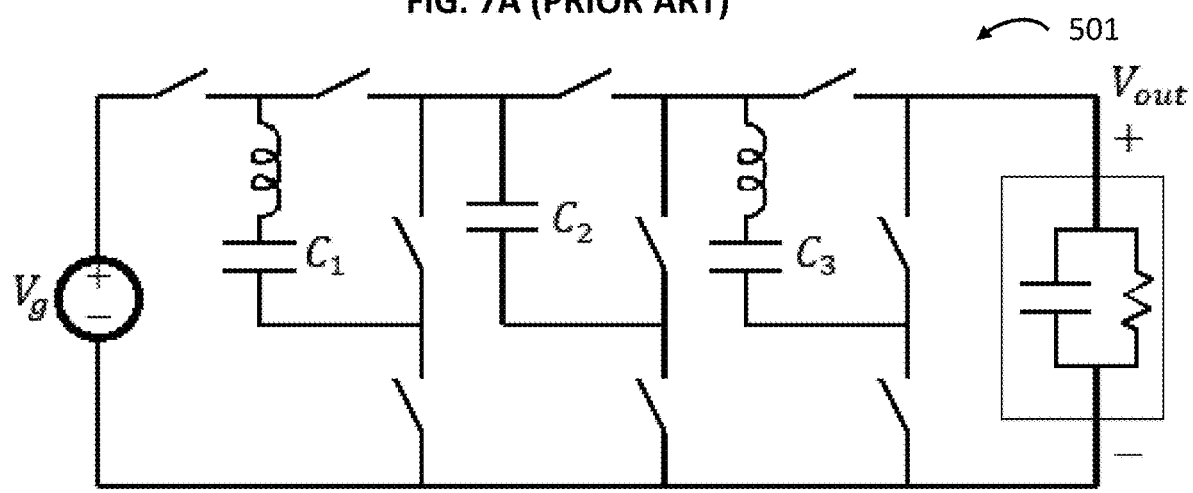
FIGS. 7B and 7C depict schematic diagrams of two variations of 5-to-1 Fibonacci TSAB converters corresponding to two different definitions of link capacitors, according to some embodiments of the present technology.
Figure 7C:
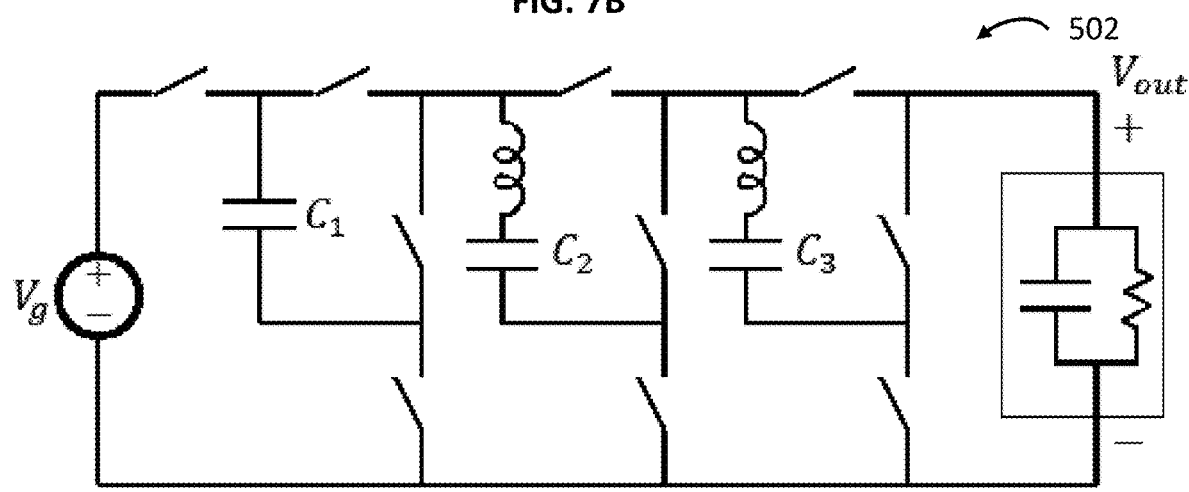

FIGS. 7A-7C show a 5-to-1 Fibonacci SC converter, and two different 5-to-1 Fibonacci TSAB converters obtained by the above described synthesis procedure. FIG. 7A depicts a schematic diagram of a 5-to-1 Fibonacci SC converter 500, and FIGS. 7B and 7C depict schematic diagrams of two variations (501 and 502) of Fibonacci TSAB converters corresponding to two different definitions of link capacitors. In the Fibonacci TSAB converter 502 of FIG. 7C, where $C_2$ and $C_3$ are the link capacitors, additional switches (not shown) may be needed to implement polarity reversal states. The Fibonacci TSAB converter 501 of FIG. 7B, where $C_1$ and $C_3$ may be defined as the link capacitors, requires no additional switches.

The two different topology variations of the Fibonacci TSAB converters 501 and 502 of FIGS. 7B and 7C, respectively may come from two different definitions of tree and link capacitors in Step 1 of the above-described synthesis procedure. In the Fibonacci SC converter 500 of FIG. 7A, one possible definition is that $C_2$ is considered a tree capacitor, while $C_1$ and $C_3$ are the link capacitors. The resulting 5-to-1 TSAB converter 501 is shown in FIG. 7B. In this case, the synthesis procedure shows that the polarity-reversal states can be implemented using the existing switches.

In another embodiment, $C_1$ may be defined as a tree capacitor, while $C_2$ and $C_3$ are the link capacitors, leading to an alternative 5-to-1 Fibonacci TSAB converter 502 shown in FIG. 7C. In this case, however, additional switches (not shown) are needed to implement polarity-reversal states.

Example 2

FIG. 8A depicts a schematic diagram of a 4-to-1 Dickson SC converter 800, and FIG. 8B depicts a schematic diagram of a 4-to-1 Dickson TSAB converter 801 corresponding to the parent SC converter 800 of FIG. 8A. In this case, $C_3$ may be a tree capacitor, and $C_1$, $C_2$ may be the link capacitors, so the TSAB topology of FIG. 8B is unique. No additional switches may be needed to implement the polarity reversal states.

Example 3

TSAB converters according to the present technology provide high efficiency around their nominal conversion ratio because of the characteristics similar to the DAB converter: RMS current stresses are low and, in most cases, switches exhibit zero-voltage switching (ZVS). Small AC inductors are exposed to low volt-seconds, enabling compact designs with low losses. Furthermore, similar to the parent SC converters, switch voltage stresses are reduced, allowing for application of reduced voltage rated devices.

To verify the aforementioned benefits, this Example 3 summarizes experimental results for a prototype 3-to-1 ladder TSAB and 4-to-1 Dickson TSAB. The 3-to-1 ladder TSAB converter 400 of FIG. 4A was built and tested for 36-to-12 V application. The prototype parameters are summarized in Table I.

TABLE I

Components in the 3-to-1 ladder TSAB converter prototype

| Switches | $L_1$ | $L_2$ | $C_1$-$C_3$ |
|---|---|---|---|
| Vishay SISA40DN | 70 nH (ferrite) Coilcraft SLC7649S-700KL | 36 nH (ferrite) Coilcraft SLC7649S-360KL | $C_1$, $C_2$: 10 × 10 µF $C_3$: 20 × 10 µF Murata GRM21BC71E106KE11 |

Figure 9:
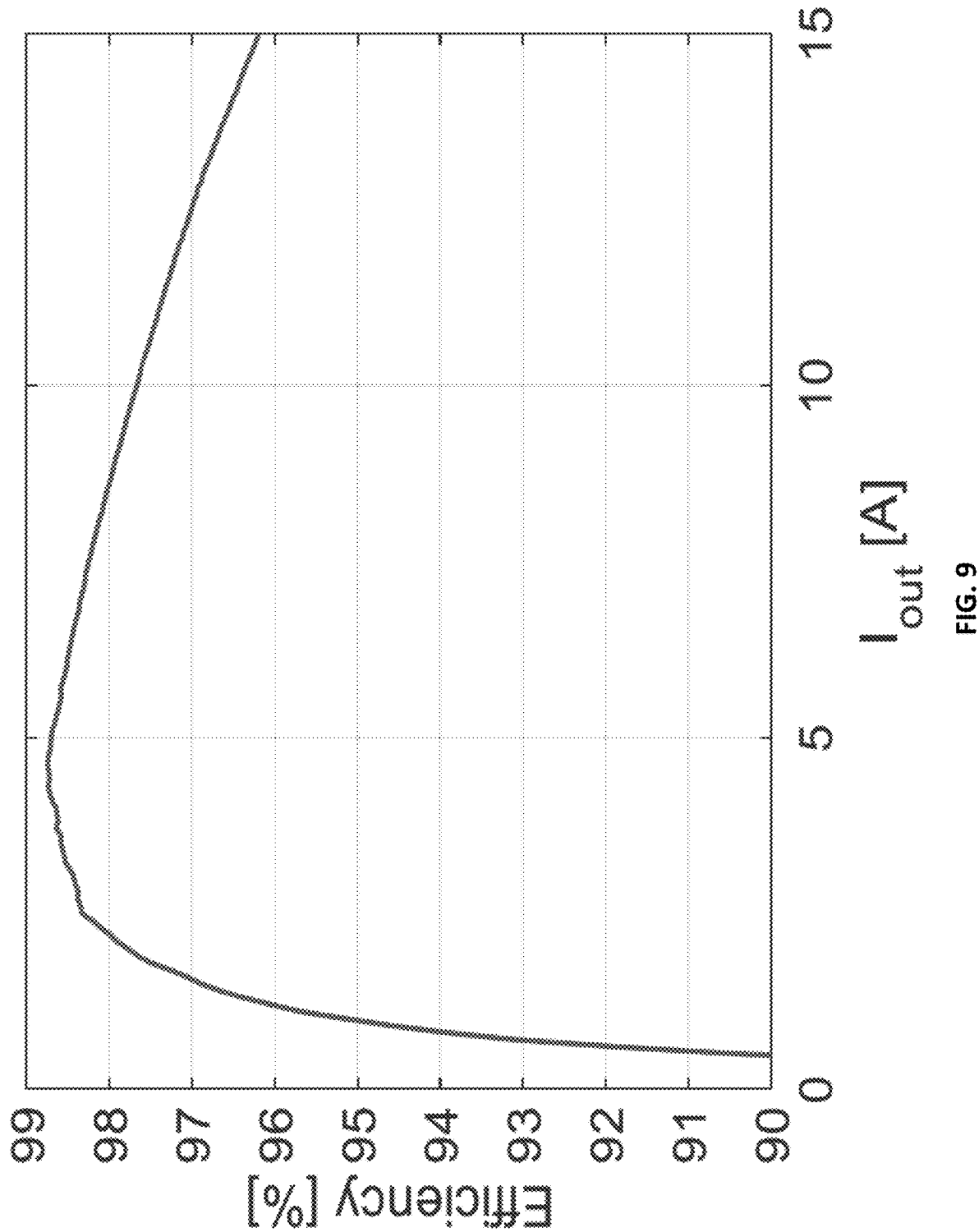
FIG. 9 depicts a plot of measured efficiency for the 3-to-1 ladder TSAB converter prototype of FIGS. 4A-4C, according to some embodiments of the present technology.

FIG. 9 depicts a graph of measured efficiency for the 3-to-1 ladder TSAB converter (e.g., 400) prototype of Example 3, with $V_{in}$=36 V, $V_{out}$=12 V and $f_s$=200 kHz. Peak efficiency for the prototype converter of Example 3 is above 98.7%, and a relatively flat efficiency curve over a wide range of output current is also apparent in the graph of FIG. 9.

Figure 10A:
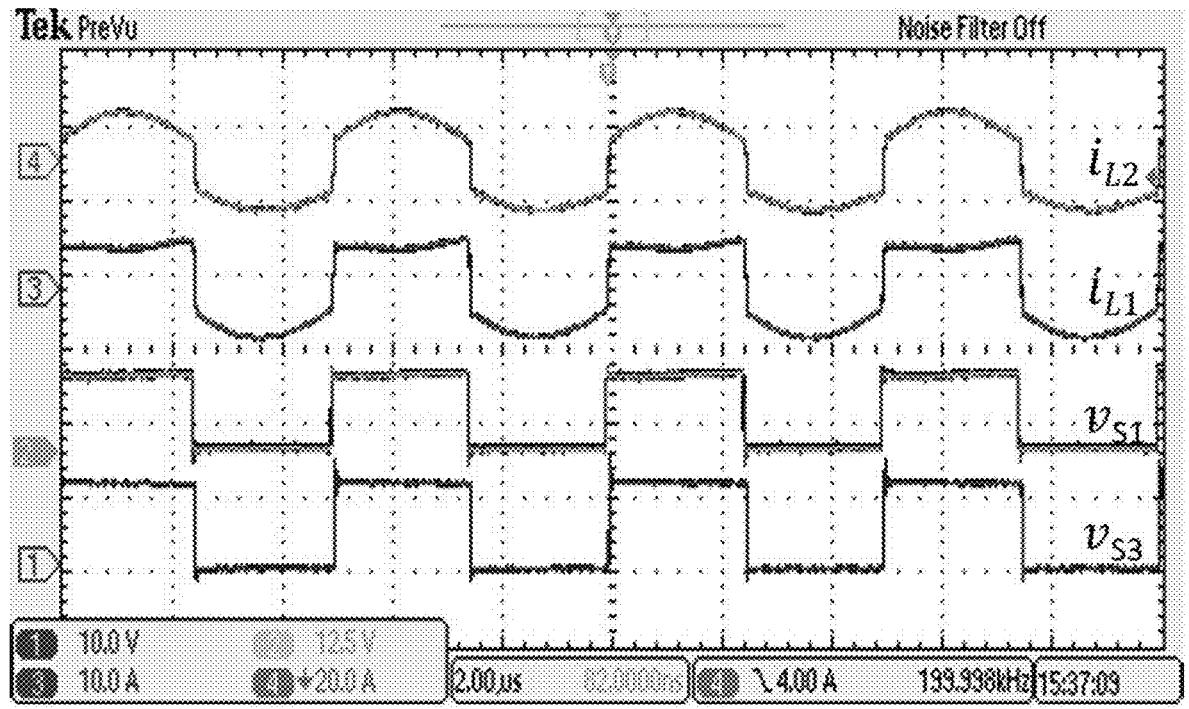
FIGS. 10A and 10B depict graphs of operating waveforms for inductor current and switching voltage waveforms in the 3-to-1 ladder TSAB converter of FIGS. 4A-4C, according to some embodiments of the present technology.
Figure 10B:
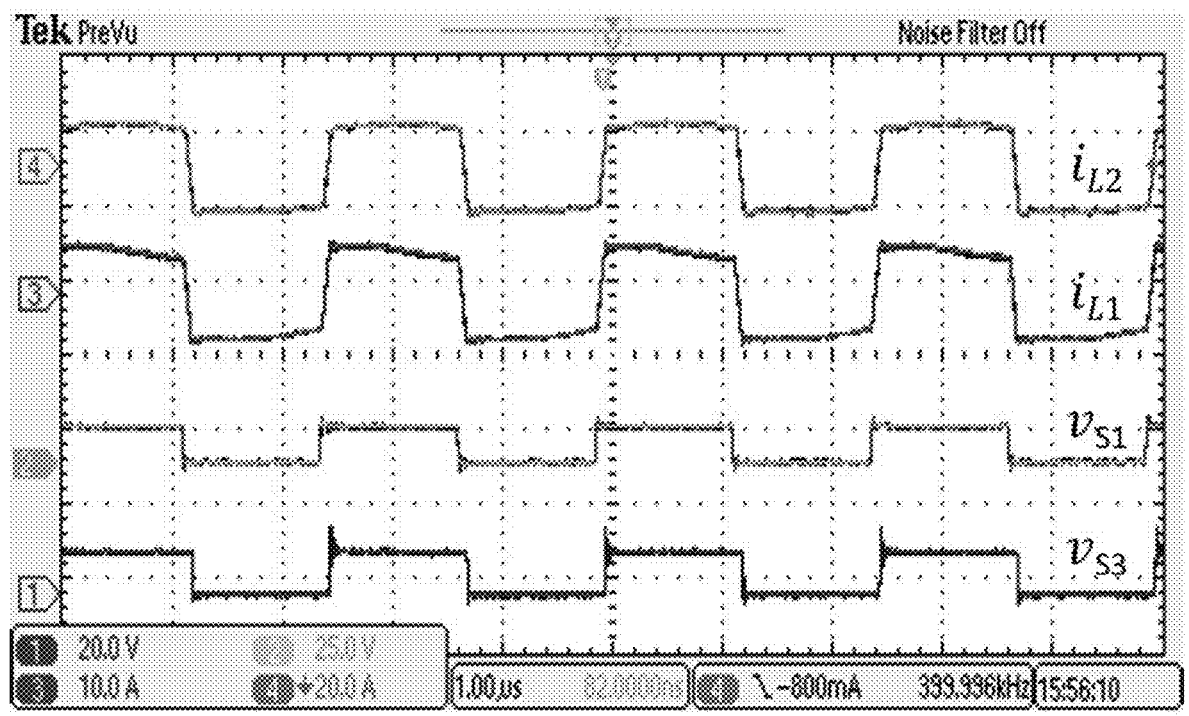

FIGS. 10A and 10B depict operating waveforms for inductor current and switching voltage waveforms in the 3-to-1 ladder TSAB converter 400 of FIGS. 4A-4C at $V_{in}$=36 V, $V_{out}$=12 V and $I_o$=8 A for two different switching frequencies: $f_s$=200 kHz (FIG. 10A), and $f_s$=400 kHz (FIG. 10B). The corresponding switching voltage waveforms $v_{s1}$ and $v_{s3}$ are shown and described above with reference to FIG. 5. As can be seen, soft switching may be achieved and low-RMS flat-top inductor currents imply relatively low conduction losses. Design details and experimental results for a prototype 4-to-1 Dickson TSAB converter 801 demonstrated a similar 98.6% peak efficiency in a 48-to-12 V application.

From the foregoing description and Examples 1-3, a generalization of the concept of transformerless stacked active bridge (TSAB) converters is provided herein. Using the above described network theoretic approach (e.g., FIG. 6), a systematic TSAB converter synthesis procedure starting from a given two-phase switched-capacitor (SC) converter may be realized. The foregoing description and Examples 1-3 further demonstrate how a TSAB converter may be constructed from any two-phase SC converter where tree branches and links may be defined to be the same in each of the two switched networks. Viable SC converters applicable to the TSAB family approaches of the present technology include Dickson (with even conversion ratios), ladder, Fibonacci, doubler, and other SC topologies. Furthermore, from the foregoing description, general topology-dependent results were derived for DC characteristics and component stresses in TSAB converters. The general properties and the synthesis procedure were exemplified on a 3-to-1 ladder TSAB converter (e.g., 400). Examples of 5-to-1 Fibonacci TSAB converters (e.g., 501 and 502) and 4-to-1 Dickson TSAB converter 801 were also provided, and experimental results were summarized for a 36-to-12 V, 15 A ladder TSAB converter prototype.

The present disclosure further describes a family of transformerless stacked active bridge (TSAB) converters with N-to-1 nominal conversion ratios and continuous voltage regulation capabilities. An N-to-1 TSAB converter is a hybrid converter derived from the N-to-1 Dickson switched-capacitor (SC) converter (e.g., 800), with small AC inductors inserted in the link capacitor branches to achieve lossless ("soft") capacitor charging and discharging. In operation, a TSAB converter may resemble the isolated Dual Active Bridge (DAB) converter but without the need for an isolation transformer. The TSAB family of converters has several favorable characteristics, which lead to very high efficiency around nominal conversion ratio, including small AC inductors with near-trapezoidal low RMS currents, low voltage stresses, and zero-voltage-switching (ZVS) over wide load range. Moreover, the operation is robust with respect to component tolerances, and continuous voltage regulation can be achieved through simple phase shift control. Experimental results are presented for a 120 W, 48V-to-12V TSAB prototype, demonstrating a flat efficiency characteristic with 98.6% peak efficiency, and 98.0% full-load efficiency.

Dual Active Bridge (DAB) converters are transformer isolated converters, which can achieve very high efficiency when operated at respective conversion ratios close to the transformer turns ratio. If unregulated, and operated close to the nominal conversion ratio determined by the transformer turns ratio, a DAB converter can be viewed as an unregulated DC transformer (DCX). At the expense of some loss in efficiency, the DAB converter also offers voltage regulation capabilities using phase shift control. Because of these features, DAB converters have found applications as ultra-high-efficiency step-up or step-down converters, for example. However, in low-to-medium power applications where space is limited and isolation is not required, a bulky and lossy transformer is a disadvantage, and transformerless DAB-like converters are of interest.

Switched-capacitor (SC) converters can be viewed as an approach to non-isolated DCX conversion. However, SC converters have losses associated with hard capacitor charging/discharging. Various approaches have been explored to achieve soft charging as well as soft switching by incorporating inductive elements in SC topologies. Operation of hybrid SC-based converters can be categorized by the switching frequency to resonant frequency ratio $k=f_{sw}/f_r$. In particular, resonant switched-capacitor (ReSC) converters, and switched tank converters operate close to resonance ($k\approx1$), which results in unregulated DCX-like behavior. Other types of hybrid converters operate above resonance ($k>1$), which leads to near-trapezoidal inductor current waveforms and DAB-like regulation capability.

Figure 11:
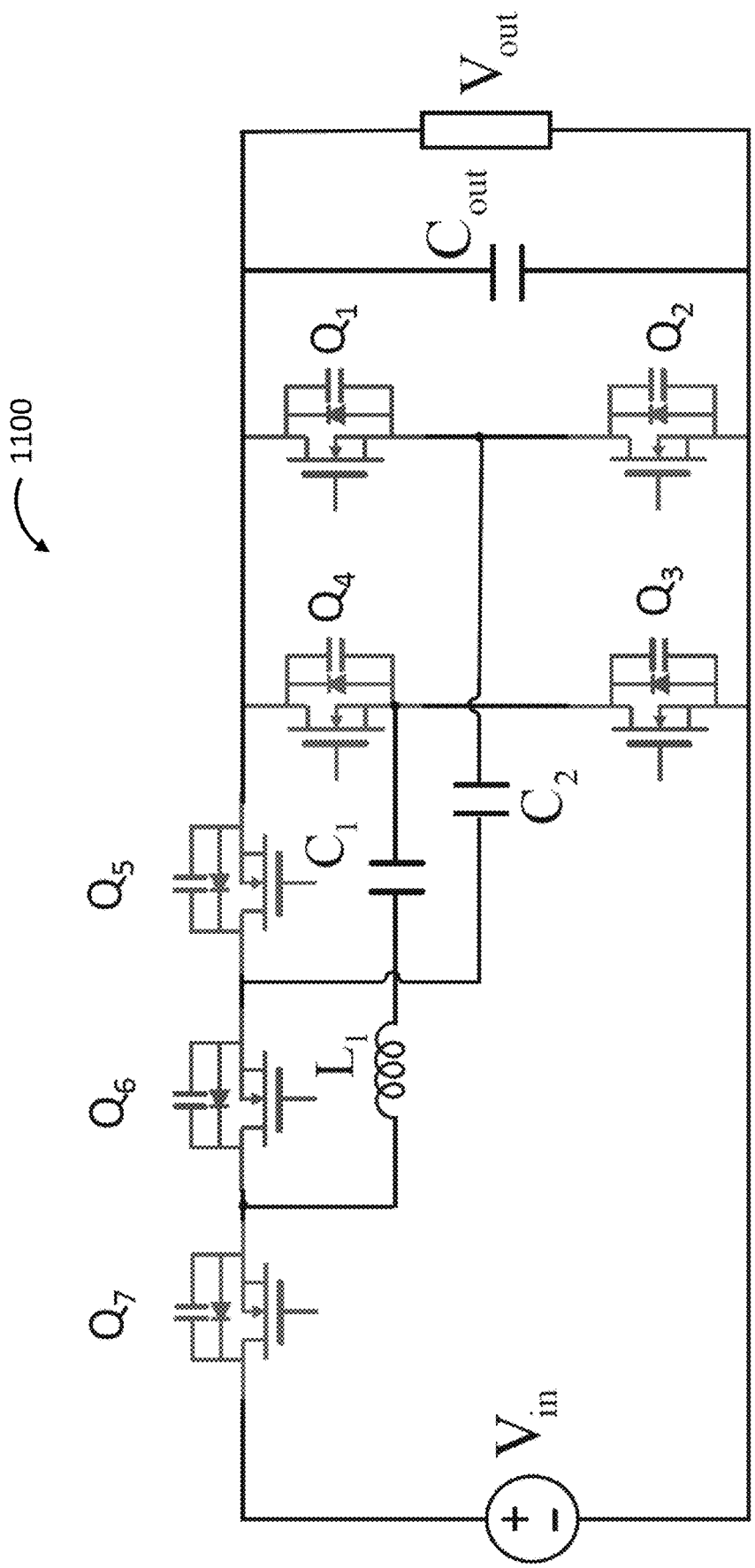
FIG. 11 depicts a schematic diagram of a 3-to-1 TSAB converter derived from a Dickson converter, according to some embodiments of the present technology.
Figure 12:
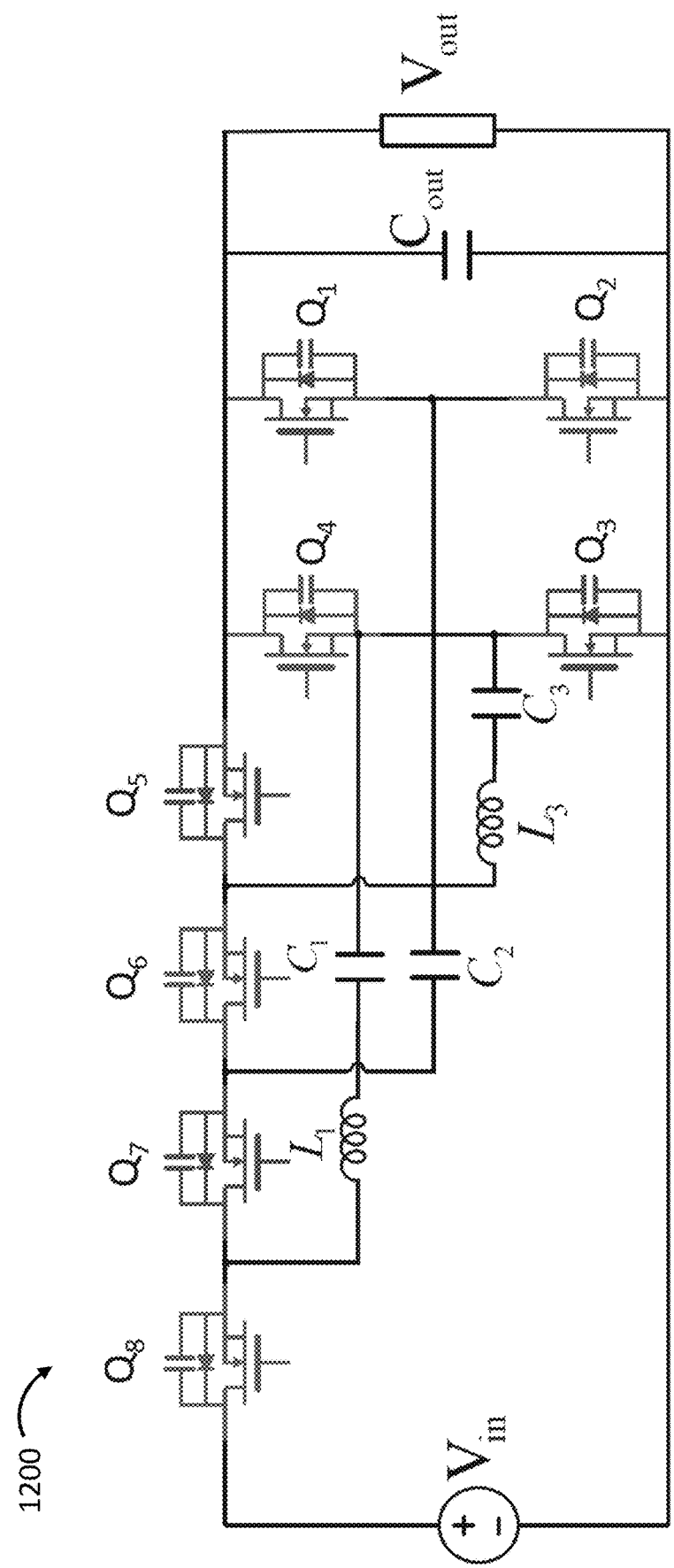
FIG. 12 depicts a schematic diagram of a 4-to-1 TSAB converter derived from a Dickson converter, according to some embodiments of the present technology.

The present disclosure further provides a family of transformerless stacked active bridge (TSAB) converters derived from the Dickson SC converters, with small AC inserted (e.g., as illustrated in FIGS. 11 and 12) to achieve efficient N-to-1 conversion similar to a DAB converter with a transformer ratio of N-to-1, but without the need for the isolation transformer.

Topologically, similar to the switched tank converters, the Dickson-based TSAB family of converters can be derived from the Dickson SC family, but its operating characteristics may be similar to the DAB converter, and closely related to previously reported transformerless DAB-like converters. As a result, TSAB converters may retain advantages of both SC and DAB approaches, including reduced voltage stresses and better switch utilization inherited from the SC parent converters, as well as natural zero-voltage-switching (ZVS), simple phase shift control, and near-trapezoidal low RMS inductor currents similar to the DAB converter. TSAB converter operating principles are provided below, and loss modeling and design considerations are presented and applied to a 4-to-1 TSAB converter prototype designed for 48 V-to-12 V, 10 A application. The aforementioned characteristics are verified by experimental results provided below, where it is shown how the 120 W, 48 V-to-12 V TSAB prototype achieves a flat efficiency curve with 98.6% peak efficiency, and 98.0% efficiency at full load.

Operating Principals of N-to-1 TSAB Converters

FIG. 11 depicts a schematic diagram of a 3-to-1 TSAB converter 1100 derived from a Dickson converter, according to some embodiments of the present technology. FIG. 12 depicts a schematic diagram of a 4-to-1 TSAB converter 1200 derived from a Dickson converter, according to some embodiments of the present technology.

An N-to-1 TSAB converter can be derived from the corresponding Dickson SC converter by inserting small ac inductors in series with every link capacitor, as shown in FIG. 11 for the 3-to-1 TSAB converter 1100, and in FIG. 12 for the 4-to-1 TSAB converter 1200. In the two examples of FIGS. 11 and 12, the link capacitors may also be considered flying capacitors. The approach to arbitrary N is readily extendible, and Table 2 shows how the circuit complexity increases with N.

TABLE 2

Components in N-to-1 Dickson-based TSAB converters

| N | Number of C | Number of L | Number of Switches |
|---|---|---|---|
| 2 | 1 | 1 | 4 |
| 3 | 2 | 1 | 7 |
| 4 | 3 | 2 | 8 |
| n (n > 2) | n − 1 | n − 2 | n + 4 |

For N=2, the TSAB converter and its operating characteristics may be similar to a previously described 2-to-1 converter. For N>2, the TSAB converter circuits may be similar to switched-tank converter circuits, but the TSAB operating characteristics and control are very different. While the present disclosure focuses on operating principles of the 4-to-1 converter, the same analysis approach may be applied to other converters in the Dickson-based TSAB family of converters. It may be noted that odd-N TSAB converters may not be able to achieve full "soft" capacitor charging/discharging.

Figure 13:
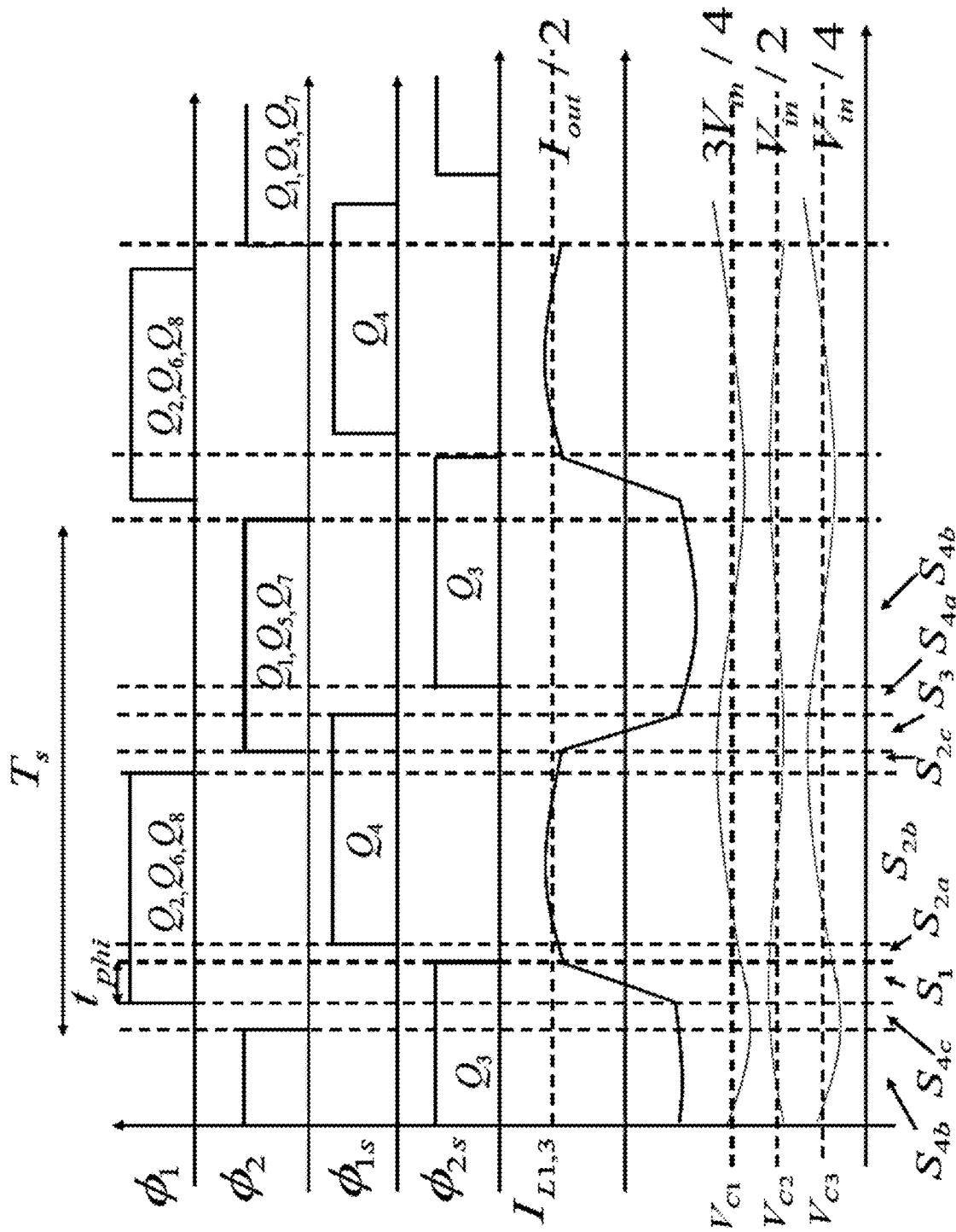
FIG. 13 depicts a graph of operating waveforms for the 4-to-1 TSAB converter of FIG. 12, according to some embodiments of the present technology.
Figure 14A:
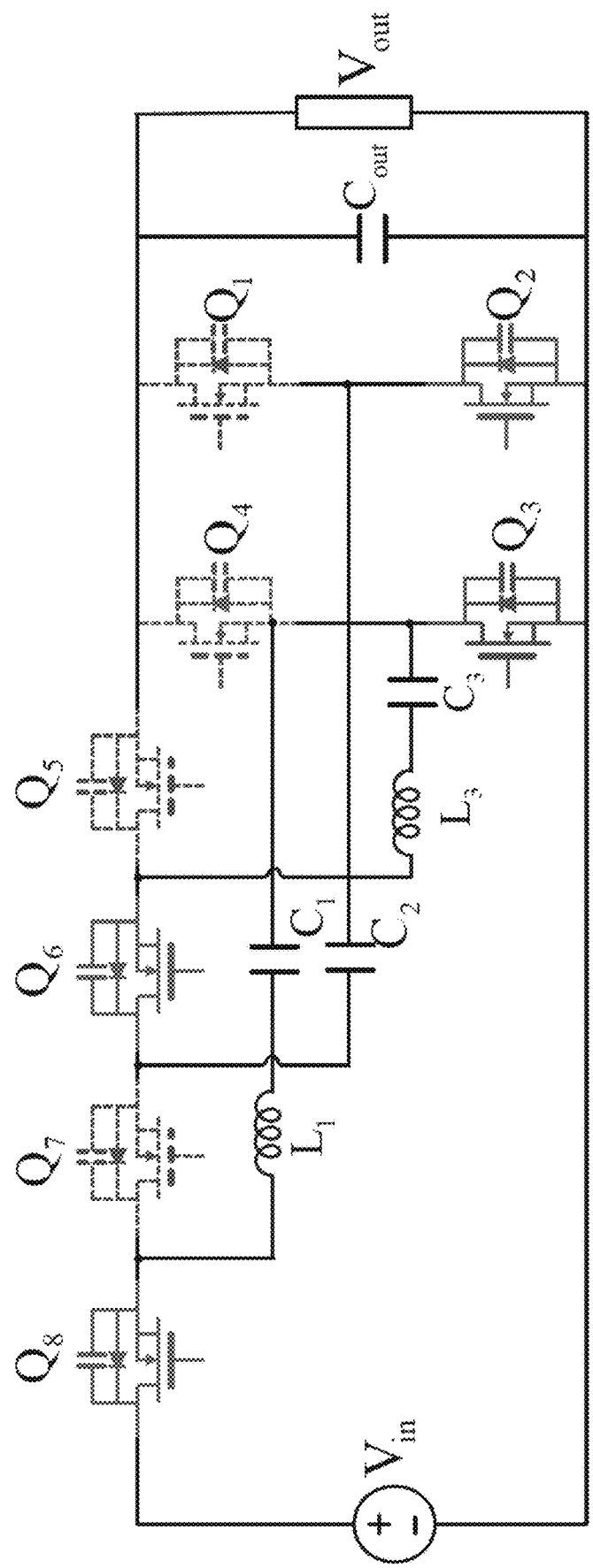
FIGS. 14A-14D depict schematic diagrams of the four main switch states of the 4-to-1 TSAB converter of FIG. 12, according to some embodiments of the present technology.
Figure 14B:
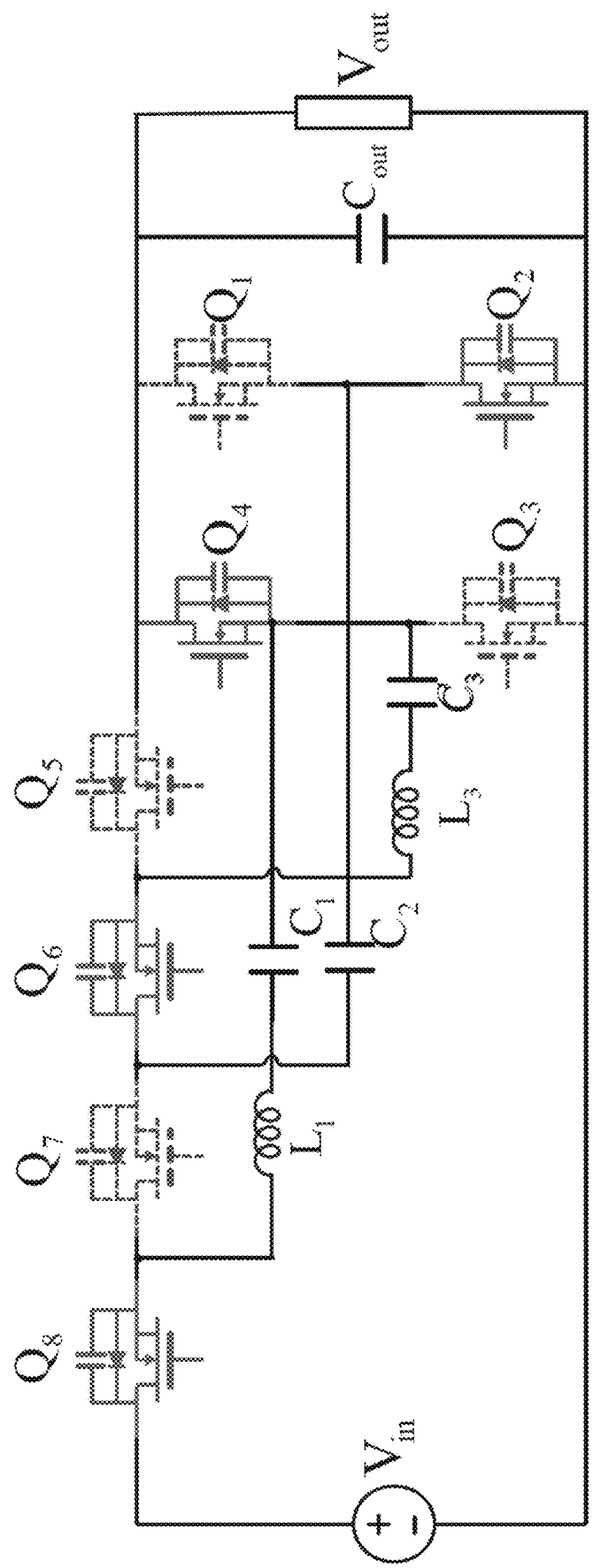
Figure 14C:
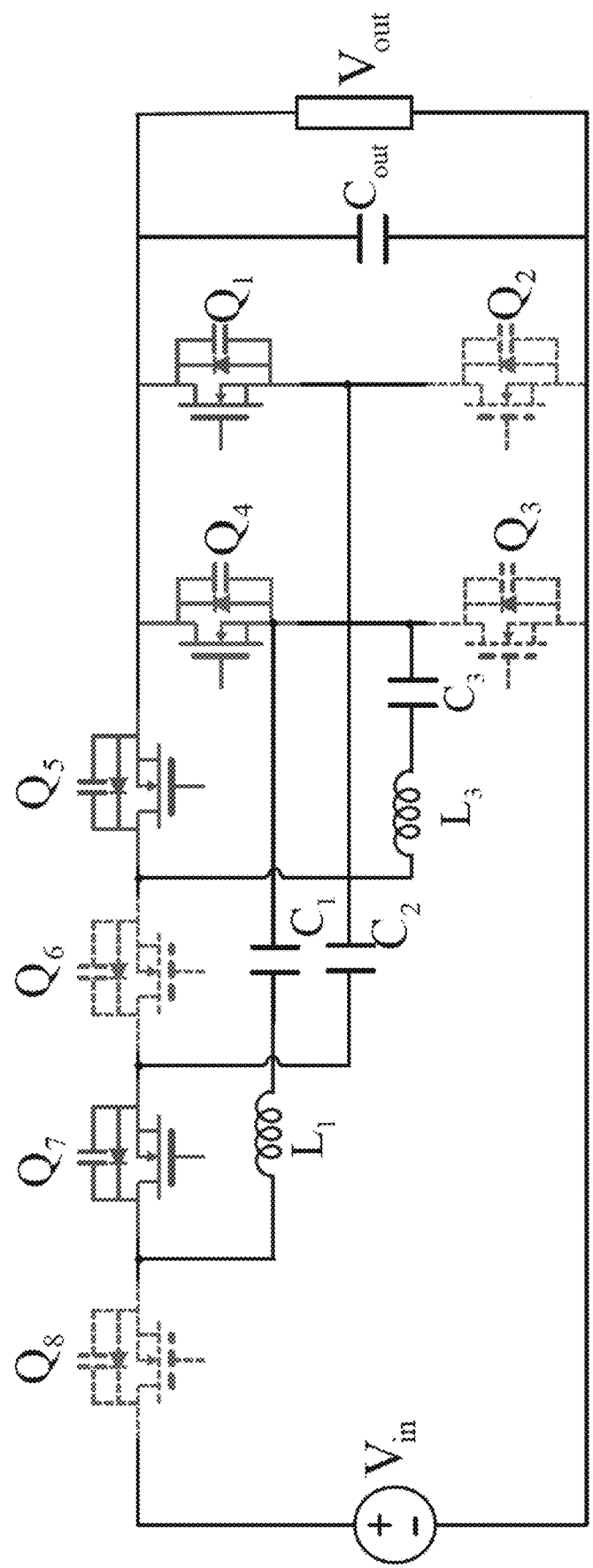
Figure 14D:
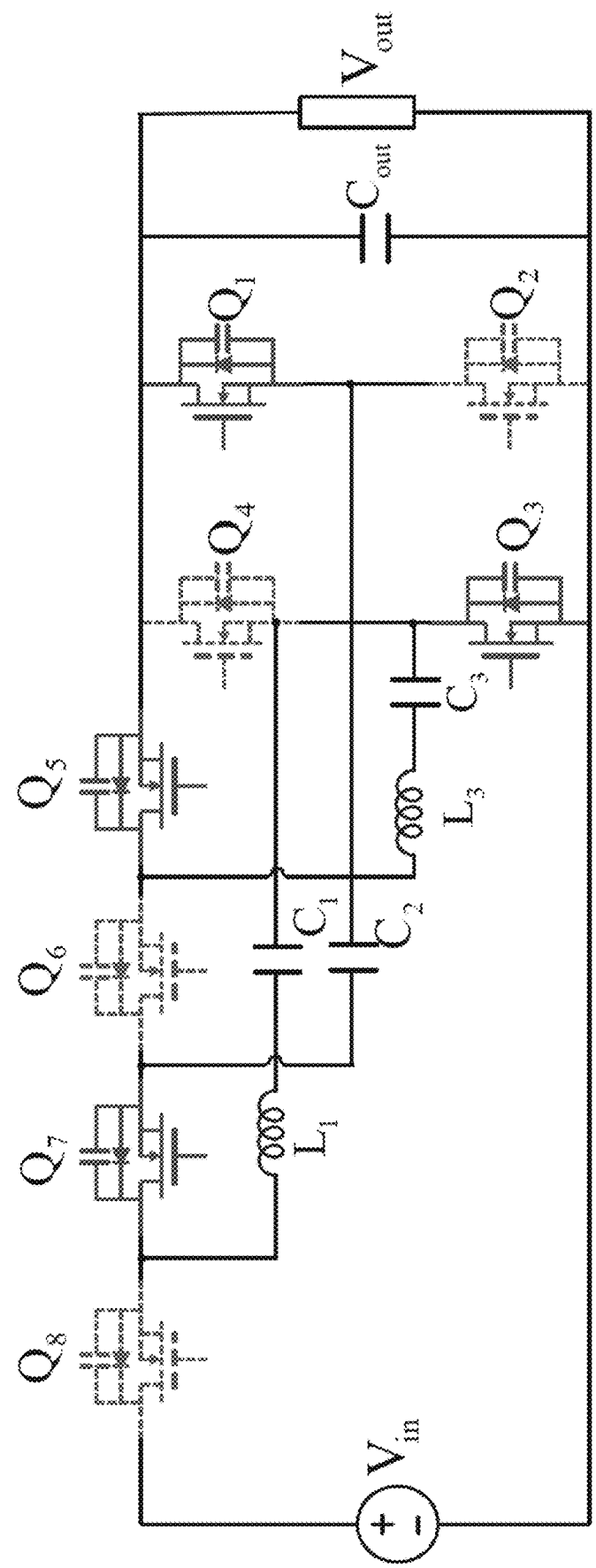

Idealized operating waveforms for the 4-to-1 TSAB converter with power flow in the step-down direction are shown in FIG. 13, with the four main switch states shown in FIGS. 14A-14D. FIG. 13 depicts a graph of operating waveforms for the 4-to-1 TSAB converter 1200 of FIG. 12, according to some embodiments of the present technology. FIGS. 14A-14D depict schematic diagrams of the four main switch states of the 4-to-1 TSAB converter 1200 of FIG. 12, according to some embodiments of the present technology. In FIGS. 14A-14D, on-switch states are denoted by switches Q in solid lines, and off-switch states are denoted by switches Q in dashed lines. Two sets of switch control signals may be required to achieve converter control and regulation. Each set of signals contains two complementary signals having a nominal 50% duty cycle, with dead times inserted to prevent simultaneous conduction. The second set (e.g., second pair) of control signals ($\phi_{1s}$ and $\phi_{2s}$) is phase shifted with respect to the first set (e.g., first pair) of signals ($\phi_1$ and $\phi_2$) by $t_\phi$ (t-phi). This phase shift may be used to control the output current, the output power, or the output voltage of TSAB converter 1200. A positive phase shift may result in positive power flow in the step-down (buck) direction, whereas a negative phase shift may result in negative power flow (boost operation).

To ensure circuit operation is unaffected by capacitance tolerances, the TSAB converter components may be selected so that the LC resonances are well below the switching frequency (k>1). This may also simplify the modeling process and aid the design-oriented-analysis of the converter. Utilizing charge balance and volt-second balance for the capacitors and inductors, and assuming matching tank inductors ($L_1=L_3=L$), the average output current can be expressed as $$I_{out,avg} = \frac{V_{in}}{8Lf_{sw}} \varphi(1-\varphi) \quad (23)$$

where $\phi=2t_\phi/T_{sw}$ is the normalized phase shift. Equation 23 shows how the output current may depend on the inductor impedance and the phase shift $t_\phi$, independent of capacitance values or the conversion ratio $M=V_{out}/V_{in}$. This is an important feature of the TSAB converters because it shows that the converter operation may be unaffected by capacitance tolerances or variations with DC bias. One may note that the characteristic (1) may resemble the simplified model of the DAB converter. Similar to the DAB, a linearized first-order dynamic model may be used to control the output current, power or voltage, as shown in (24) (assuming small phase shift), while more detailed small signal models considering sampling effects may be developed as previously reported for the 2-to-1 case.

$$\hat{i}_{out,avg} = K_\varphi \hat{\varphi}, \text{ where } K_\varphi = \frac{V_{in}}{8Lf_{sw}} \quad (24)$$

One may note that (23) and (24) are approximate expressions that apply to the case when the converter operates well above resonance (k>>1). In general, numerical methods can be used to accurately solve the periodic steady state. When operating close to resonance, with k≈1, the steady state solutions, for example the inductor RMS currents, become much more sensitive to input/output voltage variations, as well as capacitance and inductance tolerances. With k≈1, TSAB converters may also exhibit multiple undamped resonances and more complicated dynamic responses, as previously suggested. The present disclosure thus focuses on relatively high-k TSAB designs using relatively small inductances and relatively large capacitances.

Approaches to loss modeling and design issues for the 4-to-1 TSAB may be extended to the N-to-1 case.

A. Loss Modeling

1) Conduction loss: The conduction loss can be calculated using:

$$P_{cond}=1.5R_{on}(I_{L1,rms}^2+I_{L3,rms}^2)+R_{on}(I_{L1,rms}+I_{L3,rms})^2 \quad (25)$$

The RMS current of each inductor depends on the conversion ratio M and the switching frequency to resonant frequency ratio k. Assuming operation at the nominal conversion ratio M=1/N=0.25 with relatively small phase shift and k>2, each AC inductor ($L_1$, $L_3$) carries approximately one half of the load current, $I_{L1,rms}=I_{L3,rms}≈I_{out}/2$, which results in minimum conduction losses.

Figure 15A:
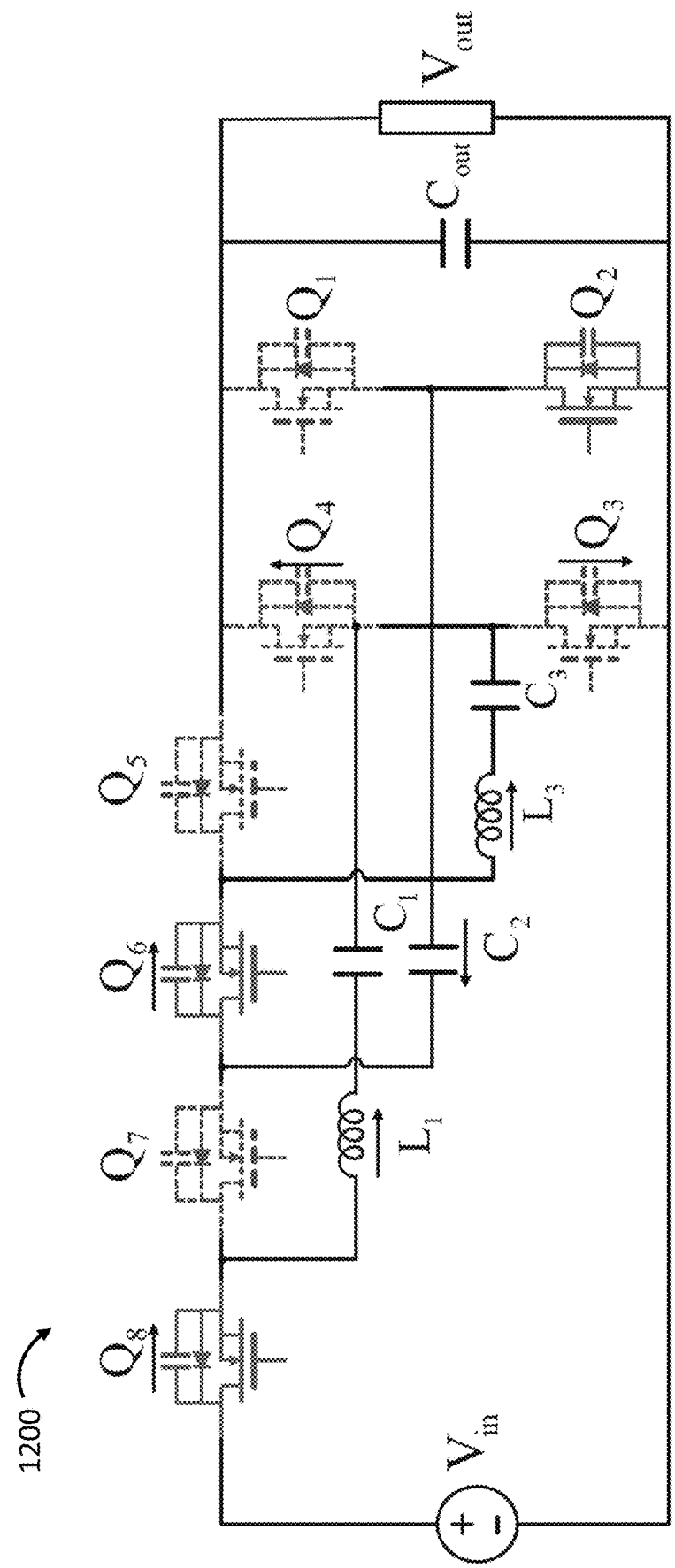
FIGS. 15A and 15B depict schematic diagrams of commutation states during dead times of the 4-to-1 TSAB converter of FIG. 12, according to some embodiments of the present technology.

2) Switching loss: Since the tanks are inductive at the switching frequency, lagging switch pairs in, e.g., the TSAB converter 1200 of FIG. 12, naturally exhibit ZVS commutation in transition states illustrated in FIGS. 15A and 15B. As shown in FIG. 15A, S2a is a ZVS transition state, which follows the main conduction state S1 where the inductor current may ramp up from a negative to a positive value. ZVS may be achieved as long as the energy in the inductor is sufficiently large to charge/discharge the device output capacitances.

Assuming M=0.25, similar to the DAB converter, if the total capacitance $C_s$ at the switch node of the half bridge $Q_3/Q_4$ is considered linear, following the state plane analysis for $C_s$ voltage and L current, the ZVS condition for the switches $Q_3$-$Q_4$ can be found in terms of the load current:

$$I_{out} \geq \frac{V_{in}}{2}\sqrt{\frac{C_s}{L}} \quad (26)$$

Figure 15B:
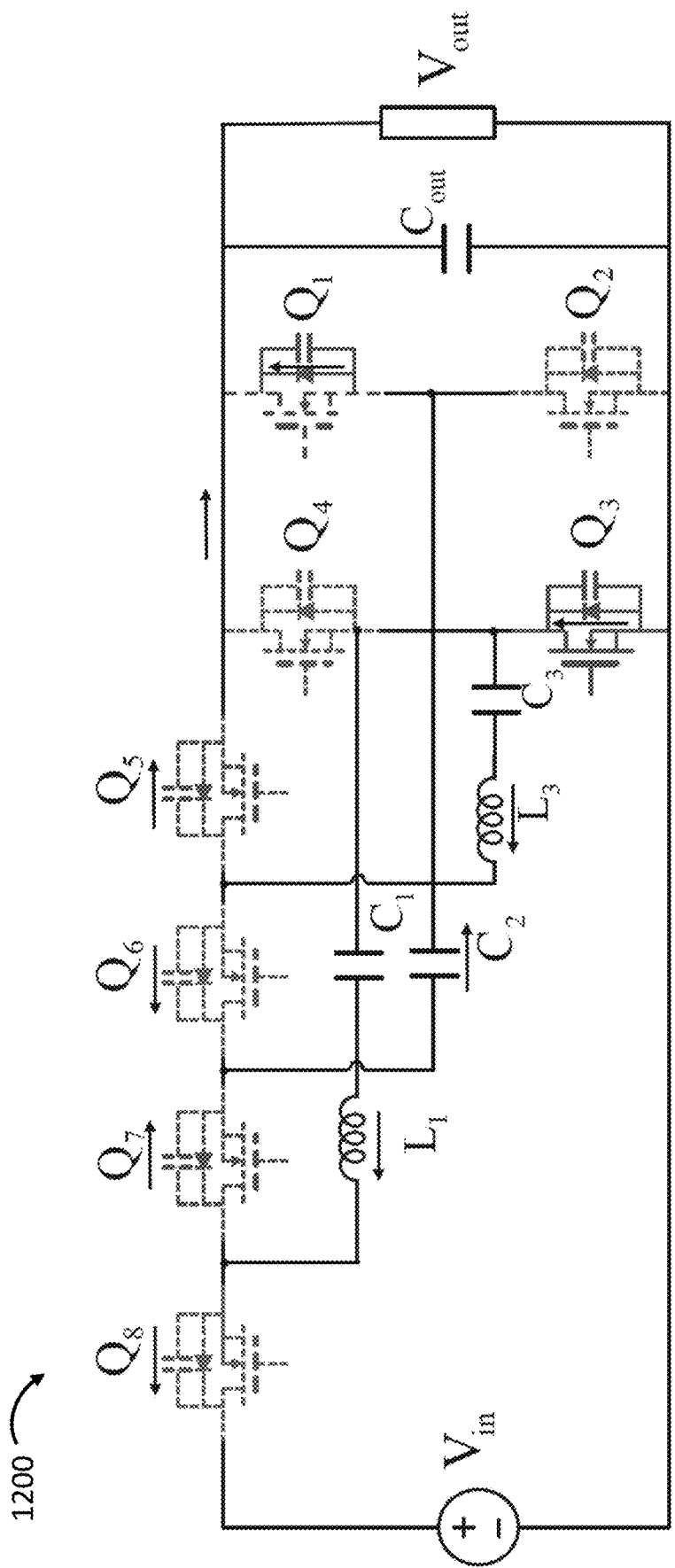

However, during the partial hard switching transition state S4c shown in FIG. 15B, which follows the main conduction state S4b, inductor currents may continue to soft charge/discharge $Q_5$-$Q_8$, while the current in $C_2$ may forward bias the body diode of $Q_1$. The $Q_1$ diode may remain forward biased until $Q_2$ turns on, which may result in hard switching for the half bridge $Q_1/Q_2$, and may impact upstream switches $Q_5$-$Q_8$ leading to partial hard-switching transitions of these switches. Due to symmetry, the same transition analysis may apply to the other half of the switching period. In conclusion, the lagging leg (e.g., first portion) $Q_3/Q_4$ may always ZVS transitions assisted by the load current, while leading leg (e.g., second portion) devices $Q_5$-$Q_8$ may exhibit partial hard switching, and the bottom leading leg $Q_1/Q_2$ may be always hard switching.

The hard switching loss in each non-ZVS transition can be approximated by:

$$P_{sw,hard}=0.5V_{ds}Q_{oss}(V_{ds})f_{sw} \quad (27)$$

where $V_{ds}=V_{in}/4$.

3) Inductor loss: TSAB converters may require small AC inductors having near-trapezoidal current waveforms. In the prototype described by way of example only herein, the inductors may be realized using planar magnetics, thereby facilitating converter miniaturization and heat transfer. Odd harmonics at relatively large phase shift in the inductor currents may contribute to additional AC losses. 2D finite element method (FEM) simulation may be used to account for proximity losses and air-gap related fringing losses. Core losses may be modeled using, e.g., a method applying the improved generalized Steinmetz equation (iGSE), as previously reported.

B. Design Consideration

In the TSAB design process, the key design parameters are the switching frequency inductance (L), and ratio $k=f_{sw}/f_r$. In the example analysis that follows, it is assumed that capacitance values are relatively large, so that $k>1$ and equation (23) applies.

The inductance range may be constrained by the following practical considerations. Given the switching frequency $f_{sw}$, a minimum inductance may be determined by the minimum achievable phase shift command $\phi_{min}$ and an upper bound for the minimum load current in regulation $\phi_{out}^{min}$. In a digital controller implementation, $\phi_{min}$ may be practically limited by the digital PWM resolution. Similarly, a maximum inductance may be determined by maximum allowable phase shift $\phi_{max}$ and a lower bound for the maximum load current in regulation $I_{out}^{max}$. Operating at larger $\phi_{max}$ may increase the RMS currents and conduction losses in the converter. These considerations may result in the following constraints for inductance L:

$$L > \frac{V_{in}}{8Lf_{sw}I_{out}^{max}} \varphi_{min}(1-\varphi_{min}) \quad (28)$$

$$L < \frac{V_{in}}{8Lf_{sw}I_{out}^{max}} \varphi_{max}(1-\varphi_{max}) \quad (29)$$

Based on the loss model that includes switching losses, conduction losses, and losses in the magnetics, worst-case operating points may be considered where $M=V_{out}/V_{in}$ is farthest away from the nominal conversion ratio 1/N. In the present 4-to-1 TSAB converter (e.g., 1200) prototype example, ±5% variation away from the nominal may be expected, e.g., 1/4.2<M<1/3.8. Observing the constraints (28) and (29), inductance may be selected based on the available core sizes, switching frequency, as well as the worst case conversion ratio. While low inductance is often desired, a higher inductance may be able to suppress the peak currents and result in a flat efficiency characteristic with respect to conversion ratio M variations. Capacitances may be selected to keep k relatively high (in the range of 2-5). In terms of power density performance, similar to standard PWM converters, increasing the switching frequency may lead to reduced size of the passive components because it is possible to use smaller-valued inductances and capacitances at the same k. On the other hand, increasing switching frequency may result in higher switching losses and higher inductor AC losses, which may present a limitation to the achievable efficiency versus power density trade-off.

C. Comparison to Related Converter Topologies

At least some of the TSAB converters described herein have similar circuit topologies as previously reported switched-tank converters (STC) because they are both derived from the Dickson SC converters. On the other hand, due to the fact that TSAB converters may be operated well above resonance, with the switching frequency to resonant frequency ratio $k>1$, the TSAB operating characteristics and control differ significantly from switched-tank converters. Table 3 compares qualitatively TSAB converters with related and prior-reported converter topologies.

TABLE 3

Comparison of TSAB converters with related previously reported converter topologies

| Converter | $k = f_{sw}/f_r$ | Soft charging | Soft switching | Regulation | Inductor RMS current | Robustness to L or C variation |
|---|---|---|---|---|---|---|
| ReSC [5]–[8] | k≈1 | Yes | ZCS | Limited | High | Poor |
| STC [9]–[12] | k≈1 | Yes | ZCS | No | High | Poor |
| MMSRC [15] | k > 1 | Yes | ZVS | Yes | Low | Poor |
| Transformerless-DAB (16) | k > 1 | Partial | Partial ZVS | Yes | High | Good |
| TSAB (this work) | k > 1 | Yes | Partial ZVS | Yes | Low | Good |

Operation close to resonance in resonant switched capacitor (ReSC) converters and switched tank converters (STC) complicates control and regulation, and results in increased current stresses and conduction losses. These converters are also more sensitive to parameter variations. Multi-level modular switched capacitor converters (MMCCC) and transformerless DAB converters, for example, operate with k>1, and have circuit topologies and operating characteristics closely related to the TSAB converters. Transformerless-DAB converters employ fewer inductors, at the expense of partial hard charging/discharging of capacitors and higher inductor current stresses.

Example 4

A 120 W 4-to-1 TSAB converter implementing the topology of converter 1200 of FIG. 12 was designed for 48 V input, and 12 V output. The converter prototype is shown in FIG. 16, and uses planar inductors and 40 V eGaN MOSFETs. A U.S. quarter coin at left in FIG. 16 provides a 2D dimensional reference. The prototype components and design parameters are listed in Table 4.

TABLE 4

120 W, 48-to-12 V TSAB converter parameters

| Switches | |
|---|---|
| $Q_1$–$Q_4$ | EPC2023 |
| $Q_5$–$Q_8$ | EPC2024 |

TABLE 4-continued

120 W, 48-to-12 V TSAB converter parameters

Passive components

| | |
|---|---|
| $C_1$, $C_3$ | 10 µF |
| $C_2$ | 20 µF |
| $L_1$, $L_3$ | 800 nH |
| $f_{sw}$ | 150 kHz |
| k | 2.7 |

Inductor design

| | |
|---|---|
| Number of turns | 3 |
| Core | TDK ELT11 × 4 (1.3 g) |
| Copper thickness | 4 oz |

Notably, relatively very small sub-µH inductances are required in spite of the fact that the switching frequency is relatively low, $f_{sw}$=150 kHz.

FIG. 17 depicts a graph of operational waveforms of the prototype 4-to-1 TSAB converter (e.g., 1200) shown in FIG. 16. Experimental waveforms in FIG. 17 illustrate trapezoidal AC inductor currents and phase shift operation between the lead and the lag half-bridges. It can be seen that each inductor ($L_1$, $L_3$) has current stress close to one half of the output current. ZVS transitions of the lagging switches (Q1 and Q2) are illustrated in FIG. 18.

FIG. 19 is a plot of measured efficiency results for the prototype 4-to-1 TSAB converter (e.g., 1200) of FIG. 16 compared with efficiency based on the loss model. Efficiency and losses are measured across full load range, and compared to the modeled efficiency curve in FIG. 19. The efficiency curve is relatively flat, with peak efficiency of 98.6% measured at about 40% load, and 98.0% efficiency measured at full load. FIG. 20 is a plot of measured loss for the prototype 4-to-1 TSAB converter (e.g., 1200) of FIG. 16 compared with model-based loss breakdown. In FIG. 20, the modeled losses are compared to the measured loss. At light load, the dominant loss is the switching losses as the inductor does not have enough energy to discharge/charge the device output capacitors. At heavy load, the inductor AC copper loss dominates. This is because the RMS current is relatively larger when phase shift is higher, and because the amplitudes of odd current harmonics increase as the load increases. FIG. 21 is a plot of efficiency variation over ±5% conversion ratio deviation from the nominal $M=V_{out}/V_{in}$=0.25 for the prototype 4-to-1 TSAB converter (e.g., 1200) of FIG. 16 at P=45 W and P=65 W. Efficiency variation with respect to conversion ratio is shown in FIG. 21, illustrating how it is possible to maintain high efficiency across all intended conversion ratios in the neighborhood of the nominal conversion ratio M=0.25.

The present disclosure further provides a family of transformerless stacked active bridge (TSAB) converters having nominal N-to-1 conversion ratio. From the foregoing description and Example 4, the TSAB converters (e.g., 1200) disclosed herein may be derived by inserting small AC inductors into the Dickson switched-capacitor (SC) converters. In contrast to other SC-derived converters such as Resonant Switched-Capacitor converter (ReSC), or switched tank converters, which share equivalent circuit topologies, the TSAB converter operation may resemble operation of the isolated dual active bridge (DAB) converter, while dispensing with the need for an isolation transformer. The TSAB converter family according to the present technology combines the benefits of SC and DAB converters: reduced switch voltage stresses ($2V_{in}$/N), favorable switch utilization as in the parent SC converter, and small AC inductors with near-trapezoidal low RMS currents, zero voltage switching, robustness to component tolerances, and continuous voltage regulation capability using simple phase-shift control similar to the DAB converter. The results were verified on a 120 W 48 V-to-12 V TSAB prototype (e.g., converter 1200), which achieved a flat efficiency curve with 98.6% peak efficiency and 98.0% full load efficiency.

The present disclosure further provides transformerless stacked active bridge (TSAB) converters derived from N-to-1 ladder switched capacitor (SC) converters by addition of small AC inductors. The ladder-TSAB (Ladder TSAB) converters (e.g., 400) may feature soft charging of all capacitors and zero-voltage switching of all switches. The use of small AC inductors and low voltage devices is enabled by low volt-seconds applied to inductors and low device voltage stresses equal to 1/N of the supply voltage. Output regulation and flying capacitor voltage balancing may be achieved through phase-shift control. Experimental results are presented for a 3-to-1 Ladder TSAB converter (e.g., 400) in two application scenarios: 12-to-4 V, 10 A, and 36-to-12 V, 15 A. In the 12-to-4 V prototype, the peak measured efficiency is 98.7%, while the full load efficiency is 92.4%. In the 36-to-12 V case, the peak efficiency is 98.7% and the full-load efficiency is 96.3%.

Switched-capacitor (SC) converters are attractive because they offer non-isolated "DC-transformer" (DCX) conversion without magnetic components. However, SC converters have losses associated with "hard" capacitor charging/discharging, hard switching losses and limited output voltage regulation. Various hybrid converters have been proposed to address these limitations of SC converters by addition of inductors to mitigate hard capacitor charging/discharging as well as achieve soft switching. For example, resonant switched capacitor converters and switched tank converters insert small AC inductors and operate close to resonance (k=1), which results in near-sinusoidal switch currents and zero-current-switching (ZCS). Operation above resonance (k>1), leads to zero-voltage switching (ZVS), low-RMS near-trapezoidal inductor current waveforms, and reduced sensitivity to component tolerances. In particular, transformerless stacked active bridge (TSAB) hybrid converters feature soft charging, low current and voltage stresses, and very high efficiency when operating around nominal N-to-1 conversion ratios. It has further been noted that TSAB converter characteristics and regulation capabilities using simple phase shift control resemble operating characteristics and advantages of the transformer-isolated dual active-bridge (DAB) converters, but without the need for an isolation transformer. However, in Dickson-based hybrid converters, it is not possible to achieve full soft charging for odd conversion ratios, and some of the switches exhibit partial ZVS.

The present disclosure enables ladder-TSAB (Ladder TSAB) converters, examples of which are shown in FIGS. 22A and 22B for the 3-to-1 (2200) and the 4-to-1 (2201) cases, where small AC inductors are connected in series with every other link capacitor (e.g., $C_1$ and $C_3$ in FIG. 22A, and $C_1$, $C_3$ and $C_5$ in FIG. 22B) to achieve full soft charging and discharging operation independent of capacitance values. Ladder TSAB converters such as 2200 and 2201 are derived from ladder SC converters following the general synthesis approach, e.g., described above with reference to FIG. 6. Given active current-bidirectional switches, these converters are power-bidirectional. By swapping source and load ports, the same converter topologies can serve in 1-to-N step-up applications.

FIG. 22A depicts a schematic diagram of a 3-to-1 nominal conversion ratio Ladder TSAB converter 2200. FIG. 22B depicts a schematic diagram of a 4-to-1 nominal conversion ratio Ladder TSAB converter 2201. Table 5 summarizes how the numbers of required passive elements, active elements (switches), as well as ideal switch stresses depend on N, where N corresponds to the nominal conversion ratio $M=V_{out}/V_{in}=1/N$.

TABLE 5

Number of capacitors $N_{cap}$, inductors $N_{ind}$ and switches $N_{sw}$, as well as the switch voltage stresses in an Ladder TSAB converter with N-to-1 nominal conversion ratio

| N | $N_{cap}$ | $N_{ind}$ | $N_{sw}$ | Voltage stress |
|---|---|---|---|---|
| 2 | 2 | 1 | 4 | $V_{in}/2$ |
| 3 | 4 | 2 | 8 | $V_{in}/3$ |
| 4 | 6 | 3 | 12 | $V_{in}/4$ |
| n | 2n − 2 | n − 1 | 4n − 4 | $V_{in}/n$ |

Similar to other TSAB converters, the Ladder TSAB converters according to the present technology combine advantageous features of both SC and DAB converters, including low current and voltage stresses, low volt-seconds applied to AC inductors, natural ZVS, simple phase shift control, and near-minimum inductor RMS currents. Furthermore, Ladder TSAB converters described herein achieve soft charging and discharging for all charge transfer capacitors, and soft switching of all switches, for both odd and even nominal conversion ratios.

The present disclosure provides operating principles and steady-state characteristics of Ladder TSAB converters. Experimental results of 3-to-1 Ladder TSAB prototypes (e.g., implementations of converter 2200) are provided for two scenarios: 12-to-4 V conversion, e.g., for USB-C charging applications, and 36-to-12 V conversion, e.g., for data-center power applications. In both cases, the experimental prototypes achieve 98.7% peak efficiency.

Operating Principals of Ladder TSAB Converters

Described below are steady state analysis, flying capacitor voltage balancing, as well as soft switching conditions are addressed for the 3-to-1 Ladder TSAB converter 2200 shown in FIG. 22A.

A. Steady State Operation and Control

The six switches in the example 3-to-1 Ladder TSAB converter 2200 may be controlled by three pairs of complementary 50% duty-cycle PWM signals: a reference pair ($\phi_1$ and $\phi_2$) and two phase-shifted pairs ($\phi_1^1/\phi_2^1$ and $\phi_1^2/\phi_2^2$) with $\phi_1$ and $\phi_2$ being the normalized phase shifts with respect to the reference, respectively. FIG. 23 depicts graphs of operating waveforms of the 3-to-1 Ladder TSAB converter of FIG. 22A. Idealized inductor $L_1$, $L_2$ current waveforms are illustrated in FIG. 23, with phase shifts $\phi_1$ and $\phi_2$ exaggerated for clarity. FIGS. 24A-24F depict schematic diagrams switched network states in the 3-to-1 Ladder TSAB converter 2200 of FIG. 22A assuming $\phi_1 > \phi_2$. The converter 2200 has six switched network states, as shown in FIG. 24A-24F: two direct power-delivering states 2400 and 2402 (respectively shown FIGS. 24C and 24F) where the output current is strictly positive, and four short polarity-reversal states 2404, 2406, 2408 and 2410 (respectively shown in FIGS. 24A, 24B, 24D and 24E) where one or more inductor currents change polarity).

To approach minimum-RMS trapezoidal-wave inductor currents in Ladder TSAB converter 2200, for example, it may be advantageous to select $L_1$, $C_1$ and $L_2$, $C_3$ resonances well below the switching frequency (k=>1) and keep the polarity-reversal states 2404, 2406, 2408 and 2410 short, e.g., operate with small phase shifts $\phi_1$, $\phi_2$.

FIG. 25 depicts graphs of operating waveforms for inductor current and output current of the 3-to-1 Ladder TSAB converter 2200 of FIG. 22A, with the labeled time intervals corresponding to the switched network states in FIGS. 24A-24F. Idealized inductor and output current waveforms are shown in FIG. 25, with phase shifts again exaggerated for clarity. The inductor current amplitudes can be found from:

$$I_{L_i} = m_i \varphi_i T_s / 4 \tag{30}$$

where i=1, 2 and $m_i$ is the slope of the inductor $L_i$ current in polarity-reversal states 2404, 2406, 2408 and 2410. Assuming a balanced voltage state, e.g., assuming that the capacitor DC voltages remain equal to the nominal capacitor voltages in the parent SC converter, $$V_{C_1} = V_{C_2} = V_{C_3} = V_{out} = V_{in}/3, \tag{31}$$

the slope $m_i$ is:

$$m_i = V_{in}/(3L_i) \tag{32}$$

This results in the flat-top trapezoidal inductor current waveforms, as shown in FIG. 25, assuming $\phi_1 > \phi_2$.

The balanced voltage state implies that the charge transfer process, as captured by the charge multiplier in SC converters, should be identical: charge is only transferred during direct-power-delivering states 2400 and 2402, respectively shown in FIGS. 24C and 24F. For $C_1$ and $C_3$, the charge transferred is:

$$Q_i = I_{L_i}(1 - \varphi_i) T_s / 2 \tag{33}$$

and the charge-balance requirement is:

$$Q_2 = 2Q_1 \tag{34}$$

Combining (30), (33) and (34) yields:

$$\frac{m_1}{m_2} = \frac{L_2}{L_1} = \frac{1}{2} \frac{\varphi_2(1 - \varphi_2)}{\varphi_1(1 - \varphi_1)} \tag{35}$$

It can be observed that by selecting $2L_2 = L_1 = L$ results in $\phi_1 = \phi_2 = \phi$, which means that just two pairs of phase shifted PWM signals are sufficient to control all eight switches. This condition also yields a simple expression for the average output current:

$$I_{out,tot} = \frac{V_{in}}{8 L f_s} \varphi(1 - \varphi) \tag{36}$$

This is an important yet common characteristic of all TSAB converters according to the present technology, which implies that simple phase shift control may be used to achieve output current or output voltage regulation. One may note that (36) resembles the DAB converter characteristic. Similar to the DAB converter, the regulation capability comes at the expense of increased losses when the converter operates away from the nominal conversion ratio.

B. Flying Capacitor Voltage Balancing

A balanced capacitor voltage state (31) refers to the steady state operation where the TSAB capacitor DC voltages are the same as the nominal capacitor voltages in the parent SC converter. In the 3-to-1 Ladder TSAB converter 2200, for example, the balanced state (31) yields the same minimum current and voltage stresses for all switches. Based on volt-second balance for the inductors $L_1$ and $L_2$, it follows that the capacitor voltages are interdependent:

$$V_{C1}=(1-M)V_{in}/2 \quad (37)$$

$$V_{C3}=(MV_{in}+V_{C2})/2 \quad (38)$$

Therefore, when operating around the nominal conversion ratio $M=V_{out}/V_{in}=\frac{1}{3}$, the balanced state is achieved simply by ensuring that $C_2$ voltage is balanced at the nominal value $V_{C2}=V_{in}/3$.

In practice, operation with identical phase-shift commands $\phi_1=\phi_2=\phi$, may still result in $C_2$ voltage imbalance due to timing mismatches so that actual $\phi_1 \neq \phi_2$, or inductance tolerances so that $L_1 \neq 2L_2$. As can be seen in (33), either $L_1 \neq 2L_2$ or $\phi_1 \neq \phi_2$ results in $Q_2/Q_1 \neq 2$, which may cause a net non-zero charge transfer during the polarity-reversal states 2404, 2406, 2408 and 2410. In response, $C_2$ voltage drifts from the balanced state and non-zero slopes are observed in inductor current waveshapes during the direct-power-delivering states 2400 and 2402. In a practical realization, the capacitor voltage imbalance may be mainly due to tolerances in inductance values. The two phase shifts $\phi_1$ and $\phi_2$ may be independently adjusted in a control scheme according to the disclosed methodology to counteract the effects of inductance mismatch, and actively control $V_{C2}$. This may introduce two additional switched network states 2406 and 2410, respectively shown in FIGS. 24B and 24E.

C. Zero-Voltage Switching

Since the TSAB converter may be operated above resonance for each L-C branch ($k=f_s/f_r>1$), the L-C branches are inductive at the switching frequency, which may result in natural zero-voltage switching (ZVS) for all switches as long as appropriate switch dead-times are provided, and inductors store enough energy to achieve soft voltage transitions. The ZVS condition can be expressed approximately as:

$$I_{out} \geq \frac{V_{in}}{2}\sqrt{\frac{C_s}{L}} \quad (39)$$

where $C_s$ is the total switch-node capacitance comprising switch output capacitances and other parasitics. The ZVS condition (39) may present a practical limit on how small inductances can be. Another practical limitation may arise from the available timing resolution of the control signals, which may determine dead times and phase shifts. Nevertheless, given the low volt-seconds applied, low energy storage requirements, and low-RMS current stresses, the TSAB converters according to the present technology may allow for inductors with substantially smaller inductances compared to standard PWM converters operating at comparable switching frequency and conversion ratio.

Example 5

FIG. 26 is a photograph of a 3-to-1 Ladder TSAB prototype implementation of converter 2200 built and tested in two conversion scenarios: $V_{in}$=12 V, $V_{out}$=4 V, P=40 W, e.g., for USB-C charging applications, and $V_{in}$=36 V, $V_{out}$=12 V, P=180 W, e.g., for data-center, telecom, or other intermediate bus voltage applications. A U.S. quarter coin at right in FIG. 26 provides a 2D dimensional reference. The prototype components are listed in Table 6, including low-voltage (20 V) silicon MOSFETs, 25V X7S ceramic capacitors, and two types of off-the-shelf surface-mount inductors (ferrite-core and air-core).

TABLE 6

Components in the experimental 3-to-1 Ladder TSAB prototype

| Switches | $L_1$ | $L_2$ | $C_1$-$C_3$ |
|---|---|---|---|
| Vishay SISA40DN 20 V, 1.1 mΩ | 70 nH (ferrite) Coilcraft 1212VS-70NME 66 nH (aircore) Coilcraft 1212VS-66NME | 36 nH (ferrite) Coilcraft SLC7649S-360KL 33 nH (aircore) 2 × Coilcraft 1212VS-66NME | $C_1$: 27 μF @ 12 V (10 × 10 μF) $C_2$: 27 μF @ 12 V (10 × 10 μF) $C_3$: 54 μF @ 12 V (20 × 10 μF) Murata GRM21BC71E106KE11 10 μF, 25 V |

Phase-shift control loops to regulate the output voltage and the capacitor $C_2$ voltage were implemented on a microcontroller (TEXAS INSTRUMENTS (TI) TMS320F28379D) with high resolution (150 ps) digital PWM modules, so that very small inductances (tens of nH) are applicable, although the switching frequency is relatively low (200 kHz). As a result, small phase shifts are required for full power operation, as can be observed from the inductor currents and switch node waveforms. This is demonstrated in FIGS. 27A and 27B, which depict graphs of operating waveforms of the 3-to-1 Ladder TSAB prototype (e.g., 2200) shown in FIG. 26 taken at $V_{in}$=36 V, $V_{out}$=12 V and $I_{out}$=8 A, and for two switching frequencies: $f_s$=200 kHz (k=$f_s/f_r$=1.7) in FIG. 27A, and $f_s$=400 kHz (k=3.4) in FIG. 27B. For example, with 36 V input voltage, a maximum output current of 15 A requires a phase shift of around 3% of the switching period at $f_s$=200 kHz.

When the present prototype converter was operated at higher switching frequency, the inductor current waveforms are closer to minimum-RMS trapezoidal waveshapes, as illustrated in FIG. 27B. However, operation at higher frequency resulted in higher losses predominantly due to increased ac resistances of the inductors ($L_1$, $L_2$) and PCB traces. In the experimental prototype, a lower switching frequency ($f_s$=200 kHz) yielded higher efficiency results. However, as shown in FIG. 27A, for a lower k=$f_s/f_r$, the inductor current waveforms deviated from the ideal trapezoidal waveshapes and appeared somewhat asymmetrical. This is because flying capacitor voltage ripples increased as k got closer 1. Furthermore, the effect of capacitor $C_2$ voltage became more visible, which introduced the slight asymmetry in the waveforms within a switching period.

FIGS. 28A and 28B are plots of measured efficiency for the 3-to-1 Ladder TSAB prototype (e.g., 2200) of FIG. 26. Measured efficiency results are shown in FIGS. 28A and 28B for $f_s$=200 kHz in the two considered application scenarios and for two different inductor realizations (ferrite-core and air core, as shown in Table 6). Specifically, FIG.

28A provides results for the $V_{in}$=36 V, $V_{out}$=12 V case, and FIG. 28B provides results for the $V_{in}$=12 V, $V_{out}$=4 V case. Gate driver losses are not included. Voltage and current measurements were recorded using a 6½ digit benchtop multimeter. Given that the required inductance values are in the tens of nH, both air-core inductors and ferrite-core inductors present viable options in practice of the present technology. The results of FIGS. 28A and 28B show that higher efficiency may be obtained using the ferrite-core inductors. This is because the switching frequency as well as inductance is relatively low ($f_s$=200 kHz and L is in the tens of nH), so the core losses are relatively insignificant compared to AC copper losses, which may dominate the inductor losses in both the ferrite-core and air-core cases. In the considered prototype, the air-core inductors are also larger in size.

As can be seen in FIGS. 28A and 28B, for the 12-to-4 V case, the peak efficiency is 98.7% at 1.5 A (6 W), dropping to 92.4% at 10 A (40 W). For the 36-to-12 V case, the peak efficiency is 98.7% at around 4.5 A (54 W), and the efficiency curve is relatively flat, with 96.3% at the maximum-load operating point 15 A (180 W). High peak efficiency may be attributed to ZVS operation at relatively light loads. Based on (39), the converter may be expected to maintain ZVS for load currents greater than $I_{out}$=1.7 A (17% load) in the 12 V-to-4 V case. For the 36 V-to-12 V case, the converter may operate with ZVS for loads greater than around $I_{out}$=5.1 A (34% load). FIG. 29 is a thermal image of the 3-to-1 Ladder TSAB prototype of FIG. 26 obtained using a FLIR thermal imager. The thermal image of FIG. 29 was obtained from the prototype converter operating at full load with $V_{in}$=36 V, $V_{out}$=12V and $I_{out}$=15 A, and shows a modest temperature rise with natural air cooling.

The present disclosure also describes ladder transformerless stacked active bridge (Ladder TSAB) converters. From the foregoing description and Example 5, the Ladder TSAB converters are derived from two-phase N-to-1 ladder switched-capacitor (SC) converters by addition of small ac inductors, following the general synthesis approach of FIG. 6. As members of the TSAB hybrid converter family, the Ladder TSAB converters offer full soft charging and discharging of flying capacitors independent of capacitance values. By operating at a switching frequency above the resonance, Ladder TSAB characteristics include low switch voltage stresses, zero-voltage switching for all switches and near-minimum-RMS inductor currents. As a result, efficiency may be very high when the converter is operated around the nominal N-to-1 conversion ratio. Furthermore, simple phase shift control may be used to achieve voltage balancing and output voltage or current regulation. Experimental results were presented for a 3-to-1 Ladder TSAB prototype in two application scenarios: 12-to-4 V, 10 A and 36-to-12 V, 15 A. Operating at hundreds of kHz using low-voltage rating silicon MOSFETs, the prototype Ladder TSAB converter employed ferrite or air-core AC inductors having inductances in the tens of nH. In the 12-to-4 V application, the peak efficiency was 98.7%, while the full-load (40 W) efficiency dropped to 92.4%, dominated by conduction losses. In the 36-to-12 V case, the peak efficiency was 98.7%, and the full-load (180 W) efficiency was 96.3%.

If only uni-directional power flow is needed and regulation is not required, some of the switches of the disclosed TSAB converter embodiments may be implemented with passive diodes while remaining active switches may all driven by PWM control signals. In this case, the operation characteristic is similar to an unregulated, fixed-conversion ratio DC-DC converter also known as "DC transformer" (DCX).

FIGS. 30-32 depict schematic diagrams of 1-to-2 TSAB, ladder 1-to-3 TSAB, and Dickson 1-to-4 TSAB, converters, respectively, designed and intended for operation as "DCX" in step-up (boost) configurations. A general 1-to-N case may easily be found following the same pattern as described above. For the step-down (buck) configuration (N-to-1), simply replacing the phase-shifted switches in a TSAB converter with diodes is sufficient. In the case of the ladder 1-to-3 TSAB converter operated as DCX, an additional output (labeled "$V_{OUT1}$" in FIG. 31) that is approximately (e.g., within ±10-20%) equal to $2V_{IN}$ may be added, as shown by components and lines drawn in dashed lines.

Another example is a stacked-ladder TSAB, which may be originated from a variant of the ladder SC/ReSC converter. FIG. 33 depicts an example 3-to-1 stacked ladder TSAB converter. FIG. 34 depicts graphs of operating waveforms for the 3-to-1 stacked ladder TSAB converter of FIG. 33. In the example shown in FIG. 34, control signals are provided for phase-shifted operation, where signals $c_1/c_2$ and $c_{1s}/c_{2s}$ are complementary PWM signals (not limited to 50% duty cycle), and where small dead times should be added (not shown in FIG. 34) in like manner as shown and described above with reference to FIGS. 5 and 13 according to the present technology. FIG. 35 depicts a step-up DCX version 3500 of the stacked ladder TSAB converter of FIG. 33. As compared to the converter of FIG. 33, which has six active switches coupled together in series, converter 3500 replaces the four of the six series connected switches of the 3-to-1 stacked ladder TSAB converter that are most proximal to the output port 3502 ($V_{out}$) of converter 3500 with passive diodes 3504 in the orientation shown which then can function as passive switches, rather than active (e.g., MOSFET) switches 3506. In operation of converter 3500 with, for example, the implementation of the control scheme for link branch (3508, 3510) currents according to the present technology in a boost mode, the four passive diodes 3504 carry a small current to facilitate high step up with high efficiency. Also, as compared to the converter of FIG. 33, converter 3500 is a much simpler, cheaper to make circuit configuration, and less complex to control (e.g., only two active switches 3506 in a half bridge configuration proximal to an input port 3507) and may find particularly advantageous uses in, for instance, unregulated, low power applications. FIG. 36A depicts a schematic diagram of a 4-to-1 doubler TSAB converter, according to the present technology. FIG. 36B depicts a 48V-12V prototype of the 4-to-1 doubler TSAB converter of FIG. 36A, and FIG. 36C depicts operating waveforms of the prototype 4-to-1 doubler TSAB converter of FIG. 36B.

FIGS. 37A and 37B depict a schematic diagrams of 6-to-1 Dickson TSAB converters with output capacitors, according to some embodiments of the present technology. The 6-to-1 Dickson TSAB converter 3700 of FIG. 37A includes an output capacitor 3702 electrically coupled in parallel with an output port 3704 of TSAB converter 3700, the output port 3704 being opposed across the circuit from an input port 3706. TSAB converter 3700 includes three link capacitors 3710, with each having an AC inductor 3712 electrically coupled in series therewith. TSAB converter 3700 includes two tree capacitors 3708, with the output capacitor 3702 as another tree capacitor 3708.

By comparison, the 6-to-1 Dickson TSAB converter 3701 of FIG. 37B includes a DC inductor 3716 in the output port 3704 portion of the circuit. TSAB converter 3701 also includes output capacitor 3702 electrically coupled in parallel with an output port 3704 downstream of DC inductor 3716. TSAB converter 3701 includes three tree capacitors 3708. TSAB converter 3701 includes two link capacitors 3710, with each having AC inductor 3712 electrically coupled in series therewith, with the output capacitor 3702 as another link capacitor 3708.

FIGS. 38A-38F depict a schematic diagrams of variations of TSAB DC-to-DC power converters with link capacitors 3804, inductors 3806, and an output capacitor 3802 as another link capacitor 3804, according to some embodiments of the present technology: The illustrated variations include Dickson 3800 (FIG. 38A), ladder 3801 (FIG. 38B), stacked ladder 3803 (FIG. 38C), doubler 3805 (FIG. 38D), Fibonacci 3807 (FIG. 38E), and Fibonacci II 3809 (FIG. 38F), TSAB DC-to-DC power converters.

In the TSAB family of converters, including for example and without limitation, the above-described embodiments illustrated in FIGS. 37A, 37B and 38A-38F, an output capacitor may be treated as either a tree capacitor or as a link capacitor. In the later case, location(s) of link capacitor(s) will change, and the location of the inductor(s) will change accordingly, resulting in a different converter topology. However, the principals of the control scheme methodologies described herein for TSAB converters according to the present technology will remain the same.

FIG. 39 depicts a graph of operating waveforms in the 6-to-1 Dickson TSAB converter 3701 shown in FIG. 37B, according to some embodiments of the present technology. Of note is the similarity with FIG. 5, including Ts and the control scheme including $T_\Phi$ (t-phi), and with the characteristics of the trapezoidal waveform for currents of inductors 3712 ($L_2$ and $L_4$). The graph of FIG. 39 also shows DC current in the DC inductor 3716 during operation of the TSAB converter 3701. This control scheme demonstrated in FIG. 39 provides four switched states (j) over each $T_s$ interval: 2', 2, 1' and 1. Each of these four switched states for the circuit of TSAB converter 3701 are illustrated in FIG. 40.

Generalized Control Architecture

A classic feedback controller is represented in FIG. 41A, with output voltage being the only control objective. As such, the control scheme of FIG. 41A utilizes a proportional integral (PI) controller, for example, with scalar inputs and scalar outputs. To account for non-idealities such as timing mismatch and/or inductance/capacitance mismatch, it may be advantageous, in practice, for one or more of the disclosed TSAB converter embodiments to employ a vectorized controller architecture, as shown in FIG. 41B. The diagonal component of matrix K may be proportional gain and the off-diagonal component of matrix K may be designed to decouple the impact between individual feedback loops. As such, the control scheme of FIG. 41B may enable multiple control objectives with vector inputs and vector outputs. The controller 4101 block (denoted "K" in FIG. 41B) is a matrix, and $V_C$, $v_{C,ref}$ and $\Phi$ (phi) are vectors.

Controller 4101 may be implemented using any of a variety of devices or components known to persons having ordinary skill in the art. Controller 4101 (which may be referred to herein as "controller means") may be a digital component, and analog component, or a combination of those. Microcontrollers, programmable logic controllers, computers (personal computers, special purpose computers, supercomputers, etc.), application specific integrated circuits, field programmable gate arrays, and the like, are all among the possible devices or components that may be suitable for implementing control schemes for the present technology. In some embodiments, controller 4101 may include processor(s) that are capable of executing program instructions (e.g., software and/or firmware) stored on one or more processor-readable memory storage media. As an example, such media may be non-transitory computer-readable media.

FIG. 42 depicts a flow chart of a method 4200 of manufacturing a TSAB DC-to-DC power converter, according to some embodiments of the present technology. Method 4200 may be applicable to any or all of the above described embodiments of TSAB converters according to the present technology. In an example embodiment, method 4200 includes the step of providing 4210 a parent SC converter topology. A topology of the SC power converter may be a two-phase switched capacitor converter, and may include at least a portion of one or more of: a Dickson, a ladder, a Fibonacci, and a doubler, topology. Method 4200 includes the step of electrically coupling 4220 at least one inductor to at least one link capacitor of the SC converter. In one embodiment, the providing 4210 step of method 4200 may include providing 4230 a parent SC converter topology with at least two passive switching devices (e.g., diodes) and at least two active switching devices (e.g., MOSFETs) as the plurality of switches of the SC converter. By comparison, the known power converter illustrated in FIG. 33 contains six active switching devices connected exclusively in series. Examples of TSAB power converters resulting from the providing step 4230 include FIGS. 30, 31, 32 and 35. In another embodiment, the providing 4210 step of method 4200 may include providing 4240 a parent SC converter topology with active switching devices (e.g., MOSFETs) connected both in series and in parallel (e.g., full and/or half-bridge configurations) in the parent SC converter. Examples of TSAB power converters resulting from the providing step 4230 include FIGS. 4A, 7B, 7C, 8B, 22A, 22B and 36A. In yet another embodiment, method 2400 may include the step of electrically coupling 4250 an output capacitor to an output port of the TSAB DC-to-DC power converter to thereby provide a link capacitor as an output filter for the TSAB converter. In an example, method 2400 may include the step of electrically coupling 4260 an inductor to the output capacitor to thereby provide an LC low pass filter for the output filter. The output capacitor and the inductor coupled 4260 to the output capacitor may thereby provide link capacitor functionality to the output capacitor in some embodiments. Examples of TSAB power converters resulting from the coupling step 4260 include FIGS. 37B and 38A-38F.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a controller (e.g., microcontroller), a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted herein, including any that may be listed in accompanying filing papers, are incorporated herein by reference. As to aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims. The appended claims thus form a part of the disclosure as if they were presented elsewhere in the instant application and, as such, any and all combination of features and elements presented in the claims are expressly incorporated by reference herein as if they were equivalently, analogously or similarly described above.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for"). Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

We claim:

1. A direct current (DC)-to-DC power converter comprising:
   a plurality of switches including a first pair of switches and at least a second pair of switches;
   a plurality of capacitors, wherein:
      at least one capacitor of the plurality of capacitors is electrically coupled to at least one of the plurality of switches, and
      the plurality of capacitors comprises:
         at least one tree capacitor, and
         at least one link capacitor forming a loop with the at least one tree capacitor;
   at least one inductor electrically coupled to at least one of the link capacitors;
   an LC output filter including an output capacitor electrically coupled to another inductor; and
   controller means operatively coupled to the first, and the at least a second, pair of switches, and configured to transmit, with phase shift modulation:
      a first pair of control signals to the first pair of switches; and
      at least a second pair of control signals to the at least a second pair of switches.

2. The DC-to-DC power converter according to claim 1, wherein:
   the at least one link capacitor comprises a plurality of link capacitors;
   the at least one inductor comprises a plurality of inductors; and
   each inductor of the plurality of inductors is electrically coupled to one link capacitor of the plurality of link capacitors.

3. The DC-to-DC power converter according to claim 1 further comprising equal numbers of: link capacitors, and inductors electrically coupled in series to each of the link capacitors.

4. The DC-to-DC power converter according to claim 1, wherein the controller means is further configured to transmit the first, and the at least a second, pair of control signals to the first, and the at least a second, pair of switches in a control scheme sufficient to:
   regulate at least one of: an output voltage, an output current, and an output power; and
   control a direction of flow of electric power, transmitted out of the DC-to-DC power converter in response to an input power flow during operation of the DC-to-DC power converter.

5. The DC-to-DC power converter according to claim 1, wherein the first, and the at least a second, pair of controls signals each comprise two complementary signals with a dead time inserted, the dead time having a value sufficient to prevent simultaneous conduction as between respective pairs of switches during operation of the DC-to-DC power converter.

6. The DC-to-DC power converter according to claim 1, wherein the controller means is further configured to transmit the first, and the at least a second, pair of control signals to the first, and the at least a second, pair of switches in a control scheme sufficient to at least one of:
   provide polarity-reversal states during operation of the DC-to-DC power converter;
   provide a current flow in the at least one inductor having a trapezoidal waveform having at least four regions including: fast rising, positive flat, fast falling, and negative flat, regions;

prevent capacitor-only loops in any switched network state; and provide a switching frequency to resonant frequency ratio (k) of greater than 1 for each of one or more resonant frequencies during operation of the DC-to-DC power converter.

7. The DC-to-DC power converter according to claim 1, wherein an inductance value of the at least one inductor is sufficient to provide an average current of zero in the at least one tree capacitor during operation of the DC-to-DC power converter.

8. The DC-to-DC power converter according to claim 1, wherein:
the at least one inductor comprises a plurality of inductors; and
a ratio of an input voltage to an output voltage during operation of the DC-to-DC power converter depends, at least in part, on a number of the plurality of inductors.

9. A direct current (DC)-to-DC power converter comprising:
a plurality of active switching devices including at least one pair of active switching devices;
at least two passive switching devices electrically coupled in series with at least two of the plurality of active switching devices;
a plurality of capacitors, wherein:
at least one capacitor of the plurality of capacitors is electrically coupled to at least one of the plurality of switches, and
the plurality of capacitors comprises:
at least one tree capacitor, and
at least one link capacitor forming a loop with the at least one tree capacitor;
at least one inductor electrically coupled to at least one of the link capacitors; and
controller means operatively coupled to the plurality of active switching devices, and configured to transmit at least one pair of control signals to the at least one pair of active switching devices with phase shift modulation.

10. The DC-to-DC power converter according to claim 9, wherein:
the at least one link capacitor comprises a plurality of link capacitors;
the at least one inductor comprises a plurality of inductors; and
each inductor of the plurality of inductors is electrically coupled to one of the plurality of link capacitors.

11. The DC-to-DC power converter according to claim 9, wherein the at least one pair of control signals has a dead time inserted, the dead time having a value sufficient to prevent simultaneous conduction as between each active switching device of the at least one pair of active switching devices during operation of the DC-to-DC power converter.

12. The DC-to-DC power converter according to claim 9, wherein the controller means is further configured to transmit the at least one pair of control signals to the at least one pair of active switching devices in a control scheme sufficient to provide a switching frequency of the at least one pair of active switching devices greater than one or more resonant frequencies during operation of the DC-to-DC power converter.

13. The DC-to-DC power converter according to claim 9, wherein the at least two passive switching devices are electrically coupled in series with the at least two active switching devices downstream of the at least two of the plurality of active switching devices with respect to a power flow direction during operation of the DC-to-DC power converter.

14. A direct current (DC)-to-DC power converter comprising:
a plurality of active switches including a first pair of active switches and at least a second pair of active switches;
a plurality of capacitors, wherein:
at least one capacitor of the plurality of capacitors is electrically coupled to at least one of the plurality of active switches, and
the plurality of capacitors comprises:
at least one tree capacitor, and
at least one link capacitor forming a loop with the at least one tree capacitor;
at least one inductor electrically coupled to at least one of the link capacitors,
wherein the plurality of active switches are connected both in series, and in parallel, with respect to one another, or as between circuit branches of the DC-to-DC converter; and
controller means operatively coupled to the plurality of active switches, and configured to transmit, with phase shift modulation:
a first pair of control signals to the first pair of active switches; and
at least a second pair of control signals to the at least a second pair of active switches.

15. The DC-to-DC power converter according to claim 14, wherein:
the at least one link capacitor comprises a plurality of link capacitors;
the at least one inductor comprises a plurality of inductors; and
each inductor of the plurality of inductors is electrically coupled to one of the plurality of link capacitors.

16. The DC-to-DC power converter according to claim 14, wherein the controller means is further configured to transmit the first, and the at least a second, pair of control signals to the first, and the at least a second, pair of active switches in a control scheme sufficient to:
regulate at least one of: an output voltage, an output current, and an output power; and
control a direction of flow of electric power, transmitted out of the DC-to-DC power converter in response to an input power flow during operation of the DC-to-DC power converter.

17. The DC-to-DC power converter according to claim 14, wherein the first, and the at least a second, pair of controls signals each comprise two complementary signals with a dead time inserted, the dead time having a value sufficient to prevent simultaneous conduction as between respective pairs of active switches during operation of the DC-to-DC power converter.

18. The DC-to-DC power converter according to claim 14, wherein the controller means is further configured to transmit the first, and the at least a second, pair of control signals to the first, and the at least a second, pair of active switches in a control scheme sufficient to at least one of:
provide one or more polarity-reversal states during operation of the DC-to-DC power converter;
provide a current flow in the at least one inductor having a trapezoidal waveform having at least four regions including: fast rising, positive flat, fast falling, and negative flat, regions;

prevent capacitor-only loops in any switched network state; and provide a switching frequency to resonant frequency ratio (k) of greater than 1 for each of one or more resonant frequencies during operation of the DC-to-DC power converter.

19. The DC-to-DC power converter according to claim 14, wherein the controller means is further configured to transmit the first, and the at least a second, pair of control signals to the first, and the at least a second, pair of active switches via one or more of:

a pulse width modulation, a variable frequency, and a duty cycle, based control scheme.

20. The DC-to-DC power converter according to claim 14, wherein the controller means is further configured to transmit the first, and the at least a second, pair of control signals to the first, and the at least a second, pair of active switches in a control scheme sufficient to provide a switching frequency of the plurality of switches greater than one or more resonant frequencies during operation of the DC-to-DC power converter.

* * * * *